(12) United States Patent
Park et al.

(10) Patent No.: US 10,938,455 B2
(45) Date of Patent: Mar. 2, 2021

(54) METHOD FOR REPORTING CHANNEL STATE INFORMATION IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Kijun Kim, Seoul (KR); Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/688,324

(22) Filed: Nov. 19, 2019

(65) Prior Publication Data

US 2020/0169303 A1 May 28, 2020

Related U.S. Application Data

(63) Continuation of application No. 15/565,036, filed as application No. PCT/KR2016/003778 on Apr. 11, 2016, now Pat. No. 10,536,199.

(Continued)

(51) Int. Cl.
*H04B 7/0417* (2017.01)
*H04B 7/04* (2017.01)
(Continued)

(52) U.S. Cl.
CPC ............ *H04B 7/0417* (2013.01); *H04B 7/04* (2013.01); *H04B 7/0456* (2013.01); *H04B 7/06* (2013.01);
(Continued)

(58) Field of Classification Search
CPC .......... H04B 7/04; H04B 7/0417; H04B 7/06; H04B 7/0626; H04B 7/0456; H04B 7/0628; H04L 5/005; H04L 5/0057
(Continued)

(56) References Cited

U.S. PATENT DOCUMENTS

2011/0064156 A1* 3/2011 Kim ..................... H04B 7/0639
375/267
2012/0328031 A1 12/2012 Pajukoski et al.
(Continued)

FOREIGN PATENT DOCUMENTS

CN 103081388 A 5/2013
CN 103476055 A 12/2013
(Continued)

OTHER PUBLICATIONS

Huawei et al., "Cosinderation on CSI-RS configuration", R2-111555/R1-111156, 3GPP TSG-RAN WG2 Meeting #73, Taipei, Feb. 21-25, 2011, 7 pgs.

*Primary Examiner* — Leila Malek
(74) *Attorney, Agent, or Firm* — Birch, Stewart, Kolasch & Birch, LLP

(57) ABSTRACT

According to the present specification, a method for reporting channel state information (CSI) in a wireless communication system, which is performed by a UE includes: transmitting to a base station UE capability information including control information indicating a codebook configuration supported by the UE with respect to a specific class related with the CSI reporting. Therefore, there is an effect that implementation complexity of the UE can be reduced.

11 Claims, 27 Drawing Sheets

Related U.S. Application Data

(60) Provisional application No. 62/145,654, filed on Apr. 10, 2015, provisional application No. 62/204,967, filed on Aug. 13, 2015, provisional application No. 62/205,657, filed on Aug. 14, 2015, provisional application No. 62/208,808, filed on Aug. 23, 2015, provisional application No. 62/211,007, filed on Aug. 28, 2015, provisional application No. 62/238,707, filed on Oct. 8, 2015, provisional application No. 62/251,650, filed on Nov. 5, 2015.

(51) Int. Cl.
| | |
|---|---|
| *H04B 7/06* | (2006.01) |
| *H04L 25/02* | (2006.01) |
| *H04B 7/0456* | (2017.01) |
| *H04L 5/00* | (2006.01) |
| *H04L 25/00* | (2006.01) |
| *H04W 72/00* | (2009.01) |
| *H04W 72/04* | (2009.01) |
| *H04W 24/00* | (2009.01) |
| *H04W 8/24* | (2009.01) |
| *H04W 24/10* | (2009.01) |
| *H04W 72/12* | (2009.01) |

(52) U.S. Cl.
CPC ......... *H04B 7/0626* (2013.01); *H04B 7/0628* (2013.01); *H04L 5/00* (2013.01); *H04L 5/005* (2013.01); *H04L 5/0051* (2013.01); *H04L 5/0057* (2013.01); *H04L 25/00* (2013.01); *H04L 25/0224* (2013.01); *H04W 72/00* (2013.01); *H04W 72/0413* (2013.01); *H04L 5/0023* (2013.01); *H04L 5/0098* (2013.01); *H04W 8/24* (2013.01); *H04W 24/00* (2013.01); *H04W 24/10* (2013.01); *H04W 72/1231* (2013.01)

(58) Field of Classification Search
USPC ........................................................ 375/267
See application file for complete search history.

(56) References Cited

U.S. PATENT DOCUMENTS

| | | | |
|---|---|---|---|
| 2013/0142125 A1* | 6/2013 | Shimezawa | H04B 7/063 370/328 |
| 2013/0310100 A1* | 11/2013 | Lee | H04L 25/0204 455/517 |
| 2013/0336214 A1 | 12/2013 | Sayana et al. | |
| 2014/0093004 A1* | 4/2014 | Gomadam | H04L 25/03942 375/267 |
| 2014/0198747 A1* | 7/2014 | Ouchi | H04L 5/0053 370/329 |
| 2014/0334391 A1 | 11/2014 | Khoshnevis et al. | |
| 2015/0280877 A1 | 10/2015 | Chen et al. | |
| 2015/0288499 A1 | 10/2015 | Nam et al. | |
| 2016/0072562 A1 | 3/2016 | Onggosanusi et al. | |
| 2016/0142123 A1 | 5/2016 | Zhang et al. | |
| 2016/0164588 A1 | 6/2016 | Chen | |
| 2016/0270091 A1 | 9/2016 | Frenne et al. | |
| 2017/0250743 A1* | 8/2017 | Jongren | H04B 7/0619 |
| 2017/0310447 A1 | 10/2017 | Kusashima et al. | |

FOREIGN PATENT DOCUMENTS

| | | |
|---|---|---|
| CN | 104350693 A | 2/2015 |
| CN | 104508997 A | 4/2015 |
| EP | 2858405 A1 | 4/2015 |
| WO | WO 2014/113137 A1 | 7/2014 |

\* cited by examiner

[Figure 1]
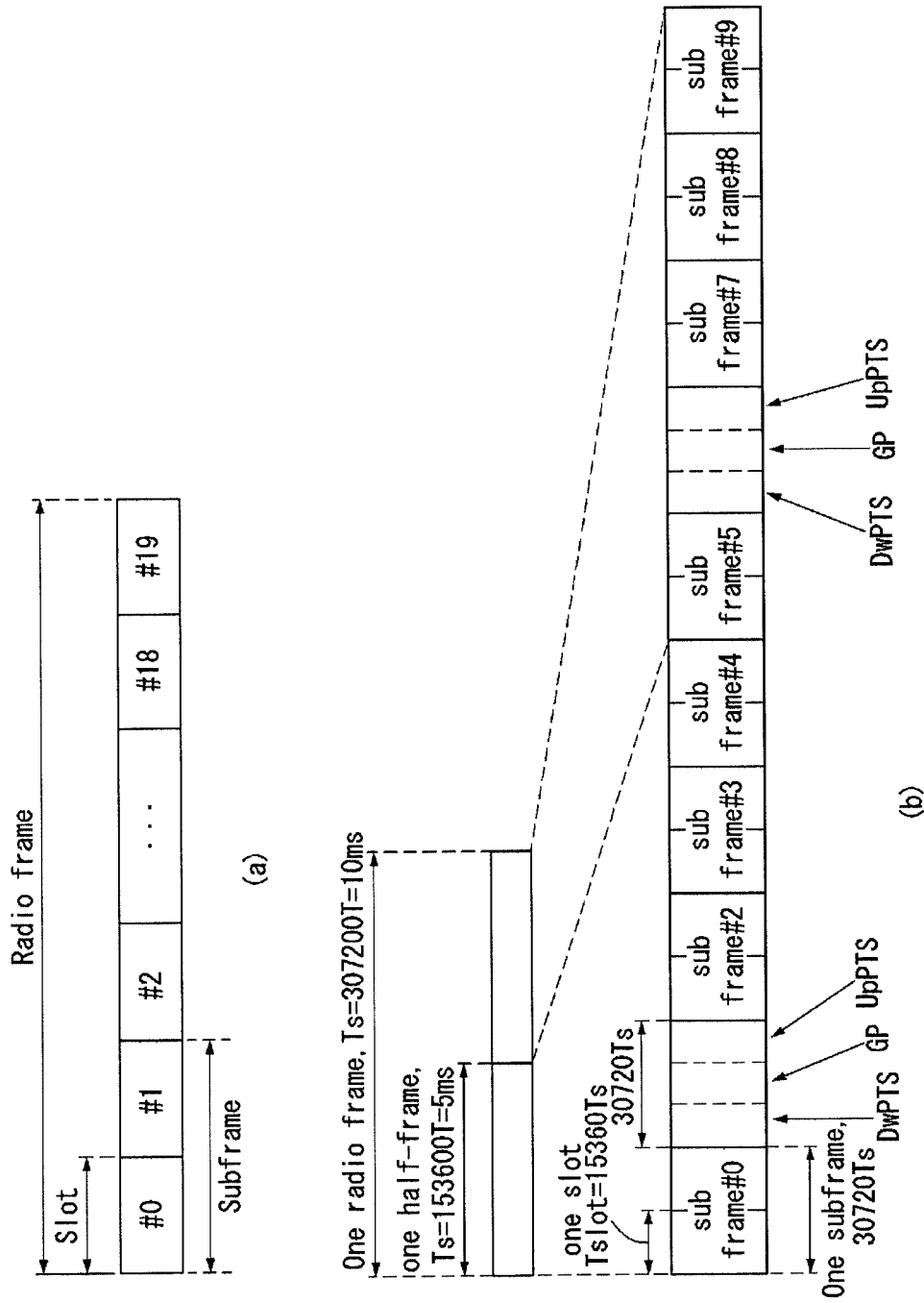

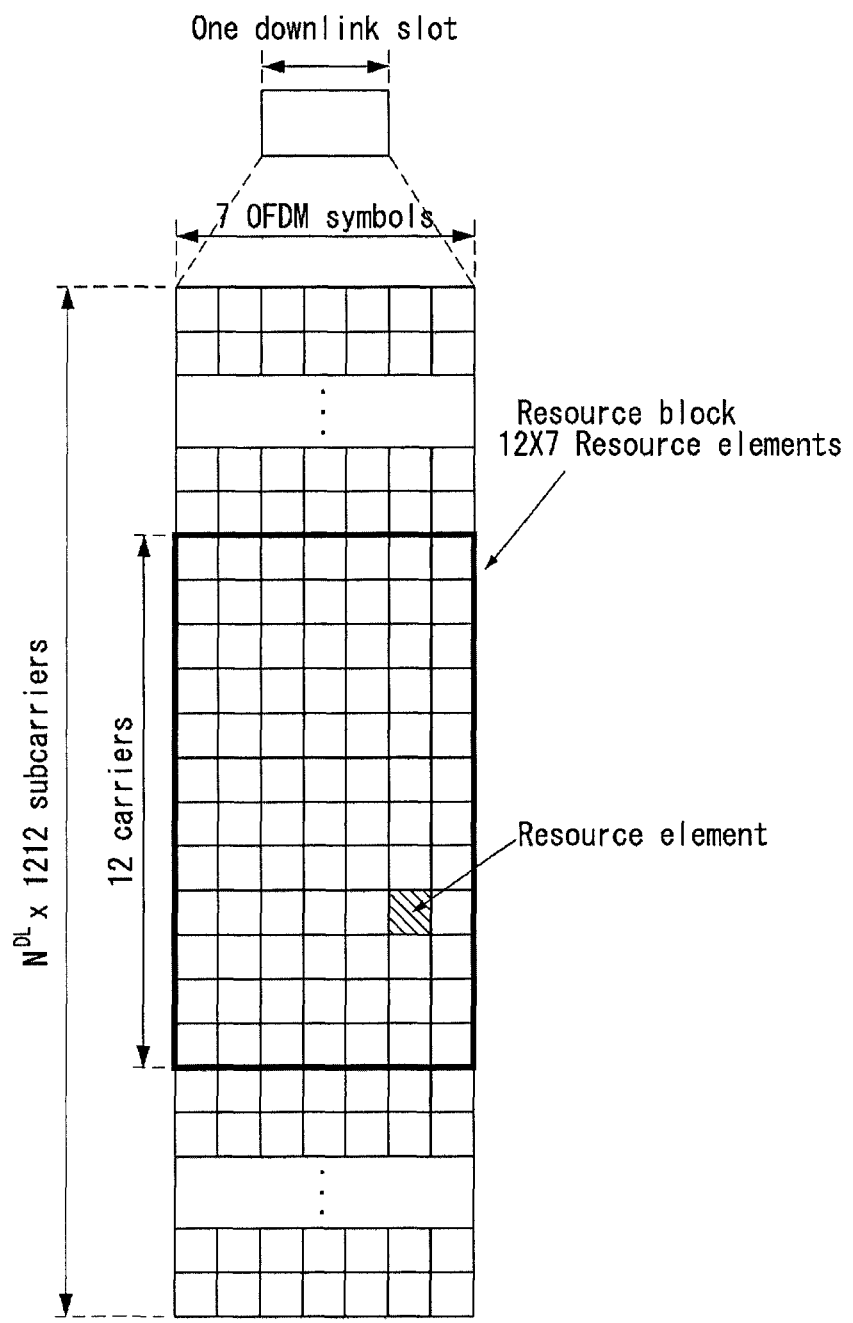
[Figure 2]

[Figure 3]
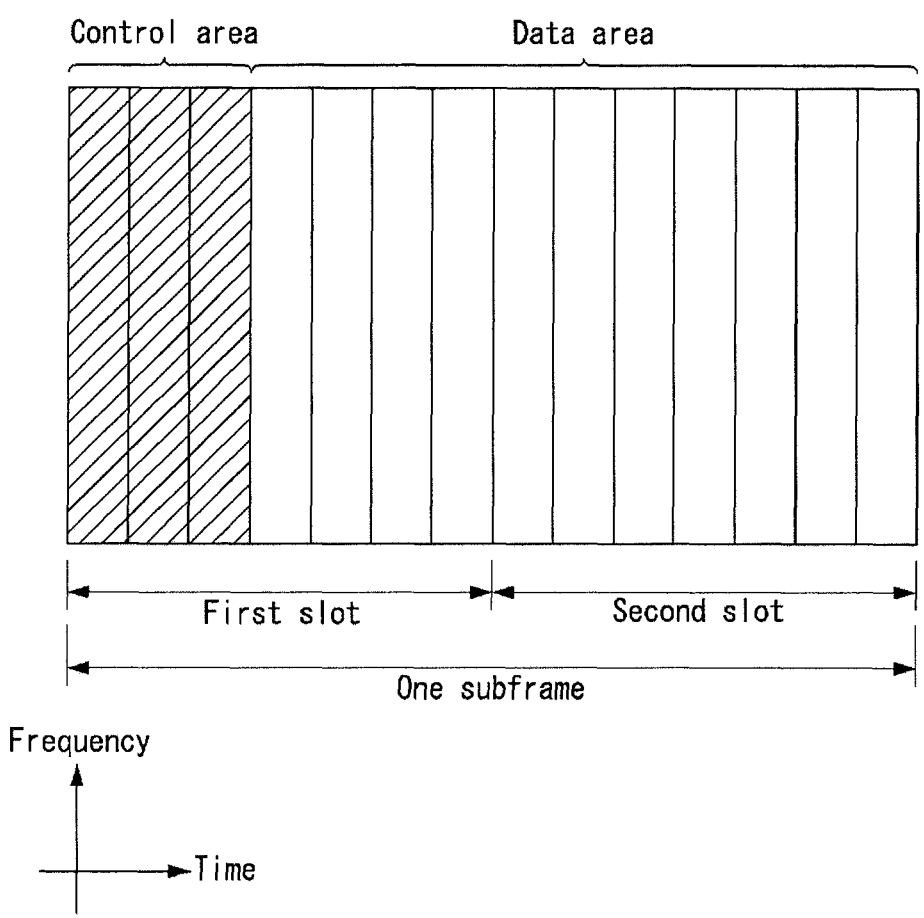

【Figure 4】
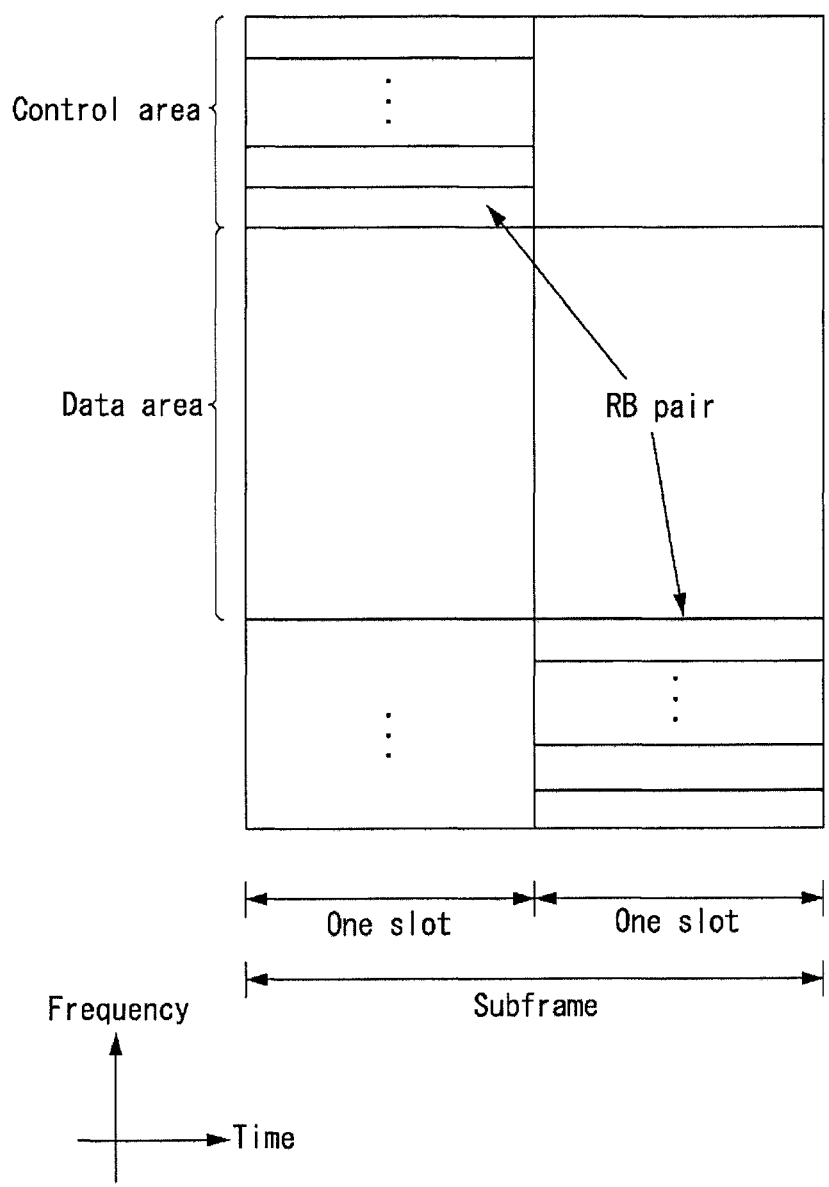

[Figure 5]
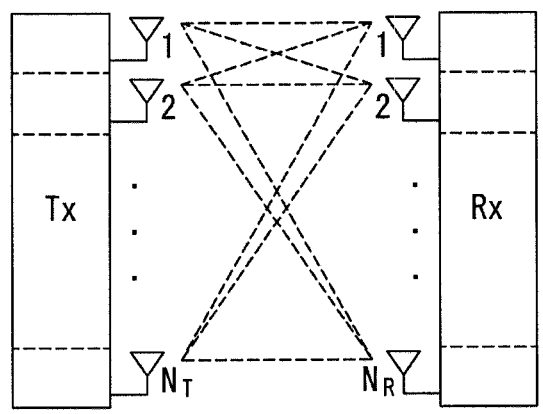
[Figure 6]
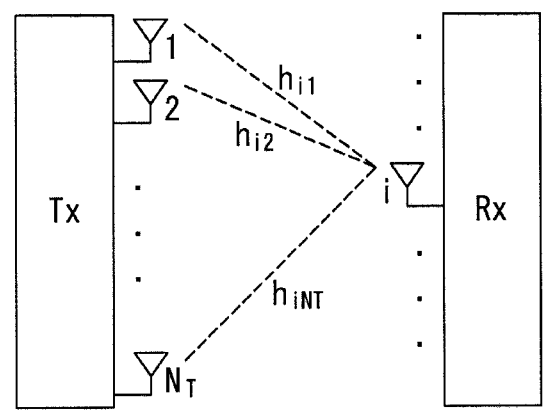

[Figure 7]
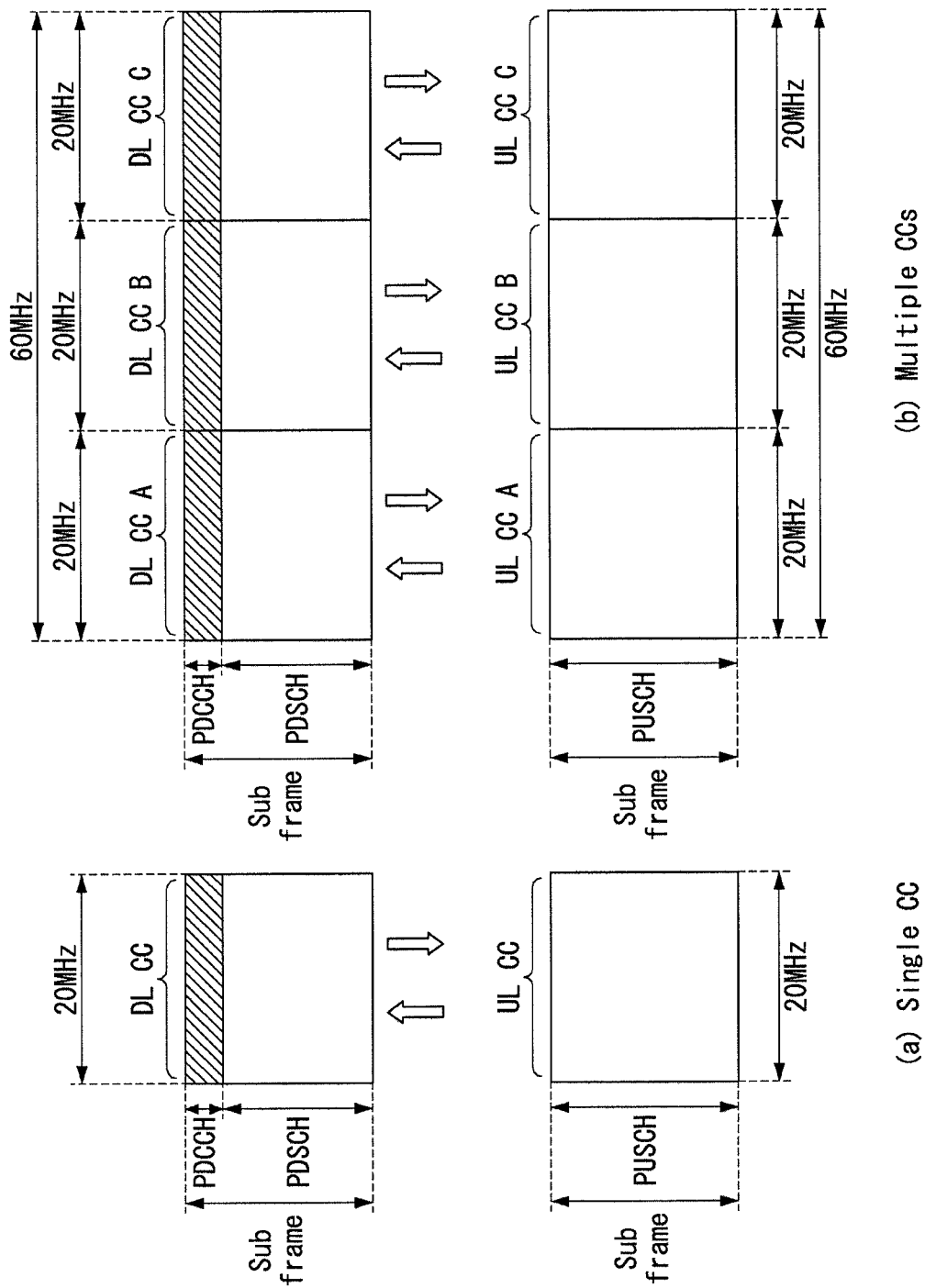

[Figure 8]
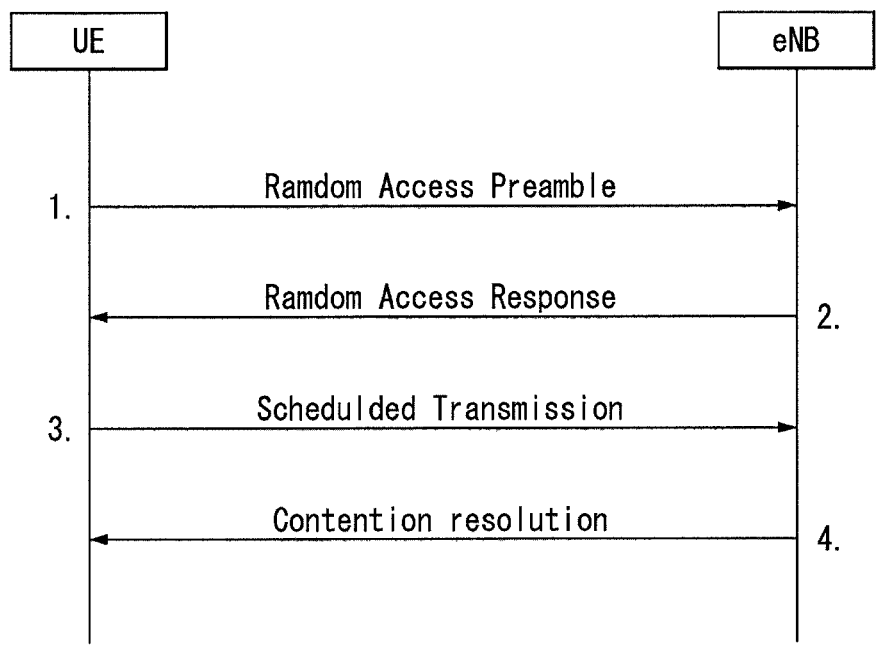

[Figure 9]
(a) 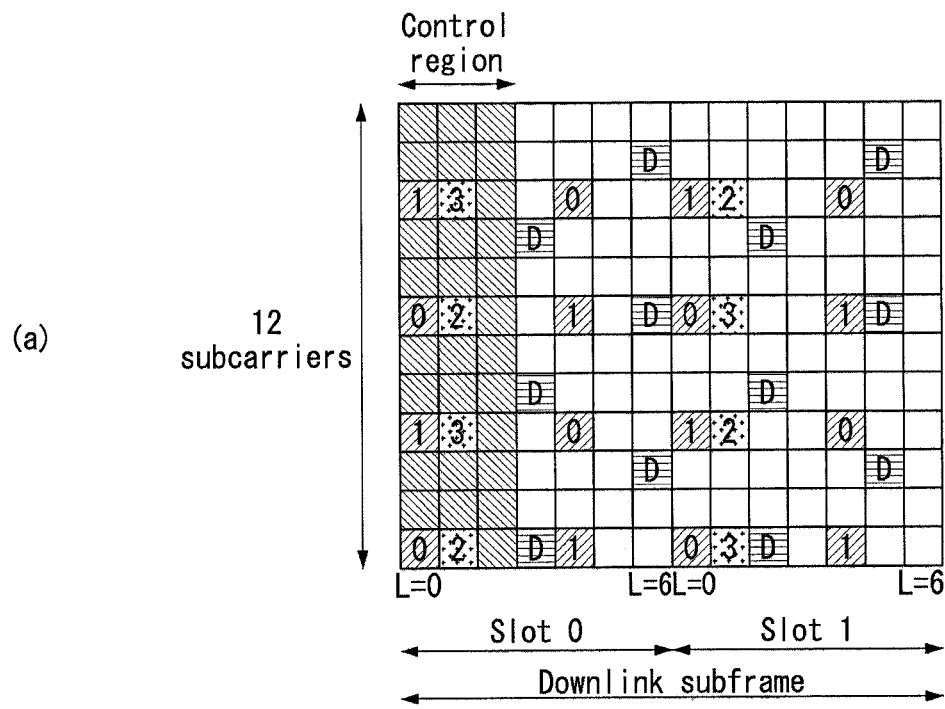
(b) 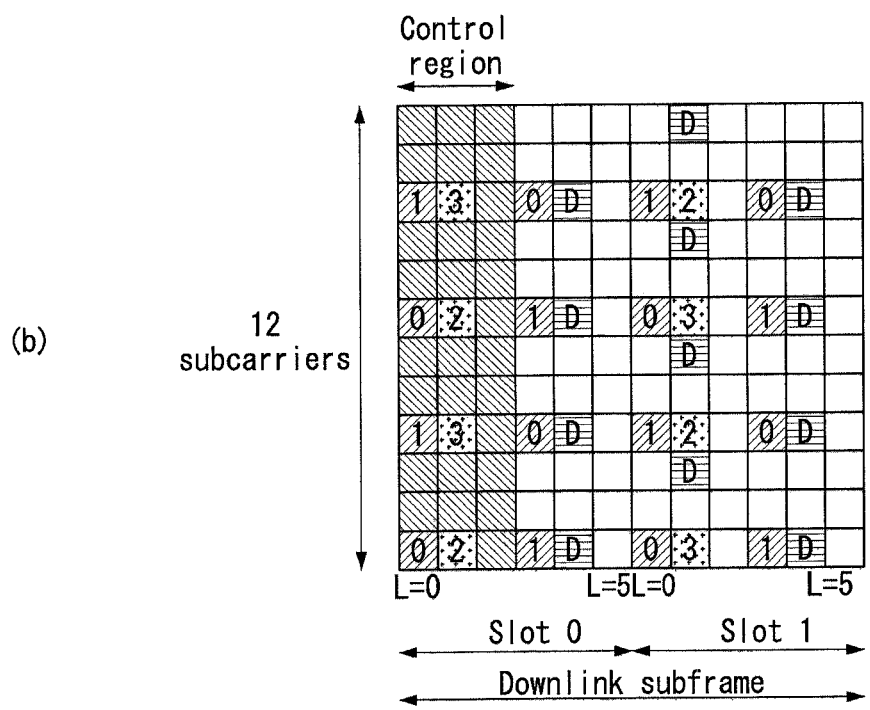

[Figure 10]
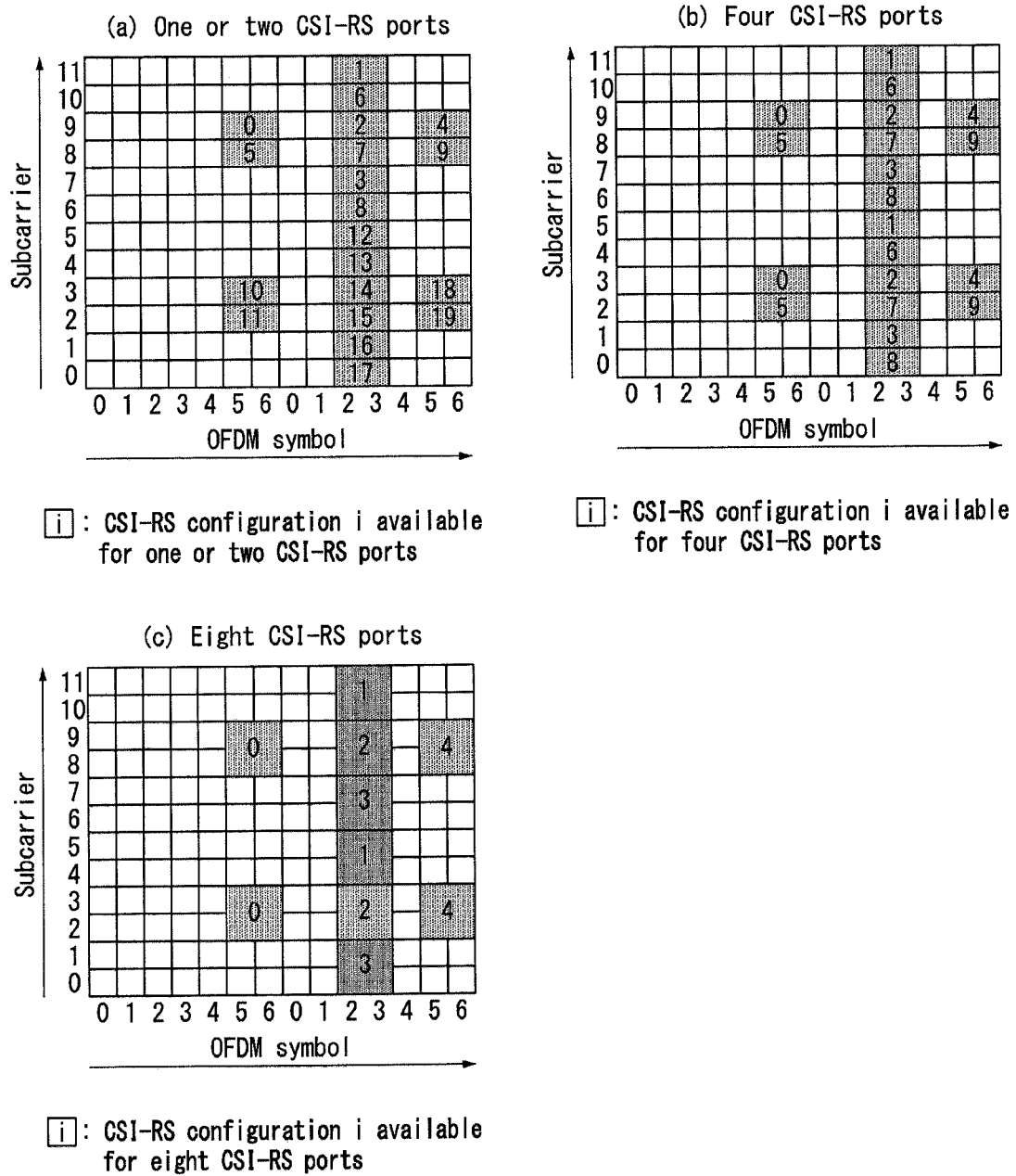

[Figure 11]
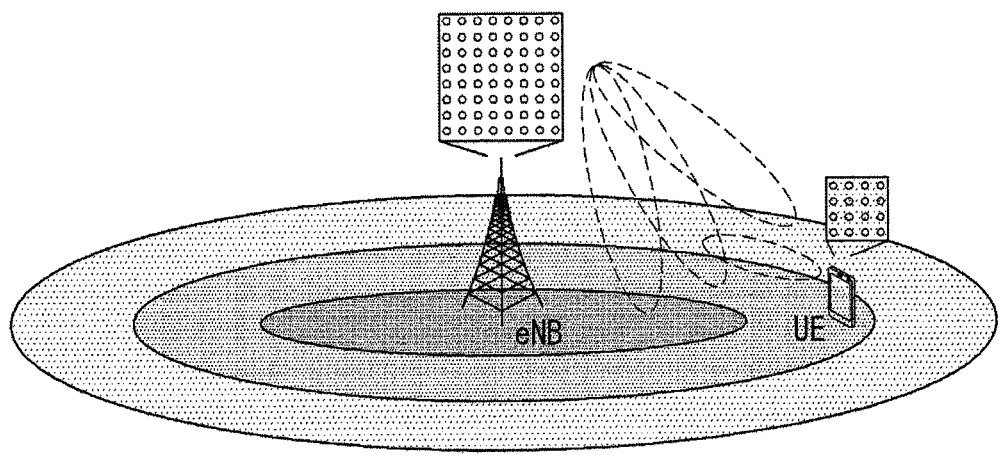

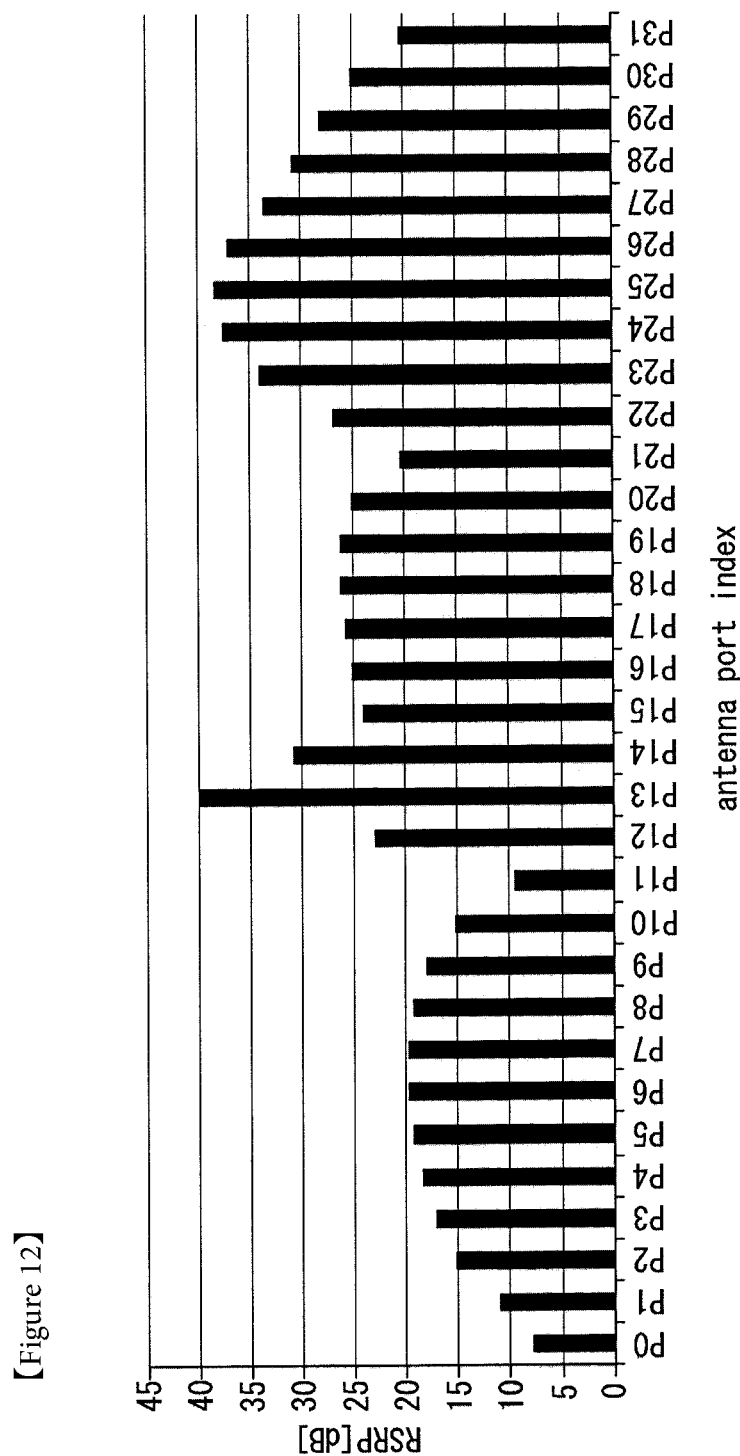
[Figure 12]

[Figure 13]

| Group index for level 4 grouping | 0 | | | | | | | | 1 | | | | | | | |
|---|---|---|---|---|---|---|---|---|---|---|---|---|---|---|---|---|
| Group index for level 3 grouping | 0 | | | | 1 | | | | 2 | | | | 3 | | | |
| Group index for level 2 grouping | 0 | | 1 | | 2 | | 3 | | 4 | | 5 | | 6 | | 7 | |
| Group index for level 1 grouping | 0 | 1 | 2 | 3 | 4 | 5 | 6 | 7 | 8 | 9 | 10 | 11 | 12 | 13 | 14 | 15 |
| | P0 | P1 | P2 | P3 | P4 | P5 | P6 | P7 | P8 | P9 | P10 | P11 | P12 | P13 | P14 | P15 |

【Figure 14】
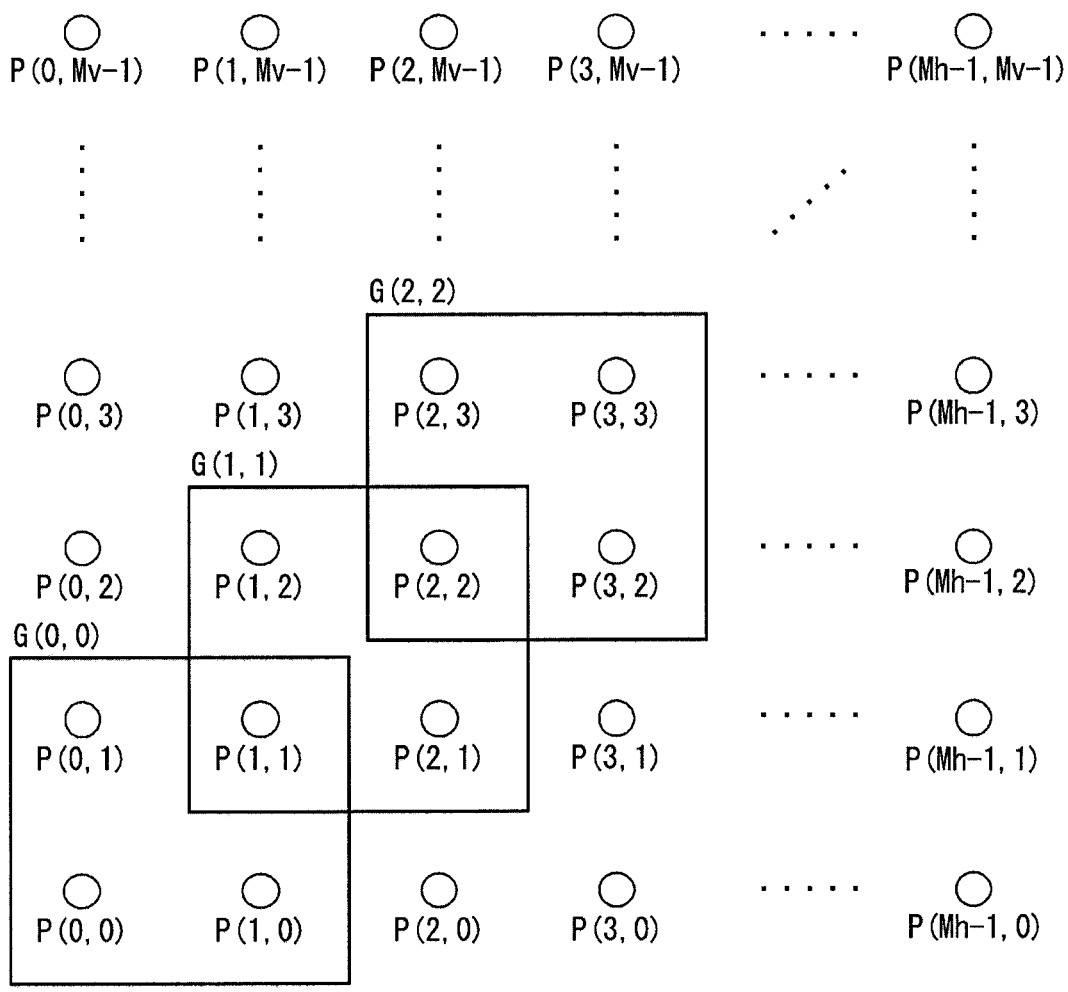

[Figure 15]
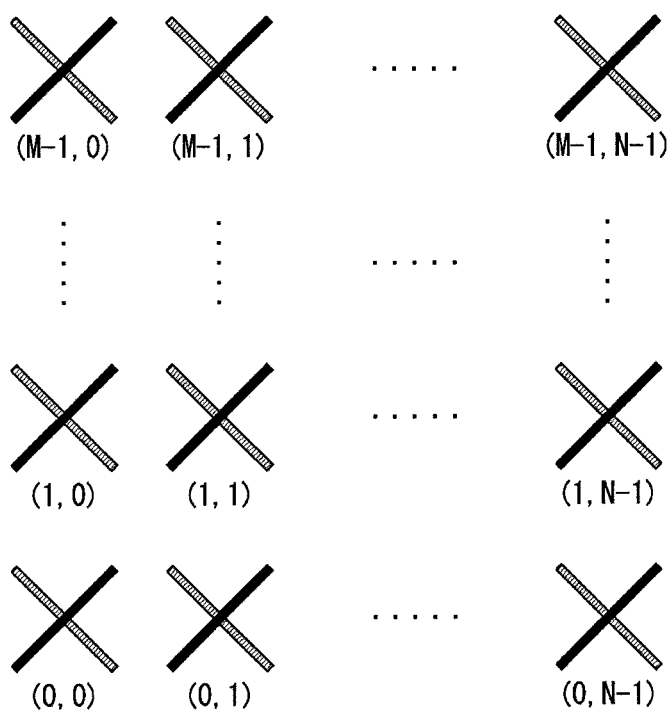

[Figure 16]
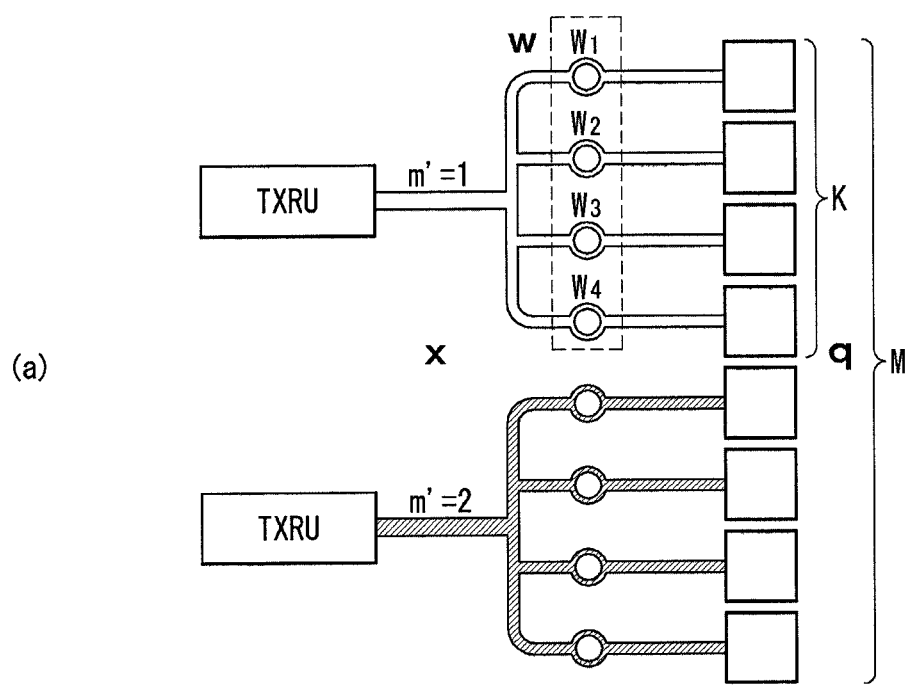
(a)
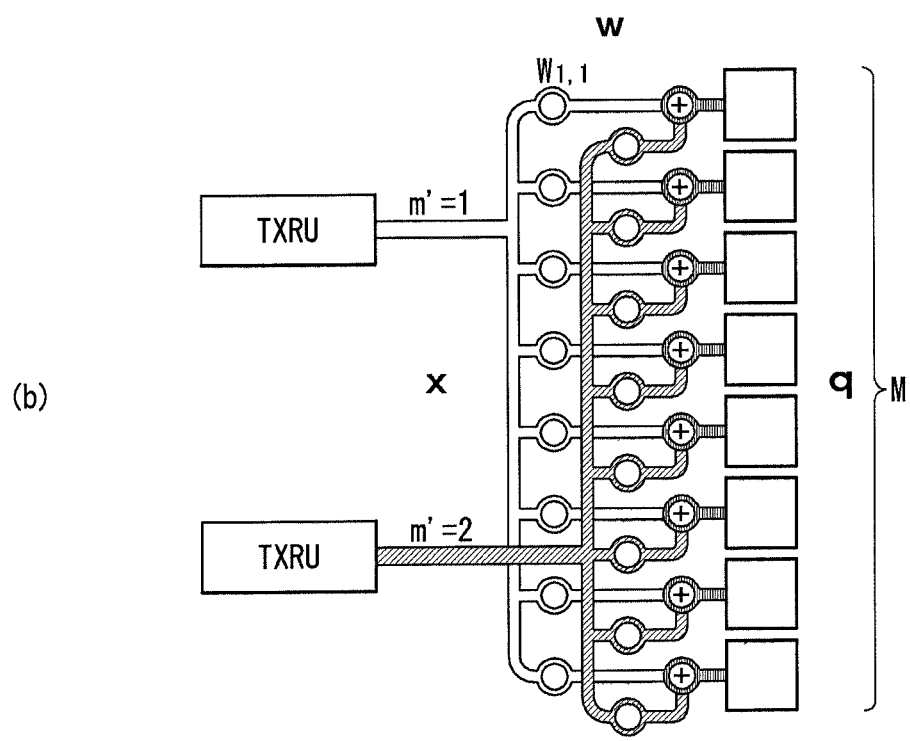
(b)

[Figure 17]
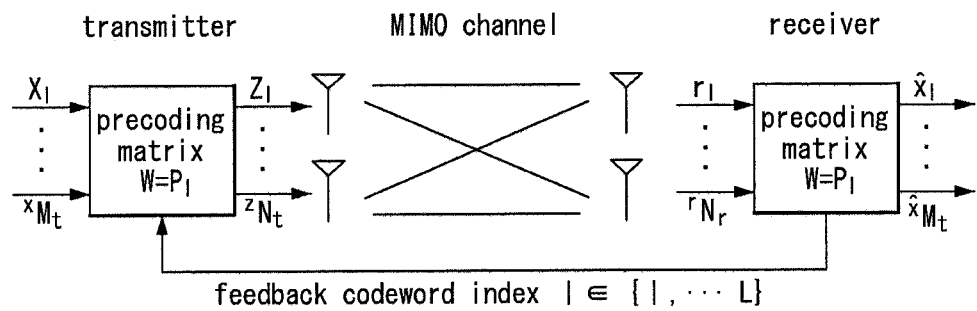
[Figure 18]
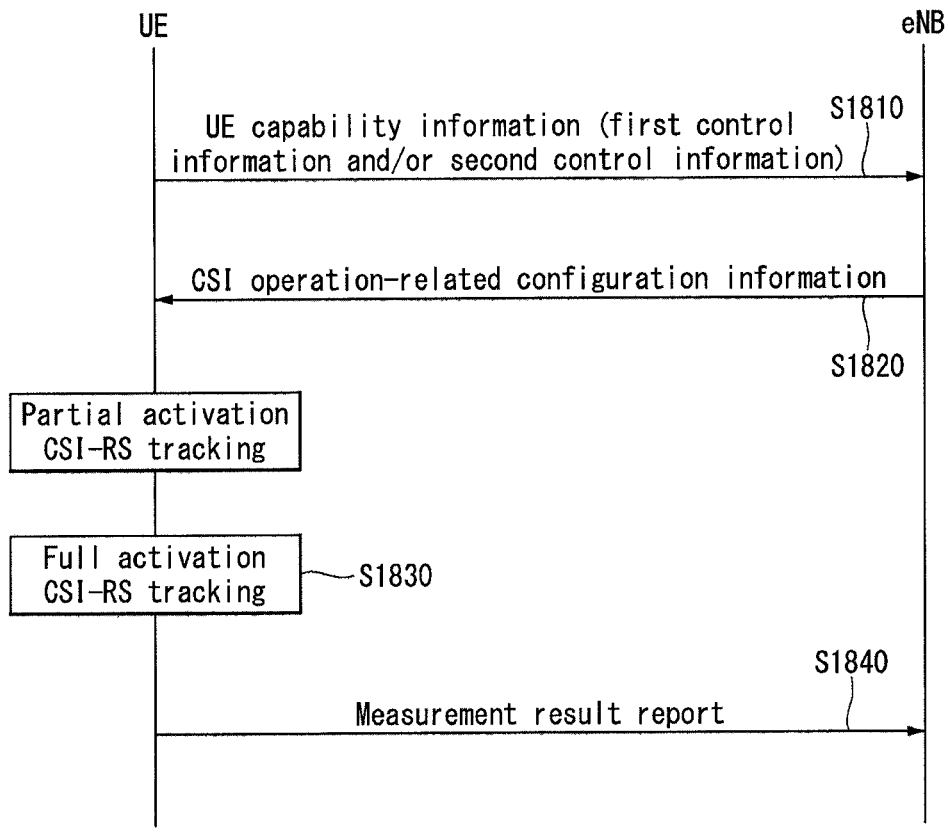

[Figure 19]
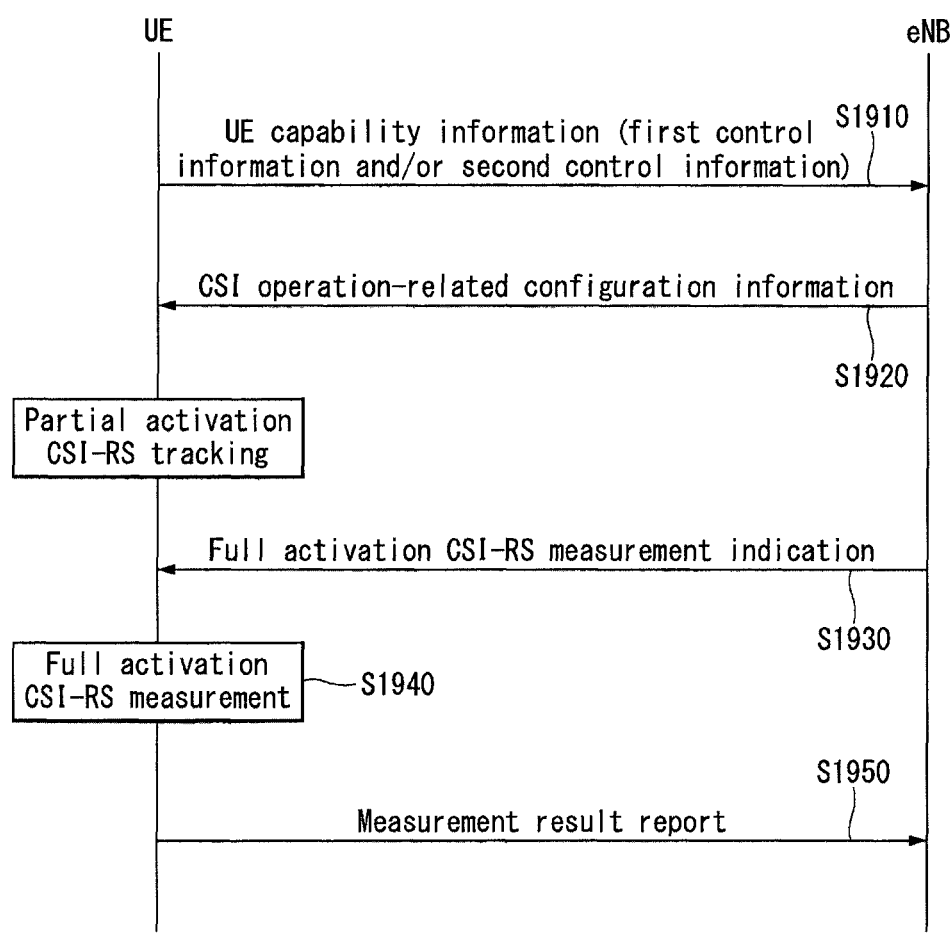

[Figure 20]
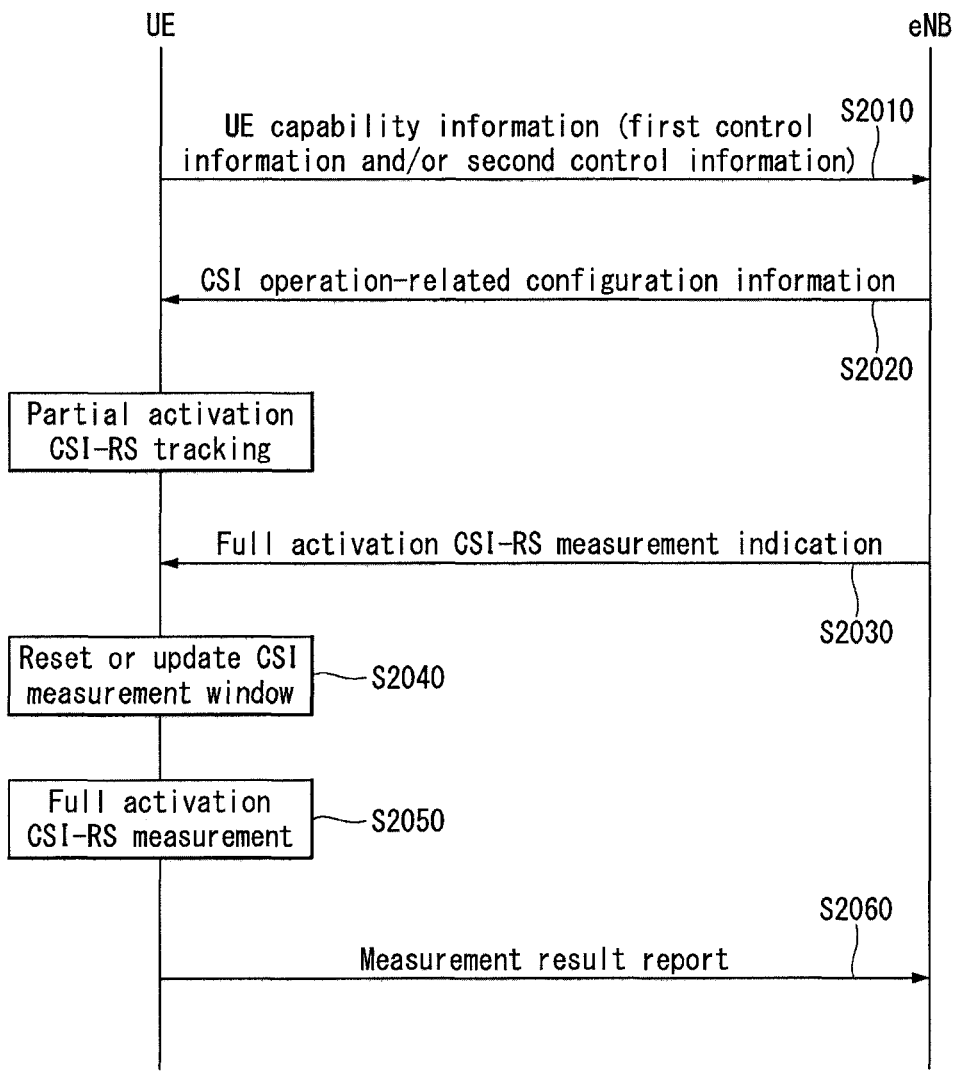
[Figure 21]
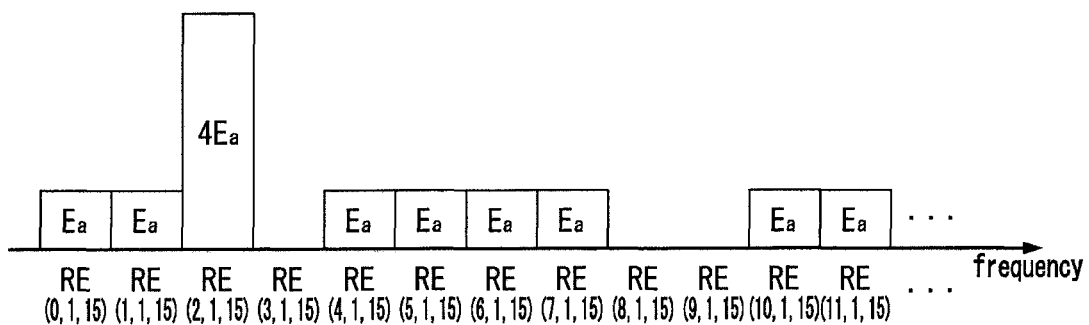

[Figure 22]
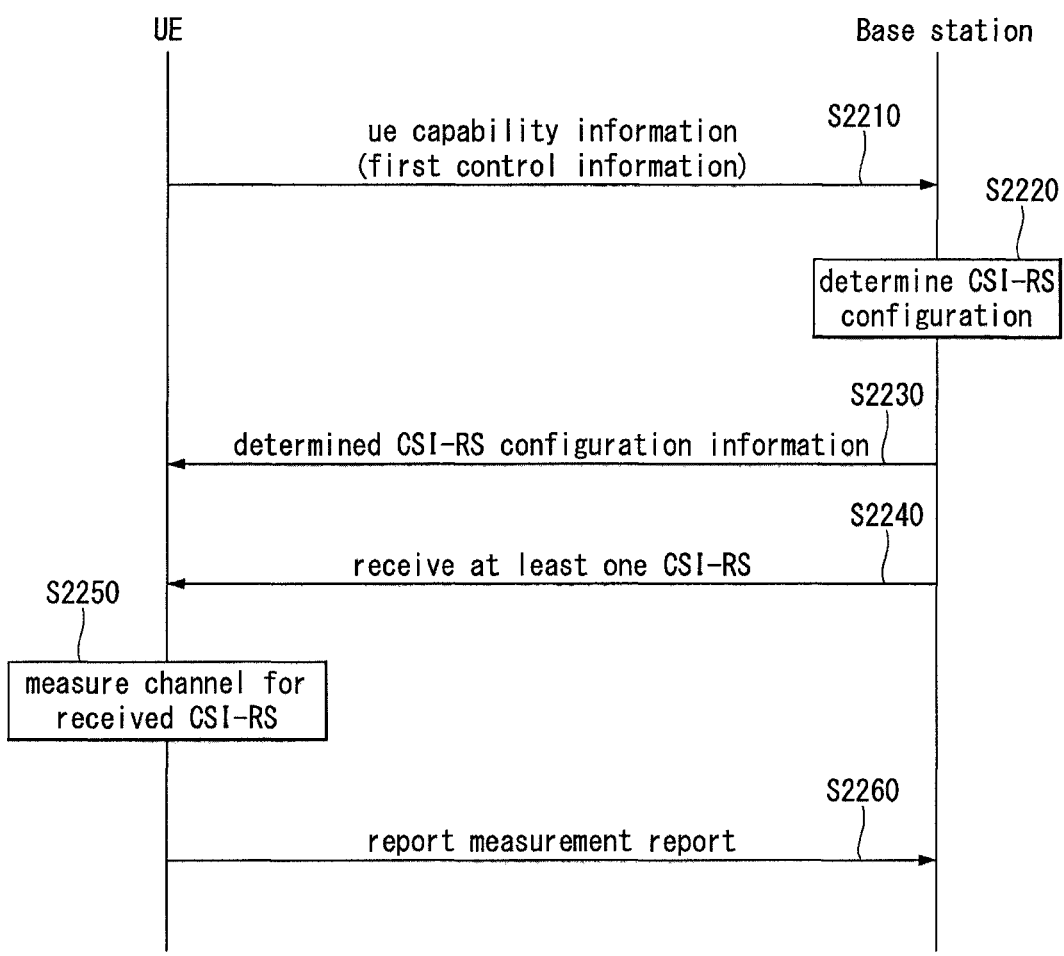

[Figure 23]
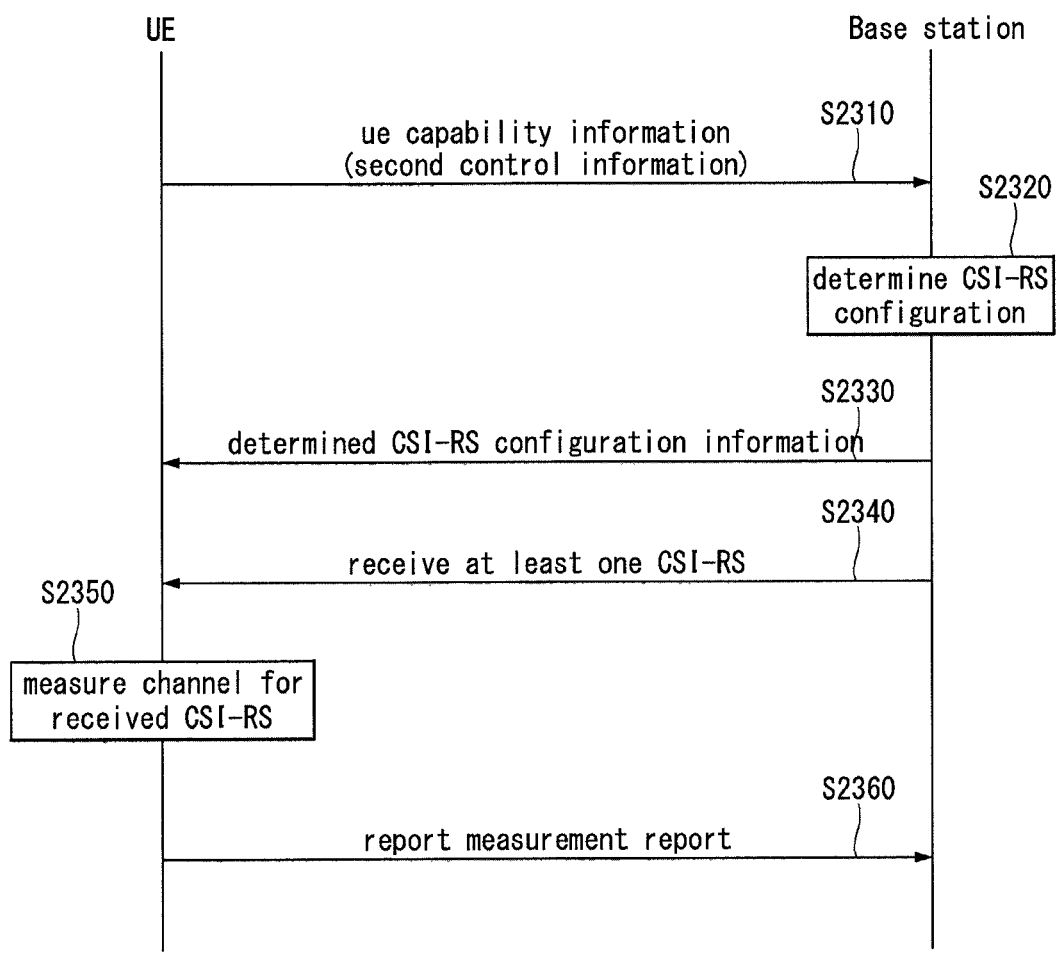

[Figure 24]
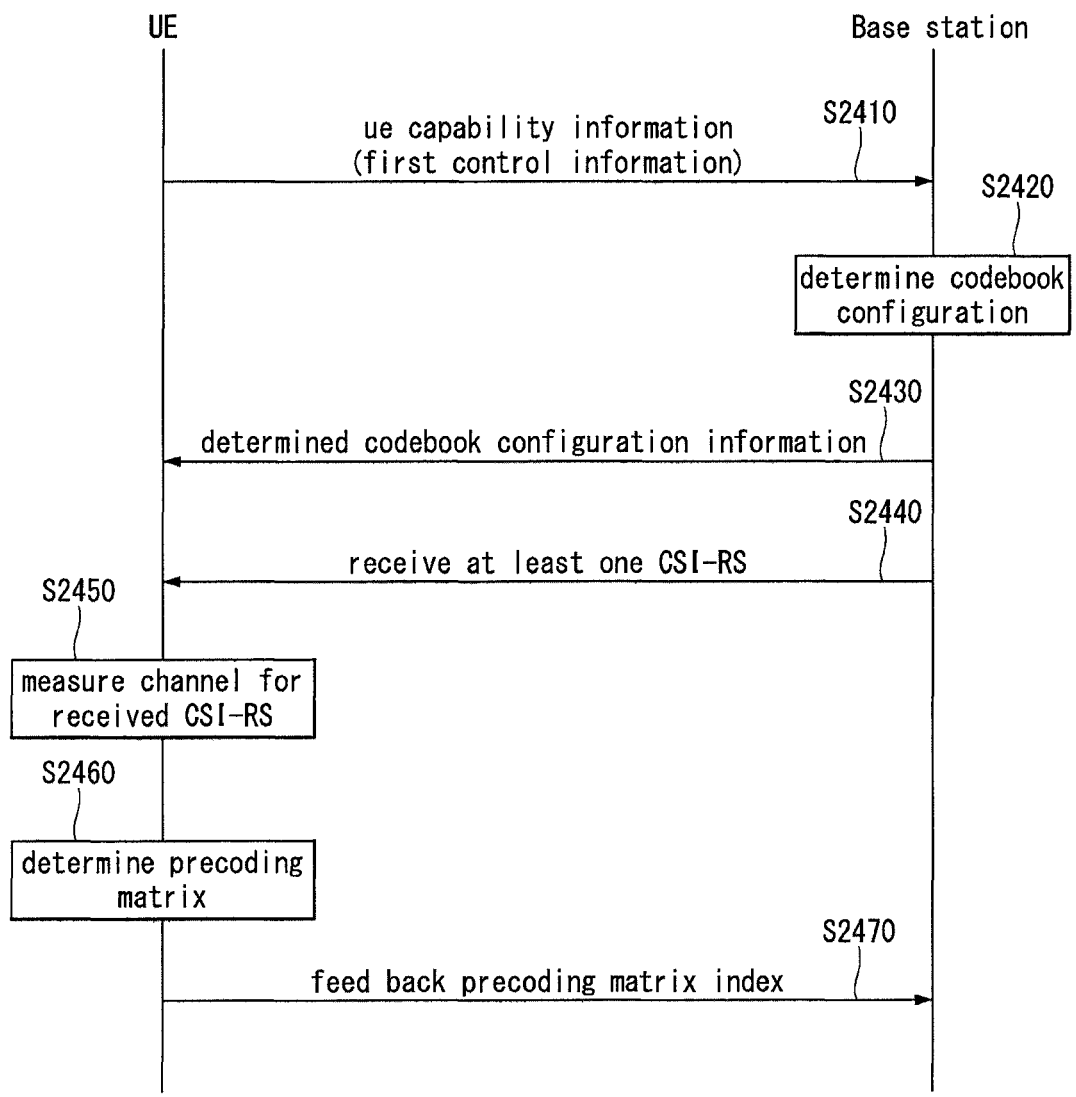

[Figure 25]
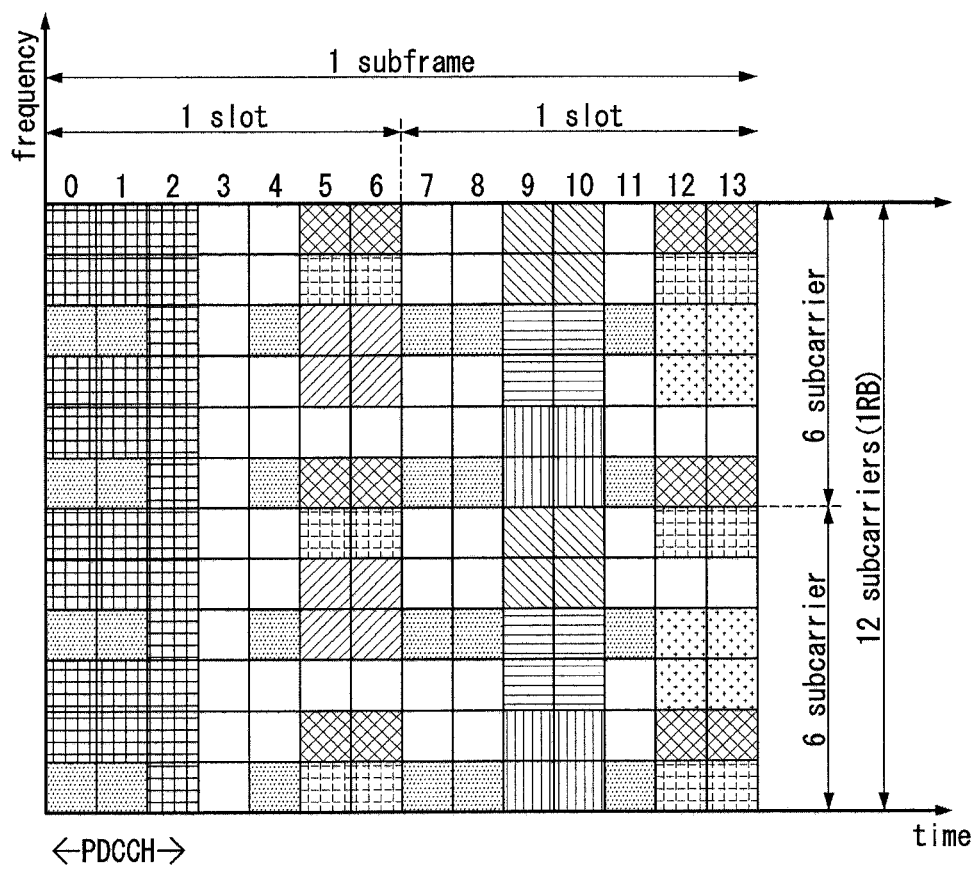

[Figure 26]
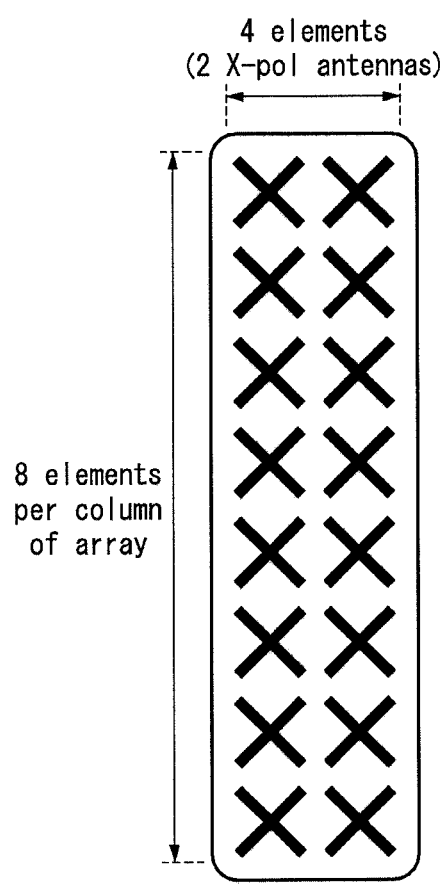

[Figure 27]
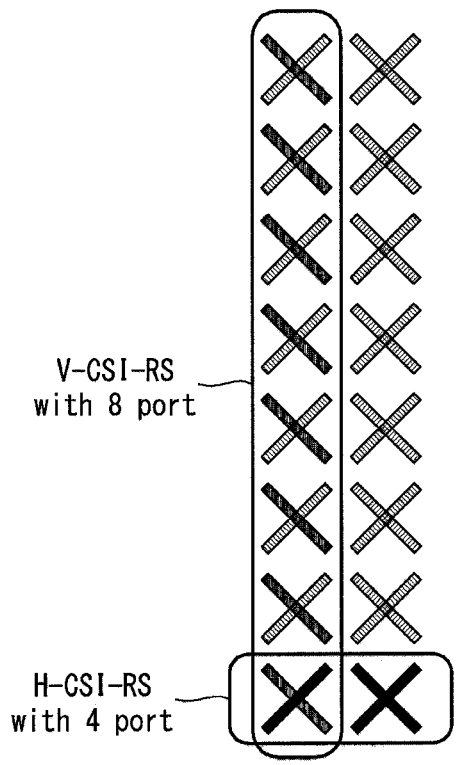
V-CSI-RS with 8 port
H-CSI-RS with 4 port
[Figure 28]
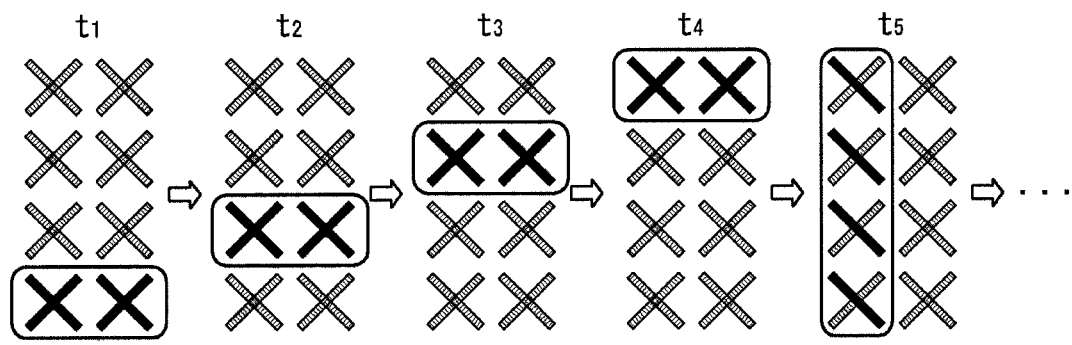

【Figure 29】
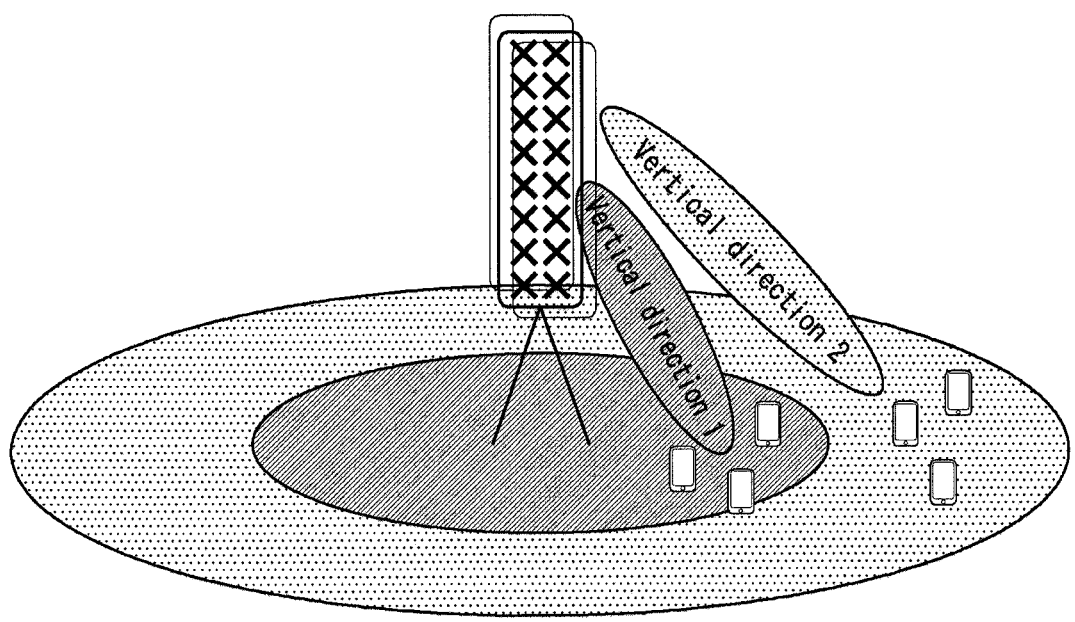
【Figure 30】
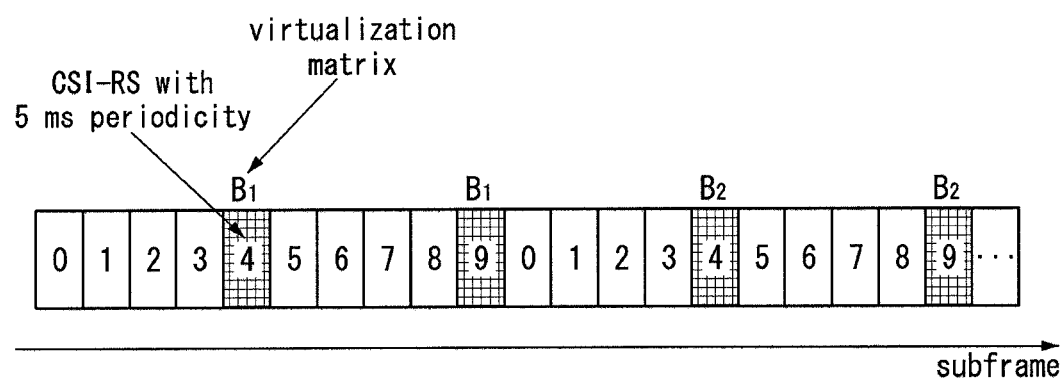

[Figure 32]
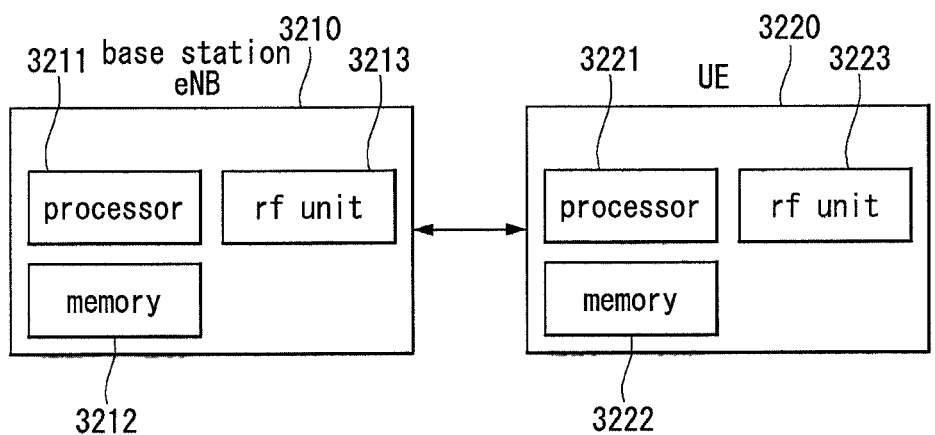

METHOD FOR REPORTING CHANNEL STATE INFORMATION IN WIRELESS COMMUNICATION SYSTEM AND DEVICE THEREFOR

CROSS-REFERENCE TO RELATED APPLICATIONS

This application is a Continuation of U.S. patent application Ser. No. 15/565,036 (now U.S. Pat. No. 10,536,199, issued on Jan. 14, 2020), filed on Oct. 6, 2017, which is the National Phase of PCT International Application No. PCT/KR2016/003778, filed on Apr. 11, 2016, which claims priority under 35 U.S.C. § 119(e) to U.S. Provisional Application No. 62/145,654, filed on Apr. 10, 2015, No. 62/204,967, filed on Aug. 13, 2015, No. 62/205,657, filed on Aug. 14, 2015, No. 62/208,808, filed on Aug. 23, 2015, No. 62/211,007, filed on Aug. 28, 2015, No. 62/238,707, filed on Oct. 8, 2015 and No. 62/251,650, filed on Nov. 5, 2015, all of these applications are hereby expressly incorporated by reference into the present application.

BACKGROUND OF THE INVENTION

Technical Field

The present invention relates to a wireless communication system, and more particularly, to a method for reporting channel state information (CSI) based on a reference signal by a UE and a device for supporting the same.

Background Art

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking. The present specification has been made in an effort to provide a method for transmitting/receiving terminal capability information including the maximum number of CSI-RS ports supported by a terminal in a specific CSI reporting type or class.

SUMMARY OF THE INVENTION

Further, the present specification has been made in an effort to provide a method for transmitting/receiving UE capability information including the maximum number of CSI-RS resources supported by a UE in a specific CSI reporting type or class.

In addition, the present specification has been made in an effort to provide a method for transmitting/receiving UE capability information including the number of CSI-RS port numbers supported for each CSI-RS resource in a specific CSI reporting type or class.

Moreover, the present specification has been made in an effort to provide a method for individually and independently transmitting information on the maximum number of CSI-RS resources and information on the number of CSI-RS ports supported for each CSI-RS resource.

Further, the present specification has been made in an effort to provide a method for transmitting/receiving UE capability information including codebook configuration information supported by a UE in a specific CSI reporting type or class.

In addition, the present specification has been made in an effort to provide a method for transmitting/receiving UE capability information including an SRS transmission type and/or a measurement restriction type supported by a UE in a specific CSI reporting type or class.

Moreover, the present specification has been made in an effort to provide a method for transmitting/receiving UE capability information including specific CSI reporting type information supported by a UE.

The technical objects of the present invention are not limited to the aforementioned technical objects, and other technical objects, which are not mentioned above, will be apparently appreciated by a person having ordinary skill in the art from the following description.

According to the present specification, a method for reporting channel state information (CSI) in a wireless communication system, which is performed by a UE includes: transmitting to a base station UE capability information including control information indicating a codebook configuration supported by the UE with respect to a specific class related with the CSI reporting; receiving CSI process related information including CSI-reference signal (RS) configuration information from the base station through high layer signaling; receiving at least one CSI-RS from the base station based on the received CSI process related information, the at least one CSI-RS being transmitted through at least one CSI-RS port of the base station; measuring a channel for the at least one CSI-RS port based on the at least received CSI-RS; and reporting the channel measurement result to the base station.

Further, in the present specification, a class type related with the CSI reporting includes at least one of Class A indicating a non-precoded CSI-RS based CSI reporting operation and Class B indicating a beamformed CSI-RS based CSI reporting operation.

In addition, in the present specification, the specific class is Class A indicating the non-precoded CSI-RS based CSI reporting operation.

Moreover, in the present specification, the UE capability information further includes SRS transmission type information related with whether to support only transmission of a periodic sounding reference signal (SRS), whether to support only transmission of an aperiodic SRS, whether to support both the periodic SRS transmission and the aperiodic SRS transmission, or whether not to support both the periodic SRS transmission and the aperiodic SRS transmission.

Further, in the present specification, the UE capability information further includes measurement restriction type information related with whether to support only channel measurement restriction (MR), whether to support only interference measurement restriction, whether to support both the channel measurement restriction and the interference measurement restriction, or whether not to support both the channel measurement restriction and the interference measurement restriction.

In addition, in the present specification, the measuring of the channel is performed based on the measurement restriction type information.

Moreover, in the present specification, the UE capability information further includes at least one of information indicating the number of horizontal antenna ports supported by the UE with respect to the specific class, information indicating the number of vertical antenna ports, a horizontal oversampling value, a vertical oversampling value, or information indicating whether to support code division multiplexing (CDM)-4.

Further, in the present specification, the UE capability information further includes information indicating whether to support the CSI reporting related class.

Moreover, in the present specification, the UE capability information is transmitted for each band or for each band combination.

Further, in the present specification, the UE capability information further includes information indicating the number of CSI-RS ports supported by one CSI-RS resource.

In addition, in the present specification, the high layer signaling includes any one codebook configuration of one or more codebook configurations announcing that the UE is capable of performing supporting through the UE capability information, and the measuring of the capacitance further includes selecting one antenna port group according to the any one codebook configuration.

Moreover, in the present specification, the UE capability information includes at least one of information indicating the number of additional supported uplink pilot time slot (UpPTS) symbols related with transmission of the SRS and demodulation reference signal (DMRS) and information indicating the number of supported combs related with the SRS transmission, and the combs indicates the number of subcarriers in a subcarrier interval in which the SRS is transmitted.

Further, according to the present specification, a UE for reporting channel state information (CSI) in a wireless communication system includes: a radio frequency (RF) unit for transmitting and receiving a radio signal; and a processor controlling the RF unit, and the processor controls to transmit to a base station UE capability information including control information indicating a codebook configuration supported by the UE with respect to a specific class related with the CSI reporting, receive CSI process related information including CSI-reference signal (RS) configuration information from the base station through high layer signaling, receive at least one CSI-RS from the base station based on the received CSI process related information, the at least one CSI-RS being transmitted through at least one CSI-RS port of the base station, measure a channel for the at least one CSI-RS port based on the at least received CSI-RS, and report the channel measurement result to the base station.

In the present specification, a CSI operation related parameter which may be supported by a UE, and the like are transmitted while being included in UE capability information, and as a result, a base station configures the CSI operation related parameter, and the like for the UE to reduce complexity of UE implementation.

Effects which can be obtained in the present invention are not limited to the aforementioned effects and other unmentioned effects will be clearly understood by those skilled in the art from the following description.

BRIEF DESCRIPTION OF THE DRAWINGS

The accompanying drawings, which are included a part of this specification to provide a further understanding of this document, provide embodiments of the present invention and together with the detailed description serve to explain the technical characteristics of the present invention.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows the configuration of a known multi-input multi-output (MIMO) antenna communication system.

FIG. 6 is a diagram illustrating channels from a plurality of transmission antennas to a single reception antenna.

FIG. 7 shows an example of component carriers and a component aggregation in a wireless communication system to which an embodiment of the present invention may be applied.

FIG. 8 is a diagram for illustrating a contention-based random access procedure in a wireless communication system to which an embodiment of the present invention may be applied.

FIG. 9 illustrates reference signal patterns mapped to downlink resource block pairs in a wireless communication system to which an embodiment of the present invention may be applied.

FIG. 10 is a diagram illustrating a CSI-RS configuration in a wireless communication system to which an embodiment of the present invention may be applied.

FIG. 11 illustrates a system having a plurality of transmission/reception antennas through which an eNB or a UE is capable of three-dimensional (3-D) beamforming based on an AAS in a wireless communication system to which an embodiment of the present invention may be applied.

FIG. 12 illustrates RSRP for each antenna port of an RRM-RS according to an embodiment of the present invention.

FIG. 13 illustrates RRM-RS antenna port grouping levels according to an embodiment of the present invention.

FIG. 14 is a diagram illustrating antenna ports and antenna port groups of RRM-RSs arrayed in 2-D indices according to an embodiment of the present invention.

FIG. 15 is a diagram illustrating one example of a polarization based 2D planar array model.

FIG. 16 is a diagram illustrating one example of a transceiver units (TXRUs) model.

FIG. 17 is a diagram for describing a basic concept of codebook based precoding.

FIG. 18 is a diagram illustrating one example of a method for measuring and reporting CSI.

FIG. 19 is a diagram illustrating another example of the method for measuring and reporting CSI.

FIG. 20 is a diagram illustrating yet another example of the method for measuring and reporting CSI.

FIG. 21 is a diagram illustrating one example of 6 DB RS power boosting for a frequency division multiplexed (FDM) RS.

FIG. 22 is a flowchart illustrating one example of a UE capability information signaling method proposed by the present specification.

FIG. 23 is a flowchart illustrating another example of the UE capability information signaling method proposed by the present specification.

FIG. 24 is a flowchart illustrating yet another example of the UE capability information signaling method proposed by the present specification.

FIG. 25 illustrates one example of an 8-port CSI-RS pattern in an existing PRB pair.

FIG. 26 is a diagram illustrating one example of a 2D-AAS antenna configuration.

FIG. 27 is a diagram illustrating one example of the 2D-AAS antenna configuration for a potential CSI-RS configuration.

FIG. 28 illustrates one example of a partial CSI-RS pattern for 16 cross-pole antenna elements.

FIG. 29 is a diagram illustrating one example for finding a vertical direction in a cell.

FIG. 30 is a diagram illustrating one example of concurrent CSI-RS transmission having multiple virtual matrixes.

FIG. 32 illustrates a block diagram of a wireless communication apparatus according to an embodiment of the present invention.

DESCRIPTION OF THE EMBODIMENTS

Figure 31A:
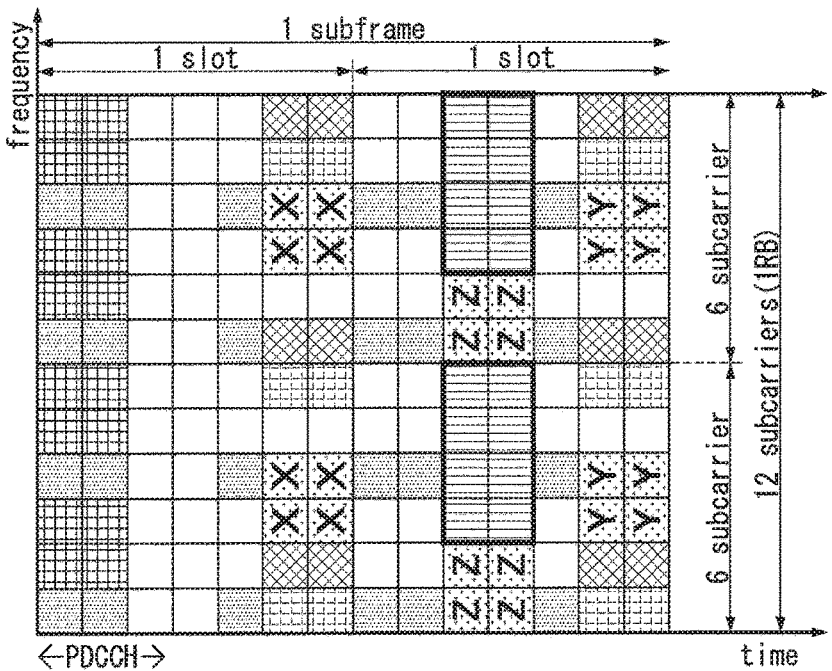
FIG. 31A illustrates one example of a method for designing 12 port non-precoded CSI-RS patterns.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General Wireless Communication System to which an Embodiment of the Present Invention May be Applied FIG. 1 shows the structure of a radio frame in a wireless communication system to which an embodiment of the present invention may be applied.

3GPP LTE/LTE-A support a type 1 radio frame structure capable of being applied to frequency division duplex (FDD) and a type 2 radio frame structure capable of being applied to time division duplex (TDD).

In FIG. 1, the size of the radio frame in a time domain is expressed in a multiple of a time unit "$T\_s=1/(15000*2048)$." Downlink and uplink transmission includes a radio frame having an interval of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of 153600*T_s=5 ms. Each of the half frames includes 5 subframes each having a length of 30720*T_s=1 ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

TABLE 2

| | Normal cyclic prefix in downlink | | | Extended cyclic prefix in downlink | | |
|---|---|---|---|---|---|---|
| | | UpPTS | | | UpPTS | |
| | | Normal | | | | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

More specifically, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, NT may be expressed as a vector given below because the maximum number of transmittable information is NT.

$$s = [s_1, s_2, \Lambda, s_{N_T}]^T \qquad \text{[Equation 2]}$$

Transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \Lambda, \hat{s}_{N_T}]^T = [P_1 s_1, P_2 s_2, \Lambda, P_{N_T} s_{N_T}]^T \qquad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \qquad \text{[Equation 4]}$$

The information vectors ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ M \\ x_i \\ M \\ x_{N_T} \end{bmatrix} = \qquad \text{[Equation 5]}$$

$$\begin{bmatrix} w_{11} & w_{12} & \Lambda & w_{1N_T} \\ w_{21} & w_{22} & \Lambda & w_{2N_T} \\ M & & O & M \\ w_{i1} & w_{i2} & \Lambda & w_{iN_T} \\ M & & O & M \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs$$

In Equation 5, wij represents a weight between the i-th transmitting antenna and j-th transmission information and W represents the weight as the matrix. The matrix W is called a weight matrix or a precoding matrix.

The transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

A method mixing the spatial multiplexing and the spatial diversity may also be considered. That is, for example, a case may also be considered in which the same signal is transmitted using the spatial diversity through three transmitting antennas and different signals are sent by spatial multiplexing through residual transmitting antennas.

Next, when NR receiving antennas are provided, received signals y1, y2, . . . , yNR of the respective antennas are expressed as a vector y as described below.

$$y=[y_1, y_2, \Lambda, y_{N_R}]^T \quad \text{[Equation 6]}$$

If channels are modeled in the MIMO antenna communication system, the channels may be distinguished based on transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T = [h_{i1}, h_{i2}, \Lambda, h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \quad \text{[Equation 8]}$$

Since additive white Gaussian noise (AWGN) is added after passing through a channel matrix H given above in an actual channel, white noises n1, n2, . . . , nNR added to NR receiving antennas, respectively are expressed as below.

$$n=[n_1, n_2, \Lambda, n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \begin{bmatrix} x_1 \\ x_2 \\ M \\ x_j \\ M \\ x_{N_T} \end{bmatrix} + \quad \text{[Equation 10]}$$

$$\begin{bmatrix} n_1 \\ n_2 \\ M \\ n_i \\ M \\ n_{N_R} \end{bmatrix} = Hx + n$$

The number of rows and columns of the channel matrix H representing the state of the channel is determined by the number of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In this specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, a multi-carrier means an aggregation of carriers (alternatively carrier aggregation). In this case, the aggregation of carriers means both an aggregation between continuous carriers and an aggregation between non-contiguous carriers. Further, the number of component carriers aggregated between downlink and uplink may be differently set. A case where the number of downlink component carriers (hereinafter referred to as a "DL CC") and the number of uplink component carriers (hereinafter, referred to as an "UL CC") are the same is referred to as a "symmetric aggregation", and a case where the number of downlink component carriers and the number of uplink component carriers are different is referred to as an "asymmetric aggregation." The carrier aggregation may be used interchangeably with a term, such as a bandwidth aggregation or a spectrum aggregation.

A carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell or S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively a primary CC). The terminal may be used to perform an initial connection establishment process or a connection re-establishment process and may be designated as a cell indicated during a handover process.

Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 7 illustrates examples of a component carrier and carrier aggregation in the wireless communication system to which the present invention can be applied.

FIG. 7a illustrates a single carrier structure used in an LTE system. The component carrier includes the DL CC and the UL CC. One component carrier may have a frequency range of 20 MHz.

FIG. 7b illustrates a carrier aggregation structure used in the LTE system. In the case of FIG. 7b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

If one or more S cells are configured in a UE, a network may activate or deactivate the configured S cell(s). A P cell is always activated. The network activates or deactivates the S cell(s) by sending an activation/deactivation MAC control element.

The activation/deactivation MAC control element has a fixed size and includes a single octet including seven C fields and one R field. The C field is configured for each S cell index "SCellIndex", and indicates the activation/deactivation state of the S cell. When the value of the C field is set to "1", it indicates that an S cell having a corresponding S cell index is activated. When the value of the C field is set to "0", it indicates that an S cell having a corresponding S cell index is deactivated.

Furthermore, the UE maintains a timer "sCellDeactivationTimer" for each configured S cell and deactivates a related S cell when the timer expires. The same initial value of the timer is applied to each instance of the timer "sCellDeactivationTimer" and set by RRC signaling. When the S cell(s) are added or after handover, initial S cell(s) are a deactivation state.

The UE performs the following operation on each of the configured S cell(s) in each TTI.

When the UE receives an activation/deactivation MAC control element that activates an S cell in a specific TTI (subframe n), the UE activates the S cell in a corresponding TTI (a subframe n+8 or thereafter) on predetermined timing and (re)starts a timer related to the corresponding S cell. What the UE activates the S cell means that the UE applies a common S cell operation, such as the transmission of a sounding reference signal (SRS), the reporting of a channel quality indicator (CQI)/precoding matrix indicator (PMI)/rank indication (RI)/precoding type indicator (PTI), the monitoring of a PDCCH and the monitoring of a PDCCH for an S cell on the S cell.

When the UE receives an activation/deactivation MAC control element that deactivates an S cell in a specific TTI (subframe n) or a timer related to a specific TTI (subframe n)-activated S cell expires, the UE deactivates the S cell in a corresponding TTI (subframe n+8 or thereafter) on predetermined timing, stops the timer of the corresponding S cell, and flushes all of HARQ buffers related to the corresponding S cell.

If a PDCCH on an activated S cell indicates an uplink grant or downlink assignment or a PDCCH on a serving cell that schedules the activated S cell indicates an uplink grant or downlink assignment for the activated S cell, the UE restarts a timer related to the corresponding S cell.

When the S cell is deactivated, the UE does not send an SRS on the S cell, does not report a CQI/PMI/RI/PTI for the S cell, does not send an UL-SCH on the S cell, and does not monitor a PDCCH on the S cell.

Random Access Procedure

A random access procedure provided by LTE/LTE-A systems is described below.

The random access procedure is used for a UE to obtain uplink synchronization with an eNB or to have uplink radio resources allocated thereto. When the UE is powered on, the UE obtains downlink synchronization with an initial cell and receives system information. The UE obtains information about a set of available random access preambles and radio resources used to send a random access preamble from the system information. The radio resources used to send the random access preamble may be specified as a combination of at least one subframe index and an index in a frequency domain. The UE sends a random access preamble randomly selected from the set of random access preambles. An eNB that has received the random access preamble sends a timing alignment (TA) value for uplink synchronization to the UE through a random access response. Accordingly, the UE obtains uplink synchronization.

The random access procedure is common to frequency division duplex (FDD) and time division duplex (TDD). The random access procedure is not related to a cell size and is also not related to the number of serving cells if a component aggregation (CA) has been configured.

First, the UE may perform the random access procedure as in the following cases.

If the UE performs initial access in the RRC idle state because it does not have RRC connection with the eNB If the UE performs an RRC connection re-establishment procedure If the UE first accesses a target cell in a handover process If the random access procedure is requested by a command from the eNB If there is data to be transmitted in downlink in an uplink non-synchronized situation during the RRC connection state If there is a data to be transmitted in uplink in an uplink non-synchronized situation or in a situation in which designated radio resources used to request radio resources have not been allocated during the RRC connection state If the positioning of the UE is performed in a situation in which timing advance is necessary during the RRC connection state If a recovery process is performed when a radio link failure or handover failure occurs In 3GPP Rel-10, a method for applying a timing advance (TA) value applicable to one specific cell (e.g., a P cell) to a plurality of cells in common in a radio access system supporting a component aggregation has been taken into consideration. A UE may aggregate a plurality of cells belonging to different frequency bands (i.e., greatly spaced apart on the frequency) or a plurality of cells having different propagation properties. Furthermore, in the case of a specific cell, in order to expand coverage or remove a coverage hole, if the UE performs communication with an eNB (i.e., a macro eNB) through one cell and performs communication with a secondary eNB (SeNB) through the other cell in a situation in which a remote radio header (RRH) (i.e., repeater), a small cell such as a femto cell or a pico cell, or the SeNB has been disposed within the cell, a plurality of cells may have different delay properties. In this case, if the UE performs uplink transmission using a method for applying one TA value to a plurality of cells in common, the synchronization of an uplink signal transmitted on the plurality of cells may be severely influenced. Accordingly, a plurality of TAs may be used in a CA situation in which a plurality of cells has been aggregated. In 3GPP Rel-11, in order to support multiple TAs, the independent allocation of the TAs may be taken into consideration for each specific cell group. This is called a TA group (TAG). The TAG may include one or more cells. The same TA may be applied to one or more cells included in a TAG in common. In order to support such multiple TAs, an MAC TA command control element includes a TAG identity (ID) of 2 bits and a TA command field of 6 bits.

A UE in which a CA has been configured performs a random access procedure if it performs the random access procedure in relation to a P cell. In the case of a TAG to which the P cell belongs (i.e., a primary TAG (pTAG)), as in a conventional technology, TA determined based on the P cell or coordinated through a random access procedure involved in the P cell may be applied to all of cell(s) within the pTAG. In contrast, in the case of a TAG including only an S cell (i.e., a secondary TAG (sTAG)), TA determined based on a specific S cell within the sTAG may be applied to all of cell(s) within the corresponding sTAG. In this case, the TA may be obtained by a random access procedure initiated by an eNB. More specifically, the S cell is configured as a random access channel (RACH) resource within the sTAG. In order to determine the TA, the eNB requests RACH access in the S cell. That is, the eNB initiates RACH transmission on S cells in response to a PDCCH order transmitted in the P cell. A response message for an S cell preamble is transmitted through a P cell using an RA-RNTI. The UE may apply TA, determined based on an S cell to which random access has been successfully completed, to all of cell(s) within a corresponding sTAG. As described above, the random access procedure may be performed even in an S cell in order to obtain the TA of an sTAG to which the S cell belongs even in the corresponding S cell.

An LTE/LTE-A system provides a contention-based random access procedure for randomly selecting, by a UE, one preamble within a specific set and using the selected preamble and a non-contention-based random access procedure for using a random access preamble allocated to only a specific UE by an eNB in a process of selecting a random access preamble (RACH preamble). In this case, the non-contention-based random access procedure may be used for only UE positioning and/or timing advance alignment for an sTAG if it is requested in the handover process or in response to a command from the eNB. After the random access procedure is completed, common uplink/downlink transmission is performed.

A relay node (RN) also supports both the contention-based random access procedure and the non-contention-based random access procedure. When a relay node performs the random access procedure, it suspends an RN subframe configuration at that point of time. That is, this means that it temporarily discards an RN subframe. Thereafter, an RN subframe configuration is restarted at a point of time at which a random access procedure is successfully completed.

FIG. 8 is a diagram for illustrating a contention-based random access procedure in a wireless communication system to which an embodiment of the present invention may be applied.

(1) First Message (Msg 1 or Message 1)

First, UE randomly selects one random access preamble (RACH preamble) from a set of random access preambles indicated by system information or a handover command, selects a physical RACH (PRACH) resource capable of sending the random access preamble, and sends the selected physical RACH (PRACH).

The random access preamble is transmitted through 6 bits in an RACH transport channel. The 6 bits include a random identity of 5 bits for identifying the UE that has performed RACH transmission and 1 bit (e.g., indicate the size of a third message Msg3) for indicating additional information.

An eNB that has received the random access preamble from the UE decodes the random access preamble and obtains an RA-RNTI. The RA-RNTI related to the PRACH in which the random access preamble has been transmitted is determined by the time-frequency resource of the random access preamble transmitted by the corresponding UE.

(2) Second Message (Msg 2 or Message 2)

The eNB sends a random access response, addressed by the RA-RNTI obtained through the preamble on the first message, to the UE. The random access response may include a random access (RA) preamble index/identifier, uplink (UL) assignment providing notification of uplink radio resources, a temporary C-RNTI, and a time alignment command (TAC). The TAC is information indicative of a time alignment command that is transmitted from the eNB to the UE in order to maintain uplink time alignment. The UE updates uplink transmission timing using the TAC. When the UE updates time synchronization, it initiates or restarts a time alignment timer. An UL grant includes uplink resource allocation used for the transmission of a scheduling message (third message) to be described later and a transmit power command (TPC). The TPC is used to determine transmission power for a scheduled PUSCH.

After the UE sends the random access preamble, it attempts to receive its own random access response within a random access response window indicated by the eNB through system information or a handover command, detects a PDCCH masked with an RA-RNTI corresponding to the PRACH, and receives a PDSCH indicated by the detected PDCCH. Information about the random access response may be transmitted in the form of a MAC packet data unit (PDU). The MAC PDU may be transferred through the PDSCH. The PDCCH may include information about the UE that needs to receive the PDSCH, information about the frequency and time of the radio resources of the PDSCH, and the transmission format of the PDSCH. As described above, once the UE successfully detects the PDCCH transmitted thereto, it may properly receive the random access response transmitted through the PDSCH based on the pieces of information of the PDCCH.

The random access response window means a maximum time interval during which the UE that has sent the preamble waits to receive the random access response message. The random access response window has a length of "ra-ResponseWindowSize" that starts from a subframe subsequent to three subframes from the last subframe in which the preamble is transmitted. That is, the UE waits to receive the random access response during a random access window secured after three subframes from a subframe in which the preamble has been transmitted. The UE may obtain the parameter value of a random access window size "ra-ResponseWindowsize" through the system information. The random access window size may be determined to be a value between 2 and 10.

When the UE successfully receives the random access response having the same random access preamble index/identifier as the random access preamble transmitted to the eNB, it suspends the monitoring of the random access response. In contrast, if the UE has not received a random access response message until the random access response window is terminated or the UE does not receive a valid random access response having the same random access preamble index as the random access preamble transmitted to the eNB, the UE considers the reception of a random access response to be a failure and then may perform preamble retransmission.

As described above, the reason why the random access preamble index is necessary for the random access response is to provide notification that an UL grant, a TC-RNTI and a TAC are valid for which UE because random access response information for one or more UEs may be included in one random access response.

(3) Third Message (Msg 3 or Message 3)

When the UE receives a valid random access response, it processes each of pieces of information included in the random access response. That is, the UE applies a TAC to each of the pieces of information and stores a TC-RNTI. Furthermore, the UE sends data, stored in the buffer of the UE, or newly generated data to the eNB using an UL grant. If the UE performs first connection, an RRC connection request generated in the RRC layer and transferred through a CCCH may be included in the third message and transmitted. In the case of an RRC connection re-establishment procedure, an RRC connection re-establishment request generated in the RRC layer and transferred through a CCCH may be included in the third message and transmitted. Furthermore, the third message may include an NAS access request message.

The third message may include the identity of the UE. In the contention-based random access procedure, the eNB is unable to determine which UE can perform the random access procedure. The reason for this is that the UE has to be identified in order to perform a collision resolution.

A method for including the identity of UE includes two methods. In the first method, if UE has already had a valid cell identity (C-RNTI) allocated in a corresponding cell prior to a random access procedure, the UE sends its own cell identity through an uplink transmission signal corresponding to an UL grant. In contrast, if a valid cell identity has not been allocated to the UE prior to a random access procedure, the UE includes its own unique identity (e.g., an S-TMSI or a random number) in an uplink transmission signal and sends the uplink transmission signal. In general, the unique identity is longer than a C-RNTI. In transmission on an UL-SCH, UE-specific scrambling is used. In this case, if a C-RNTI has not been allocated to the UE, the scrambling may not be based on the C-RNTI, and instead a TC-RNTI received in a random access response is used. If the UE has sent data corresponding to the UL grant, it initiates a timer for a collision resolution (i.e., a contention resolution timer).

(4) Fourth Message (Msg 4 or Message 4)

When the C-RNTI of the UE is received through the third message from the UE, the eNB sends a fourth message to the UE using the received C-RNTI. In contrast, when the eNB receives a unique identity (i.e., an S-TMSI or a random number) through the third message from the UE, it sends the fourth message to the UE using a TC-RNTI allocated to the corresponding UE in a random access response. In this case, the fourth message may correspond to an RRC connection setup message including a C-RNTI.

After the UE sends data including its own identity through the UL grant included in the random access response, it waits for an instruction from the eNB for a collision resolution. That is, the UE attempts to receive a PDCCH in order to receive a specific message. A method for receiving the PDCCH includes two methods. As described above, if the third message transmitted in response to the UL grant includes a C-RNTI as its own identity, the UE attempts the reception of a PDCCH using its own C-RNTI. If the identity is a unique identity (i.e., an S-TMSI or a random number), the UE attempts the reception of a PDCCH using a TC-RNTI included in the random access response. Thereafter, in the former case, if the UE has received a PDCCH through its own C-RNTI before a collision resolution timer expires, the UE determines that the random access procedure has been normally performed and terminates the random access procedure. In the latter case, if the UE has received a PDCCH through a TC-RNTI before a collision resolution timer expires, the UE checks data in which a PDSCH indicated by the PDCCH is transferred. If, as a result of the check, it is found that the unique identity of the UE has been included in the contents of the data, the UE determines that the random access procedure has been normally performed and terminates the random access procedure. The UE obtains the C-RNTI through the fourth message. Thereafter, the UE and a network send or receive a UE-dedicated message using the C-RNTI.

A method for a collision resolution in random access is described below.

The reason why a collision occurs in performing random access is that the number of random access preambles is basically limited. That is, a UE randomly selects one of common random access preambles and sends the selected random access preamble because an eNB cannot assign a random access preamble unique to a UE to all of UEs. Accordingly, two or more UEs may select the same random access preamble and send it through the same radio resources (PRACH resource), but the eNB determines the received random access preambles to be one random access preamble transmitted by one UE. For this reason, the eNB sends a random access response to the UE, and expects that the random access response will be received by one UE. As described above, however, since a collision may occur, two or more UEs receive one random access response and thus the eNB performs an operation according to the reception of each random access response for each UE. That is, there is a problem in that the two or more UEs send different data through the same radio resources using one UL grant included in the random access response. Accordingly, the transmission of the data may all fail, and the eNB may receive only the data of a specific UE depending on the location or transmission power of the UEs. In the latter case, all of the two or more UEs assume that the transmission of their data was successful, and thus the eNB has to notify UEs that have failed in the contention of information about the failure. That is, providing notification of information about the failure or success of the contention is called a collision resolution.

A collision resolution method includes two methods. One method is a method using a collision resolution timer, and the other method is a method of sending the identity of a UE that was successful in a contention to other UEs. The former method is used when a UE already has a unique C-RNTI prior to a random access process. That is, the UE that has already had the C-RNTI sends data, including its own C-RNTI, to an eNB in response to a random access response, and drives a collision resolution timer. Furthermore, when PDCCH information indicated by its own C-RNTI is received before the collision resolution timer expires, the UE determines that it was successful in the contention and normally terminates the random access. In contrast, if the UE does not receive a PDCCH indicated by its own C-RNTI before the collision resolution timer expires, the UE determines that it failed in the contention and may perform a random access process again or may notify a higher layer of the failure of the contention. In the latter method of the two contention resolution methods, that is, the method of sending the identity of a successful UE, is used if a UE does not have a unique cell identity prior to a random access process. That is, if the UE does not have its own cell identity, the UE includes an identity (or an S-TMSI or a random number) higher than the cell identity in data based on UL grant information included in a random access response, sends the data, and drives a collision resolution timer. If data including its own higher identity is transmitted through a DL-SCH before the collision resolution timer expires, the UE determines that the random access process was successful. In contrast, if data including its own higher identity is not received through a DL-SCH before the collision resolution timer expires, the UE determines that the random access process has failed.

Unlike in the contention-based random access procedure shown in FIG. 8, the operation in the non-contention-based random access procedure is terminated by only the transmission of the first message and the second message. In this case, before a UE sends a random access preamble to an eNB as the first message, the eNB allocates the random access preamble to the UE, and the UE sends the allocated random access preamble to the eNB as the first message and receives a random access response from the eNB. Accordingly, the random connection procedure is terminated.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 9 illustrates a reference signal pattern mapped to a downlink resource block pair in the wireless communication system to which the present invention can be applied.

Referring to FIG. 9, as a unit in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 9*a*) and a length of 12 OFDM symbols in the case of an extended cyclic prefix (CP) (FIG. 9*b*). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

The DRS is described in more detail below. The DRS is used to demodulate data. Precoding weight used for a specific UE in MIMO antenna transmission is used without any change in order for a UE to estimate a corresponding channel in association with a transport channel transmitted in each transmission antenna when the UE receives a reference signal.

The 3GPP LTE system (e.g., Release-8) supports up to a maximum of four transmission antennas, and a DRA for rank 1 beamforming is defined. The DRS for rank 1 beamforming further indicates a reference signal an antenna port index 5.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes four or more downlink transmitting antennas and maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band of each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which the UE belong such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

The CSI-RS is transmitted through 1, 2, 4 or 8 antenna ports. In this case, the antenna port which is used is p=15, p=15,16, p=15, . . . , 18, or p=15, . . . , 22. The CSI-RS may be defined only for the subcarrier interval $\Delta f=15$ kHz.

(k',l') (herein, k' is a subcarrier index in a resource block, and l' represents an OFDM symbol index in a slot) and the condition of $n_s$ is determined according to the CSI-RS configuration shown in Table 3 or Table 4 below.

Table 3 exemplifies the mapping of (k',l') according to the CSI-RS configuration for the normal CP.

TABLE 3

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6. 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 exemplifies the mapping of (k',l') according to the CSI-RS configuration for the extended CP.

TABLE 4

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |

TABLE 4-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 2 only | | | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighbor cells may have different configurations to the maximum. In addition, the CSI-RS configuration may be divided into the case of being applied to both the FDD frame and the TDD frame and the case of being applied to only the TDD frame.

Based on Table 3 and Table 4, (k',l') and $n_s$ are determined according to the CSI-RS configuration. By applying these values to Equation 19, the time-frequency resource that each CSI-RS antenna port uses for transmitting the CSI-RS is determined.

FIG. 10 is a diagram illustrating the CSI-RS configuration in a wireless communication system to which the present invention may be applied.

FIG. 10(a) shows twenty CSI-RS configurations that are usable in the CSI-RS transmission through one or two CSI-RS antenna ports, and FIG. 10(b) shows ten CSI-RS configurations that are usable by four CSI-RS antenna ports. FIG. 10(c) shows five CSI-RS configurations that are usable in the CSI-RS transmission through eight CSI-RS antenna ports.

As such, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 10(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 10(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 10(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1 −1] is multiplied.

Referring to FIGS. 10(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

A UE presumes the zero power transmission for the REs (except the case of being overlapped with the RE that presumes the NZP CSI-RS that is configured by a high layer) that corresponds to four CSI-RS column in Table 3 and Table 4 above, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of $n_s$ mod 2 in Table 3 and Table 4 above and the CSI-RS subframe configuration.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (S={15}, S={15,16}, S={17,18}, S={19,20} or S={21,22}) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; $T_{CSI-RS}$) for transmitting the CSI-RS and the subframe offset ($\Delta_{CSI-RS}$) are represented in Table 5 below.

Table 5 exemplifies the configuration of CSI-RS subframe.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Referring to Table 5, according to the CSI-RS subframe configuration ($I_{CSI-RS}$), the CSI-RS transmission period ($T_{CSI-RS}$) and the subframe offset ($\Delta_{CSI-RS}$) are determined.

The CSI-RS subframe configuration in Table 5 is configured as one of the 'SubframeConfig' field and the 'zeroTxPowerSubframeConfig' field in Table 2 above. The CSI-RS subframe configuration may be separately configured for the NZP CSI-RS and the ZP CSI-RS.

The subframe including the CSI-RS satisfies Equation 12 below.

$$(10 n_f + \lfloor n_s/2 \rfloor - \Delta_{CSI-RS}) \bmod T_{CSI-RS} = 0 \qquad \text{[Equation 12]}$$

In Equation 12, $T_{CSI-RS}$ represents the CSI-RS transmission period, $\Delta_{CSI-RS}$ represents the subframe offset value, $n_f$ represents the system frame number, and $n_s$ represents the slot number.

In the case of a UE in which transmission mode 9 is set for a serving cell, a single CSI-RS resource may be configured in the UE. In the case of a UE in which transmission mode 10 is set for a serving cell, one or more CSI-RS resources may be configured in the UE.

For each CSI-RS resource configuration, the following parameters may be set through high layer signaling.

If transmission mode 10 is set, the CSI-RS resource configuration identifier

The number of CSI-RS ports

The CSI-RS configuration (refer to Table 3 and Table 4)

The CSI-RS subframe configuration ($I_{CSI-RS}$; refer to Table 5)

If transmission mode 9 is set, the transmission power ($P_c$) for the CSI feedback If transmission mode 10 is set, the transmission power ($P_c$) for the CSI feedback with respect to each CSI process. When the CSI subframe sets $C_{CSI,0}$ and $C_{CSI,1}$ are set by a high layer for the CSI process, $P_c$ is set in each CSI subframe set of the CSI process.

The pseudo-random sequence generator parameter ($n_{ID}$)

If transmission mode 10 is set, the QCL scrambling identifier (qcl-ScramblingIdentity-r11) for assuming the Quasi Co-Located (QCL) type B UE, the CRS port count (crs-PortsCount-r11), and the high layer parameter ('qcl-CRS-Info-r11') that includes the MBSFN subframe configuration list (mbsfn-SubframeConfig-List-r11) parameter.

When the CSI feedback value obtained by a UE has the value in the range of [−8, 15] dB, $P_c$ is presumed by the ratio of the PDSCH EPRE for the CSI-RS EPRE. Herein, the PDSCH EPRE corresponds to the symbol in which the ratio of PDSCH EPRE for the CRS EPRE is $\rho_A$.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 3) or [16-27] set in the case of the extended CP (refer to Table 4) is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For the UE to which transmission mode 10 is configured, one or more Channel-State Information-Interference Measurement (CSI-IM) resource configuration may be set.

The following parameters may be configured for each CSI-IM resource configuration through high layer signaling.

The ZP CSI-RS configuration (refer to Table 3 and Table 4)

The ZP CSI-RS subframe configuration ($I_{CSI-RS}$; refer to Table 5)

The CSI-IM resource configuration is the same as one of the configured ZP CSI-RS resource configuration.

In the same subframe in a serving cell, the CSI-IM resource and the PMCH are not configured simultaneously.

For a UE in which transmission modes 1 to 9 are set, a ZP CSI-RS resource configuration may be configured in the UE for a serving cell. For a UE in which transmission mode 10 is set, one or more ZP CSI-RS resource configurations may be configured in the UE for the serving cell.

The following parameters may be configured for the ZP CSI-RS resource configuration through high layer signaling.

The ZP CSI-RS configuration list (refer to Table 3 and Table 4)

The ZP CSI-RS subframe configuration ($I_{CSI-RS}$; refer to Table 5)

In the same subframe in a serving cell, the ZP CSI-RS resource and the PMCH are not configured simultaneously.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and $11^{th}$ OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

Quasi Co-Located (QCL) Between Antenna Ports

Quasi co-located and quasi co-location (QC/QCL) may be defined as follows.

If two antenna ports have a QC/QCL relation (or subjected to QC/QCL), a UE may assume that the large-scale property of a signal transferred through one antenna port may be inferred from a signal transferred through the other antenna port. In this case, the large-scale property includes one or more of delay spread, Doppler spread, a frequency shift, average received power, and reception timing.

Furthermore, the following may be defined. Assuming that two antenna ports have a QC/QCL relation (or subjected to QC/QCL), a UE may assume that the large-scale property of a channel transferred through one antenna port may be inferred from a wireless channel transferred through the other antenna port. In this case, the large-scale property includes one or more of delay spread, Doppler spread, Doppler shift, an average gain, and average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., a UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, a UE may not assume the same large-scale property between wireless channels from corresponding antenna ports with respect to non-QC/QCL antenna ports. That is, in this case, a UE may perform independent processing on timing acquisition and tracking, frequency offset estimation and compensation, delay estimation, and Doppler estimation for each configured non-QC/QCL antenna port.

There are advantages in that a UE can perform the following operations between antenna ports capable of an assuming QC/QCL:

With respect to delay spread and Doppler spread, a UE may identically apply the results of a power-delay profile, delay spread and a Doppler spectrum, and Doppler spread estimation for a wireless channel from any one antenna port to a Wiener filter which is used upon channel estimation for a wireless channel from other antenna ports.

With respect to a frequency shift and received timing, a UE may perform time and frequency synchronization on any one antenna port and then apply the same synchronization to the demodulation of other antenna ports.

With respect to average received power, a UE may average reference signal received power (RSRP) measurement for two or more antenna ports.

For example, if a DMRS antenna port for downlink data channel demodulation has been subjected to QC/QCL with the CRS antenna port of a serving cell, a UE may apply the large-scale property of a wireless channel, estimated from its own CRS antenna port upon channel estimation through the corresponding DMRS antenna port, in the same manner, thereby improving reception performance of a DMRS-based downlink data channel.

The reason for this is that an estimation value regarding a large-scale property can be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by a UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, a UE can perform the detection/reception, channel estimation, and channel state report of a downlink reference signal through a QC/QCL assumption between antenna ports.

Restricted RLM and RRM/CSI Measurement

As one of methods for interference coordination, an aggressor cell may use a silent subframe (or may be called an almost blank subframe (ABS)) in which the transmission power/activity of partial physical channels are reduced (in this case, to reduce the transmission power/activity may include an operation for configuring the transmission power/activity to zero power). A victim cell may perform time domain inter-cell interference coordination for scheduling UE by taking into consideration the silent subframe.

In this case, from a standpoint of a victim cell UE, an interference level may greatly vary depending on a subframe.

In such a situation, in order to perform a radio resource management (RRM) operation for measuring more accurate radio link monitoring (RLM) or RSRP/RSRQ in each subframe or to measure channel state information (CSI) for link adaptation, the monitoring/measurement may be restricted to sets of subframes having a uniform interference characteristic. In the 3GPP LTE system, restricted RLM and RRM/CSI measurement are defined as follows.

A UE monitors downlink link quality based on a cell-specific reference signal (CRS) in order to sense downlink link quality of a PCell. The UE estimates downlink radio link quality, and compares the estimate of a threshold Q_out with the estimate of a threshold Q_in in order to monitor the downlink radio link quality of the PCell.

The threshold Q_out is defined as a level at which downlink radio link cannot be reliably received, and corresponds to a 10% block error rate (BER) of hypothetical PDCCH transmission in which a PCFICH error has been taken into consideration based on transmission parameters listed in Table 6 below.

The threshold Q_in is defined as a level at which downlink radio link quality can be more significantly reliably received compared to downlink radio link quality in the threshold Q_out, and corresponds to a 2% BER of hypothetical PDCCH transmission in which a PCFICH error has been taken into consideration based on transmission parameters listed in Table 7 below.

When higher layer signaling indicates a specific subframe for restricted RLM, radio link quality is monitored.

Specific requirements are applied when a time domain measurement resource restriction pattern for performing RLM measurement is configured by a higher layer and if a time domain measurement resource restriction pattern configured for a cell to be measured indicates at least one subframe per radio frame for performing RLM measurement.

If CRS assistance information is provided, the requirements may be satisfied when the number of transmit antennas of one or more cells to which CRS assistance information has been provided is different from the number of transmit antennas of a cell in which RLM is performed.

If UE is not provided with CRS assistance information or CRS assistance data is not valid for the entire evaluation period, a time domain measurement restriction may be applied when a collision occurs between a CRS and an ABS configured within a non-multicast broadcast single frequency network (MBSFN) subframe.

Table 6 illustrates PDCCH/PCFICH transmission parameters in an out-of-sync status.

TABLE 6

| Attribute | value |
| --- | --- |
| DCI format | 1A |
| Number of control OFDM symbols | 2; bandwidth ≥ 10 MHz<br>3; 3 MHz ≤ bandwidth ≤ 10 MHz<br>4; bandwidth = 1.4 MHz |
| Aggregation level (CCE) | 4; bandwidth = 1.4 MHz<br>8; bandwidth ≥ 3 MHz |
| Ratio of PDCCH RE energy to average RS RE energy | 4 dB; if a single antenna port is used for CRS transmission by a PCell<br>1 dB; if two or four antenna ports are used for CRS transmission by a PCell |
| Ratio of PCFICH RE energy to average RS RE energy | 4 dB; if a single antenna port is used for CRS transmission by a PCell<br>1 dB; if two or four antenna ports are used for CRS transmission by a PCell |

Table 7 illustrates PDCCH/PCFICH transmission parameters in an in-sync status.

TABLE 7

| Attribute | Value |
| --- | --- |
| DCI format | 1C |
| Number of control OFDM symbols | 2; bandwidth ≥ 10 MHz<br>3; 3 MHz ≤ bandwidth ≤ 10 MHz<br>4; bandwidth = 1.4 MHz |
| Aggregation level (CCE) | 4 |
| Ratio of PDCCH RE energy to average RS RE energy | 0 dB; If a single antenna port is used for CRS transmission by a PCell<br>−3 dB; If two or four antenna ports are used for CRS transmission by a PCell |
| Ratio of PCFICH RE energy to average RS RE energy | 4 dB; If a single antenna port is used for CRS transmission by a PCell<br>1 dB; If two or four antenna ports are used for CRS transmission by a PCell |

Downlink radio link quality for a PCell is monitored by a UE in order to indicate the out-of-sync status/in-sync status in a higher layer.

In a non-DRX mode operation, a physical layer of a UE assesses radio link quality evaluated for a previous time interval by taking into consideration thresholds Q_out and Q_in in each radio frame.

If higher layer signaling indicates a specific subframe for restricted RLM, the measurement of radio link quality is not performed in other subframes not indicated in the higher layer signaling.

If radio link quality is poorer than the threshold Q_out, the physical layer of a UE indicates the out-of-sync status for a higher layer within a radio frame whose radio link quality was measured. If the radio link quality is better than the threshold Q_in, the physical layer of the UE indicates the in-sync status for the higher layer within a radio frame whose radio link quality was measured.

Massive MIMO

In a wireless communication system after LTE Release (Rel)-12, the introduction of an active antenna system (AAS) is taken into consideration.

Unlike in an existing passive antenna system in which an amplifier and an antenna in which the phase and size of a signal can be adjusted have been separated, the AAS means a system in which each antenna is configured to include an active element, such as an amplifier.

The AAS does not require a separate cable, a connector, and other hardware for connecting an amplifier and an antenna depending on use of an active antenna and thus has high efficiency in terms of energy and an operation cost. In particular, the AAS enables an advanced MIMO technology, such as the forming of an accurate beam pattern or 3-D beam pattern in which a beam direction and a beam width have been taken into consideration, because the AAS supports an electronic beam control method for each antenna.

Due to the introduction of an advanced antenna system, such as the AAS, a massive MIMO structure including a plurality of input/output antennas and a multi-dimensional antenna structure is also taken into consideration. For example, unlike in an existing straight-line antenna array, if a 2-D antenna array is formed, a 3-D beam pattern may be formed by the active antenna of the AAS. If a 3-D beam pattern is used from a viewpoint of a transmission antenna, the forming of a semi-static or dynamic beam in the vertical direction of a beam in addition to the horizontal direction can be performed. For example, an application, such as the forming of a sector in the vertical direction may be taken into consideration.

Furthermore, from a viewpoint of a reception antenna, when a reception beam is formed using a massive reception antenna, an effect of a rise of signal power according to an antenna array gain may be expected. Accordingly, in the case of uplink, an eNB may receive a signal transmitted by a UE through a plurality of antennas. In this case, there is an advantage in that the UE can configure its own transmission power very low by taking into consideration the gain of a massive reception antenna in order to reduce an interference influence.

FIG. 11 illustrates a system having a plurality of transmission/reception antennas through which an eNB or a UE is capable of three-dimensional (3-D) beamforming based on an AAS in a wireless communication system to which an embodiment of the present invention may be applied.

FIG. 11 is a diagram of the aforementioned example and illustrates a 3D MIMO system using a 2-D antenna array (i.e., a 2D-AAS).

Cell Coverage of Massive MIMO

A multiple antenna system, for example, a system having N transmission antennas may perform beamforming so that received power is increased by a maximum of N times at a specific point, assuming that total transmission power is identically transmitted compared to a single antenna system.

Even an eNB having multiple antennas, a channel that transfers a CRS, a PSS/SSS, a PBCH and broadcast information does not perform beamforming in a specific direction so that all of UEs within an eNB coverage area can receive them.

In some cases, a PDSCH, that is, a channel that transfers unicast information to a specific UE, performs beamforming according to the location of a corresponding UE and link situation in order to improve transmission efficiency. That is, the transmission data stream of the PDSCH is precoded in order to form a beam in a specific direction and transmitted through multiple antenna ports. Accordingly, for example, if transmission power of a CRS and transmission power of a PDSCH are the same, received power of a precoded PDSCH beamformed toward a corresponding UE may be increased up to a maximum of N times compared to average received power of a CRS to a specific UE.

Up to now, in the LTE Rel-11 system, an eNB having a maximum of 8 transmission antennas is taken into consideration. This means that received power of a precoded PDSCH may be eight times greater than average received power of a CRS. In the future, however, if the number of transmission antennas of an eNB is 100 or more due to the introduction of a massive MIMO system, a difference between received power of a CRS and received power of a precoded PDSCH may be 100 times or more. In conclusion, due to the introduction of the massive MIMO system, the coverage area of a CRS transmitted by a specific eNB and the coverage area of a DM-RS-based PDSCH are not identical.

In particular, such a phenomenon may be significant if a difference in the number of transmission antennas between two adjacent eNBs is great. A representative example includes an example in which a macro cell having 64 transmission antennas and a micro cell (e.g., a pico cell) having a single transmission antenna neighbor each other. A UE served in an initial deployment process of massive MIMO first expects that the number of antennas may be increased from many macro cells. Accordingly, in the case of a heterogeneous network in which a macro cell, a micro cell and a pico cell are mixed, there is a great difference in the number of transmission antennas between adjacent eNBs.

For example, in the case of a pico cell having a single transmission antenna, the coverage area of a CRS and the coverage area of a PDSCH are the same. In the case of a macro cell having 64 transmission antennas, the coverage area of a PDSCH is greater than the coverage area of a CRS. Accordingly, if initial access and handover are determined based on only RSRP or RSRQ, that is, reception quality of the CRS, at the boundary of the macro cell and a pico cell, an eNB capable of providing the best quality of the PDSCH may not be selected as a serving cell. As a simple solution for this problem, PDSCH received power of an eNB having N transmission antennas may be assumed to be N times great, but such a method is not the best solution if a case where the eNB cannot perform beamforming in all of directions as possible is taken into consideration.

RRM-RS

This specification proposes a method for sending a precoded reference signal (RS) and performing RRM measurement on the precoded RS. In this specification, a precoded RS for this purpose is hereinafter referred to as an "RRM-RS." The RRM-RS includes a plurality of antenna ports, and beamforming is differently configured for each antenna port so that a UE can measure RSRP for each transmission beam. For example, if an eNB is able to perform beamforming in M directions, an RRM-RS including M ports may be configured.

Cycling and Multiplexing of RRM-RS

An M-port RRM-RS may be subjected to CDM or classified into FDM/TDM in the same subframe and transmitted. That is, a transmission signal for each antenna port of the M-port RRM-RS may be transmitted using a different transmission RE in the same subframe. If a transmission signal for each antenna port of the M-port RRM-RS is transmitted using the same RE, orthogonal scrambling code may be used between antenna ports in order to avoid interference between the antenna ports.

In some cases, the number of antenna ports of an RRM-RS which may be transmitted in one subframe at the same time may be set as K, may be divided into (M/K) subframes, and may be then transmitted.

In this case, the configuration parameter of the RRM-RS includes a total number of antenna ports M and the number of antenna ports K transmitted in one subframe at the same time. The configuration parameter of the RRM-RS also includes an RRM-RS transmission cycle P and an offset O. In this case, the RRM-RS transmission cycle is defined as the interval of subframes in which an RRM-RS is transmitted. For example, if P=10, O=5, M=64, and K=32, the RRM-RS is transmitted in subframes having subframe indices (SFI) of 5, 15, 25, 35, . . . . In the subframe having SFI=5, No. 31 RRM-RS is transmitted in an antenna port 0. In the subframe having SFI=15, No. 63 RRM-RS is transmitted in an antenna port 32. In the subframe having SFI=25, No. 31 RRM-RS is transmitted again in the antenna port 0.

In some cases, in a method for defining an RRM-RS transmission cycle as the interval of subframes in which the RS of the same antenna port is transmitted, dividing the antenna ports of an RRM-RS into (M/K) subframes, and sending the antenna ports, the antenna ports are divided into (M/K) contiguous subframes and transmitted. For example, if P=20, O=5, M=64, and K=32, an RRM-RS is transmitted in subframes having SFIs of 5, 6, 25, 26, 45, 46, . . . . In the subframe having SFI=5, No. 31 RRM-RS is transmitted in an antenna port 0. In the subframe having SFI=6, No. 63 RRM-RS is transmitted in the antenna port 32. In the subframe having SFI=25, No. 31 RRM-RS is transmitted again in the antenna port 0.

RSRP Measurement and Report

RSRP of an RRM-RS is measured and reported for each antenna port. A plurality of RRM-RSs may be configured in a UE.

If each RRM-RS is transmitted by each cell, the configuration of RRM-RSs transmitted by a serving cell and neighboring cells may be designed to a UE. One cell may send a plurality of RRM-RSs. When a UE reports RSRP of an RRM-RS, it also provides notification that the corresponding RSRP corresponds to RSRP measurement results of which antenna port of which RRM-RS.

In order to calculate RSRP of an RRM-RS, reception signal levels of respective antenna ports are averaged. A time window in which the average is calculated may be designed by an eNB, or RSRP may be calculated by averaging reception signal levels of the antenna ports of RRM-RSs during a predetermined time (e.g., 200 ms). Alternatively, RSRP may be calculated by filtering average received power obtained in each time window again.

A UE in which a plurality of RRM-RSs has been configured measures RSRP of each antenna port of each of the RRM-RSs. If R RRM-RSs have been configured in a UE and the number of antenna ports of an r-th RRM-RS is $M\_r$, RSRP of the m-th antenna port of the r-th RRM-RS is defined as RSRP(r,m). The UE aligns the RSRP(r,m), selects RSRP of L antenna ports that belong to the aligned RSRP (r,m) and that are strongly received, and reports the selected RSRP.

As a slight modification method of the aforementioned method, a UE aligns RSRP(r,m), selects RSRP of antenna ports that belong to the aligned RSRP(r,m) and that are strongly received, and reports only pieces of RSRP of ports that fall within a specific difference compared to the RSRP of the selected antenna ports, that is, max(RSRP(r,m)). That is, RSRP of a maximum of L antenna ports, which has an RSRP difference greater than a specific threshold in an RSRP ratio or dB scale expression as follows, is reported.

$$RSRP(r,m) - \max(RSRP(r,m)) > \text{Threshold} \quad \text{[Equation 13]}$$

For another example, the antenna ports of a precoded CSI-RS configured in a corresponding UE and an RRM-RS transmitted by a serving cell having a similar beam direction may be designated as reference antenna ports. If the (m_0)-th antenna port of an (r_0)-th RRM-RS has been designed to a UE as a reference antenna port, the UE reports another antenna port if a difference between RSRP of another antenna port and RSRP of the reference antenna port falls within a specific difference. That is, the UE reports an antenna port if a difference between pieces of RSRP exceeds a specific threshold in an RSRP ratio or dB scale expression as follows.

$$RSRP(r,m) - RSRP(r\_0,m\_0) > \text{Threshold} \quad \text{[Equation 14]}$$

FIG. 12 illustrates RSRP for each antenna port of an RRM-RS according to an embodiment of the present invention.

FIG. 12 shows an example of RSRP of each antenna port of an RRM-RS including 32 antenna ports.

If a UE has been configured to report RSRP of an antenna port having RSRP of 5 dB or less compared to an antenna port having the greatest RSRP, the UE reports an antenna port having RSRP of more than 35 dB because an antenna port 13 has the greatest RSRP of 40 dB as in FIG. 12. That is, RSRP of antenna ports 24, 25 and 26 including the RSRP of the antenna port 13 is reported to an eNB.

Antenna Port Grouping

Beamforming may be differently configured for each antenna port. In this case, each antenna port corresponds to each beam.

Accordingly, each antenna port index (i) may be mapped to each beam index (i). If beams are indexed so that the directions of an (i)-th beam and an (i+1)-th beam are adjacent, as in the example of FIG. 12, RSRP between adjacent antenna ports has a similar characteristic. Such similarity is also generated between the (i)-th beam and an (i+c)-th beam, but is reduced as "c" increases. Whether high similarity is generated between some continuous and adjacent beams is determined by the interval of beams, the width of a beam, and the scattering degree of multi-paths.

An eNB that has received a report on RSRP measurement results based on an RRM-RS checks an approximate location of a corresponding UE and notifies the UE of a precoded CSI-RS configuration transmitted toward a corresponding point so that the U can measure a CSI-RS and feeds back CSI (e.g., an RI, a PMI and a CQI) for PDSCH scheduling. Furthermore, an eNB that has received a report on RSRP measurement results based on RRM-RSs transmitted by a plurality of cells determines that a corresponding UE will be handovered to which cell and which precoded CSI-RS will be configured in the UE in a target cell based on the RSRP measurement results. That is, RSRP measurement results based on RRM-RSs provide an eNB with important information necessary to determine that which precoded CSI-RS will be configured in a corresponding UE in the future.

If 4-port CSI-RSs are configured in a corresponding UE based on RSRP measurement results, such as that in the example of FIG. 12, so that a maximum of 4 data streams can be transmitted or the best beam switching is rapidly performed in line with a change of fading, it is expected that to generate and configure 4-port CSI-RSs having the same beam direction as RRM-RS ports 13, 24, 25 and 26 having the greatest RSRP will be optimal. However, overhead is too great if a CSI-RS is optimized, generated and transmitted for each UE. Accordingly, a method for reducing CSI-RS transmission overhead is to allow many UEs in the same environment to share a CSI-RS. In order to achieve the above object, CSI-RS antenna ports within one CSI-RS configuration may be precoded to have a characteristic of a beam transmitted in an adjacent direction. That is, if a 4-port CSI-RS1 having the same beam direction as RRM-RS ports 12, 13, 14 and 15 and a 4-port CSI-RS2 having the same beam direction as RRM-RS ports 24, 25, 26 and 27 have been previously configured by taking into consideration different served UEs, whether it is better to configure which CSI-RS in a corresponding UE may be determined based on the RSRP report of an RRM-RS.

In another embodiment of the present invention, RSRP is also measured and reported with respect to an antenna port group. In the proposed method, antenna ports are grouped, and RSRP of an antenna port group is calculated by averaging pieces of RSRP of antenna ports belonging to the corresponding antenna port group. The group may be previously determined or an eNB may provide notification of the group. Alternatively, a UE may determine a grouping method and report the determined grouping method.

As in the example of FIG. 12, RRM-RSs including 32 ports may be grouped every 4 ports. The groups may be disjointed and grouped into 8 (=32/4) groups. In this case, an (i)-th port group includes RRM-RS ports (4i), (4i+1), (4i+2), and (4i+3). RSRP of the (i)-th port group is defined as an average of pieces of RSRP of the antenna ports (4i), (4i+1), (4i+2), and (4i+3).

In yet another embodiment, overlapping between groups may be permitted, and grouping may be performed. If RRM-RSs including 32 ports are grouped every 4 ports, the RRM-RSs are grouped into 15 groups. In this case, an (i)-th port group includes RRM-RS ports (2i), (2i+1), (2i+2), and (2i+3). If the proposed method is generalized, ports are grouped every A ports and a port interval between adjacent groups is set as B, an (i)-th port group includes RRM-RS ports (B*i), (B*i+1), . . . , (B*i+A−1). An eNB may designate the setting of the parameters A and B to a UE, or a UE may select the setting of the parameters A and B by taking into consideration a channel environment and UE capability and report the selected setting.

As a modification of the proposed method, in a method for selecting an antenna port group to be reported, a UE may take into consideration capabilities which may be obtained through a corresponding antenna port group compared to RSRP. In this case, the UE calculates the capabilities by taking into consideration multi-layer data transmission from a plurality of antennas within the antenna port group.

Antenna Port Grouping Level

In the proposed method, a plurality of grouping methods having different sizes may be used. That is, a method for grouping antenna ports every A1 ports and a method for grouping antenna ports every A2 ports may be used at the same time. A method for grouping antenna ports every A_i ports is hereinafter referred to as a "grouping level i."

FIG. 13 illustrates RRM-RS antenna port grouping levels according to an embodiment of the present invention.

FIG. 13 shows an example of a grouping method performed by applying a 4-step grouping level to 16-port RRM-RSs. In the example, the grouping level 1 shows a method of grouping antenna ports every port and shows a method not performing grouping. Furthermore, antenna ports are grouped every 2 ports, 4 ports and 8 ports in the grouping levels 2, 3 and 4, respectively. In the example of FIG. 13, antenna port groups having the same level have been illustrated as being disjointed and configured.

In such a multiple grouping method, a UE reports RSRP for each grouping level. That is, a UE selects and reports an antenna group having high RSRP for each grouping level. Alternatively, a UE may compare RSRP of antenna groups having different levels and report a group level compared to the best group. In order to compare RSRP between antenna groups having different levels l, group RSRP of each level is corrected by a specific offset and compared. In the case where R RRM-RSs have been configured, if RSRP of the (g)-th antenna port group of the (l)-th grouping level of an (r)-th RRM-RS is defined as GRSRP(r,l,g), Adj_GRSRP(r,l,g) is calculated by correcting GRSRP(r,l,g) by an offset(r,l) designated for the (l)-th grouping level of the (r)-th RRM-RS by an eNB as follows and is compared with GRSRP(r,l,g).

$$\text{Adj\_GRSRP}(r,l,g) = \text{GRSRP}(r,l,g) + \text{offset}(r,l) \quad \text{[Equation 15]}$$

In addition, in order to reduce a frequent change in the best L reported in a method for reporting RSRP of the best L port groups for each grouping level or in all of grouping methods, RSRP may be corrected by adding a hysteresis parameter Hy.

$$\text{Adj\_GRSRP}(r,l,g) = \text{GRSRP}(r,l,g) + \text{offset}(r,l) \pm Hy \quad \text{[Equation 16]}$$

In Equation 16, whether the parameter Hy is to be added or subtracted is determined depending on whether a corresponding port group is included in the best L GRSRP in a previous report. If the corresponding port group is included in the best L GRSRP in the previous report, the parameter Hy is added to apply a bias so that high Adj_RSRP is obtained, thereby reducing a frequent change of a port group having the best L Adj_GRSRP.

In a proposed method, a reference antenna port group may be designated to a UE. An eNB may designate the antenna port groups of a precoded CSI-RS configured in a corresponding UE and an RRM-RS transmitted by a serving cell having the same beam direction as a reference antenna port group. A reference antenna port group may be designated in a UE for each grouping level. Alternatively, one reference antenna port group may be designated in a UE in all of grouping levels. If the (m_0)-th antenna port group of the (l_0)-th grouping level of an (r_0)-th RRM-RS has been designated in a UE as a reference antenna port group, the UE performs reporting if Adj_GRSRP of another antenna port group exceeds a specific threshold compared to Adj_GRSRP of the reference antenna port group. That is, the UE performs reporting when a difference between pieces of RSRP exceeds a specific threshold in an Adj_GRSRP ratio or dB scale expression as follows.

$$\text{Adj\_GRSRP}(r,l,g) - \text{Adj\_GRSRP}(r\_0,l\_0,m\_0) > \text{Threshold} \quad \text{[Equation 17]}$$

Alternatively, as a modification of the proposed method, a UE specifies reference RSRP through a current CSI-RS, compares RRM-RS-based RSRP results with CSI-RS-based RSRP, and selects and reports the resulting RSRP.

RRM-RS for 3-Dimension (3-D)

The aforementioned method proposed according to an embodiment of the present invention may be modified and applied if the directivity of a beam is expanded from a 2-D space to a 3-D space. The directivity of a beam on the 3-D space is controlled by the two angles of a top/bottom angle (or vertical angle) and a left/right angle (or horizontal angle). Accordingly, in order to check whether an adjacent beam is present, it is efficient to index beams using two indices, that is, a horizontal index and a vertical index. According to the characteristics of the present invention, in order for a beam index and an RRM-RS port index to have a one-to-one correspondence relation, an RRM-RS port may be indexed with a horizontal index and a vertical index.

In the case of a 3D MIMO system having M_v beams in the vertical direction and M_h beams in the horizontal direction, a total of (M_v×M_h) beams are possible. In an embodiment of the present invention, an (M_v×M_h)-port RRM-RS is configured and a horizontal index j_h (j_h=0, . . . , M_h−1) and a vertical index j_v(j_v=0, . . . , M_v−1) are assigned to each antenna port. One-dimension index i (i=0, . . . , M_v×M_h−1) and 2-D indices j_h and j_v are assigned to each antenna port by taking into consideration the resource mapping of the (M_v×M_h)-port RRM-RS. There is a relation "(i)=f(j_h, j_v)."

FIG. 14 is a diagram illustrating antenna ports and antenna port groups of RRM-RSs arrayed in 2-D indices according to an embodiment of the present invention.

Referring to FIG. 14, each of antenna ports is indexed with (j_h, j_v). If antenna ports are grouped every A_h×A_v ports by applying the method proposed by an embodiment of the present invention and a port interval between adjacent groups is set as B_h and B_v, an (i_h, i_v)-th port group includes RRM-RS ports (B_h×i_h+j_h, B_v×i_v+j_v), (j_h=0, . . . , A_h−1), (j_v=0, . . . , A_v−1). An eNB may designate the setting of the parameters A_h, A_v and B_h, B_v for a UE, or a UE may select the setting of the parameters by taking into consideration a channel environment and UE capability and report the selected setting.

Difference Between RRM-RS and CSI-RS

In the existing LTE/LTE-A system, a CSI-RS is transmitted for the purpose of a CSI report. A UE reports a RI, a PMI and/or CQI as CSI. In some cases, the RRM-RS proposed by the present invention is used to measure RSRP for each antenna port. It may be better to use resources in which an existing CSI-RS can be configured rather than newly defining resources in which the RRM-RS is transmitted. The reason for this is that transmission efficiency of legacy UEs is not deteriorated. If the RRM-RS is transmitted in a new resource, the legacy UEs do not recognize the RRM-RS. As a result, transmission efficiency is deteriorated in a subframe in which the RRM-RS is transmitted or the RRM-RS is not scheduled. Accordingly, in a method for sending the RRM-RS using resources in which the existing CSI-RS can be configured, a CSI-RS including a corresponding resource is configured in a legacy UE and the legacy UE may be notified that data is not mapped to the corresponding resource.

Data is not mapped to a plurality of CSI-RSs configured in a UE for a CSI report. That is, a PDSCH is mapped to the plurality of CSI-RSs other than an RE to which the CSI-RS is mapped. In the proposed method according to an embodiment of the present invention, as in the CSI-RS, a PDSCH may be mapped to the RRM-RS other than an RE to which the RRM-RS is mapped. In a modified method, however, a PDSCH may be mapped to the RRM-RS regardless of the RRM-RS. In this case, a UE needs to be able to receive the RRM-RS and the PDSCH in the same RE at the same time. Alternatively, in order to guarantee the safe reception of the RRM-RS, an eNB may configure a corresponding resource as a ZP-CSI-RS so that a PDSCH is not mapped to the RRM-RS.

QCL Configuration of RRM-RS

If each cell sends an RRM-RS, the configuration of the RRM-RSs transmitted by a serving cell and neighboring cells may be designated to a UE. The UE measures a gain according to the beamforming of the serving cell and a gain according to the beamforming of the neighboring cells, and reports the measured gains to a network so that the gains are used as a criterion for determining handover. The RRM-RS may be insufficient for the tracking purpose of a signal because it has very low transmission density. Accordingly, tracking results are used to track a signal reliably received with high density, representatively, a CRS and to detect an RRM-RS. That is, the tracking results of the CRS of a serving cell are not suitable for being used for an RRM-RS transmitted by a neighboring cell due to an error in the oscillator which generates the carrier frequency of the serving cell and the neighboring cell. Accordingly, notification is provided of a quasi co-located (QCL) CRS (or another specific CS, such as a CSI-RS) that will be used to detect an RRM-RS for each RRM-RS. A UE uses the large-scale property properties of a channel, estimated from a QCL CRS (or another specific CS, such as a CSI-RS), to detect an RRM-RS. In this case, the large-scale properties of the channel may include one or more of delay spread, Doppler spread, a Doppler shift, an average gain, and average delay.

Extension to RSRQ

The proposed methods according to the embodiments of the present invention may be extended and applied to a method for measuring RSRQ for each antenna port of an RRM-RS. RSRQ is defined as a ratio of RSRP and an RSSI. Accordingly, the measurement of RSSI is added. The measurement resource of the RSSI may be identically configured in all of RRM-RSs having the same carrier frequency, that is, all of RRM-RSs configured in the same component carrier. In this case, the results of a comparison between the ports of RRM-RSs within the same component carrier are the same although RSRP or RSRQ is used. However, a comparison between the ports of RRM-RSs within heterogeneous same component carriers is different depending on whether RSRP or RSRQ is used. Accordingly, an eNB designates whether RSRP or RSRQ will be used in a UE when the UE performs an RRM report based on an RRM-RS.

In some cases, each RSSI measurement resource may be separately configured in an RRM-RS. In this case, a comparison between the ports of RRM-RSs is different even within the same component carrier depending on whether RSRP or RSRQ will be used. Accordingly, an eNB designates whether RSRP or RSRQ will be used in a UE when the UE performs an RRM report based on an RRM-RS.

Association Between RRM-RS RSRP and CRS RSRP

RSRP based on an RRM-RS according to an embodiment of the present invention has an object of incorporating the beamforming gain of an eNB having multiple antennas into the selection of a serving cell. Although a specific neighboring cell has been determined to have the best beamforming based on the RSRP of an RRM-RS, if channels broadcasted by a corresponding cell, that is, a channel in which CRS-based demodulation is performed, is not stably received, the handover of a UE to the corresponding neighboring cell cannot be performed. Accordingly, a report regarding whether both an RRM-RM and a CRS transmitted by a specific eNB have better quality needs to be received from a UE, and a handover determination and beam election need to be performed based on the report. To this end, the UE reports RSRP of the j-th antenna port or port group of an i-th RRM-RS configured in the UE and also reports RSRP of a CRS connected to the i-th RRM-RS. In this case, the CRS connected to the RRM-RS may be a CRS QCL-subjected to the RRM-RS.

Hereinafter, a CSI measurement and reporting operation method for reducing latency will be described.

A method described below may be extended and applied to systems including 3D-MIMO, massive MIMO, and the like and an amorphous cell environment, and the like.

First, the 3D-MIMO system will be described in brief.

The 3D-MIMO system is one of an optimal transmission scheme suitable for the single-cell 2D-adaptive antenna system (AAS) base station illustrated above in FIG. 11 based on LTE standard (Rel-12) and the following operation may be considered.

As illustrated in FIG. 11, when the 3D-MIMO system is described with an example of configuring CSI-RS ports from an 8-by-8 (8×8) antenna array, one precoded CSI-RS port to which 'UE-dedicated beam coefficients' optimized for a specific target UE is applied is configured with respect to each of 8 antennas vertically to configure/transmit a total of 8-port (vertically precoded) CSI-RS horizontally.

Therefore, the UE may perform CSI feedback for 8 ports in the related art.

Consequently, the base station transmits CSI-RS 8 ports to which a vertical beam gain optimized for individual UEs (alternatively, specific UE group) is already applied (precoded) to the UE.

Therefore, since the UE measures the CSI-RS that undergoes the radio channel, even though the UE performs the same feedback scheme using a conventional horizontal codebook, the UE may already obtain a vertical beam gain effect of the radio channel through the CSI measurement and reporting operation for the vertically precoded CSI-RS.

In this case, a method for determining vertical beams optimized for individual UEs includes (1) a method using an RRM report result by a (vertically precoded) small-cell discovery RS (DRS), (2) a method in which the base station receives the sounding RS (SRS) of the UE in an optimal reception beam direction and converts the corresponding reception beam direction into a DL optimal beam direction by channel reciprocity and applies the DL optimal beam direction, and the like.

When the base station determines that the UE-dedicated best V-beam direction is changed due to the mobility of the UE, the base station reconfigures all RRC configurations related with the CSI-RS and an associated CSI process by the convention operation.

When an RRC reconfiguration process needs to be performed as such, RRC-level latency (e.g., by the unit of several tens to several hundreds of ms) inevitably occurs.

That is, in terms of the network, a target V-beam direction is divided into, for example, four in advance and a separate 8-port CSI-RS having precoding in each V-direction is transmitted at the corresponding separate transmission resource location.

Further, since teach UE needs CSI measurement and reporting for one specific CSI-RS configuration among 8 port CSI-RSs, each UE cannot but perform an RRC reconfiguration procedure with the network by a CSI-RS configuration to be changed when the target V-direction is changed.

2D Planar Antenna Array Model

FIG. 15 is a diagram illustrating one example of a polarization based 2D plane antenna array model.

That is, FIG. 15 illustrates one example of a 2D active antenna system (AAS) having cross polarization.

Referring to FIG. 15, the 2D planar antenna array model may be represented as (M, N, P).

Herein, M represents the number of antenna elements having the same polarization in each column, N represents the number of horizontal columns, and P represents the number of dimensions of the polarization.

In FIG. 15, in the case of cross-polarization, P=2.

FIG. 16 is a diagram illustrating one example of a transceiver units (TXRUs) model.

A TXRU model configuration corresponding to the antenna array model configuration (M, N, P) of FIG. 15 may be represented as (MTXRU, N, P).

In this case, the MTXRU means the number of TXRUs which exist in the same 2D column and the same polarization and MTXRU<=M is continuously satisfied.

Further, a TXRU virtualization model is defined by a relationship of the signal of the TXRU and the signals of the antenna elements.

Herein, q represents transmission signal vectors of M antenna elements having the same polarization in the same column, w and W represent a wideband TXRU virtualization weight vector and a matrix, and x represents signal vectors of MTXRU TXRUs.

In detail, FIG. 16a illustrates a TXRU virtualization model option-1 (sub-array partition model) and FIG. 16b illustrates a TXRU virtualization model option-2 (full connection model).

That is, the TXRU virtualization model is divided into the sub-array model, the full-connection model, and the like as illustrated in FIGS. 16a and 16b according to a correlation between the antenna elements and the TXRU.

Further, mapping of the CSI-RS ports and the TXRUs may be 1-to-1 or 1-to-many.

Codebook Based Precoding Technique

Precoding that appropriates distributes transmission information to respective antennas according to the channel situation, and the like may be adopted in order to support multi-antenna transmission.

The codebook based precoding technique represents a technique that predetermines a set of precoding matrixes in the transmitting side and the receiving side, feeds back to the transmitting side which matrix the most appropriate precoding matrix is by measuring the channel information from the transmitting side (e.g., the base station) by the receiving side (e.g., the UE), and applies the appropriate precoding to signal transmission based on the PMI by the transmitting side.

Since the codebook based precoding technique is a technique that selects the appropriate matrix in the predetermined set of precoding matrixes, the optimal precoding is not continuously applied, but feedback overhead may be reduced as compared with a technique that explicitly feeds back the optimal precoding information to the actual channel information.

FIG. 17 is a diagram for describing a basic concept of codebook based precoding.

According to the codebook based precoding technique, the transmitting side an the receiving side share codebook information including a predetermined number of precoding matrixes according to a transmission rank, the number of antennas, and the like. That is, when feedback information is infinite, the codebook based precoding technique may be used. The receiving side measures the channel state through the received signal to feed back an infinite number of preferred precoding matrix information (that is, an index of the corresponding precoding matrix) to the transmitting side based on the codebook information. For example, the receiving side measures the received signal by a maximum likelihood (ML) or minimum mean square error (MMSE) technique to select the optimal precoding matrix. It is illustrated that the receiving side transmits to the transmitting side the precoding matrix information for each codeword, but the present invention need not be limited thereto.

The transmitting side that receives the feedback information from the receiving side may select a specific precoding matrix from the codebook based on the received information. The transmitting side that selects the precoding matrix may perform the precoding by a method that multiplies layer signals of a number corresponding to the transmission rank by the selected precoding matrix and transmit the transmitted signal of which precoding is performed to the receiving side through a plurality of antennas. In the precoding matrix, the number of rows is the same as the number of antennas and the number of columns is the same as a rank value.

Since the rank value is the same as the number of layers, the number of columns is the same as the number of layers. For example, when the number of transmission antennas is 4 and the number of transmission layers is 2, the precoding matrix may be configured by a 4×2 matrix. Information transmitted through the respective layers may be mapped to the respective antennas through the precoding matrix.

The receiving side that receives the signal precoded and transmitted by the transmitting side performs inverse processing of the precoding performed by the transmitting side to restore the received signal. In general, the precoding matrix satisfies a unitary matrix (U) condition such as $U*U^H=I$, therefore, the inverse processing of the precoding may be performed by multiplying the received signal by Hermit matrix $P^H$ of the precoding matrix P used for the precoding of the transmitting side.

For example, Table 8 given below shows a codebook used in downlink transmission using 2 transmission antennas in 3GPP LTE release-8/9 and Table 9 shows a codebook used in downlink transmission using 4 transmission antennas in the 3GPP LTE release-8/9.

TABLE 8

| Codebook index | Number of layers v | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 9

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 9 given above, $W_n^{\{s\}}$ is obtained as a set $\{s\}$ configured from an equation expressed like $W_n = I - 2u_n u_n^H / u_n^H u_n$. In this case, I represents a 4×4 unitary matrix and $u_n$ represents a value given in Table 7.

As shown in Table 8 given above, the codebook for 2 transmission antennas has a total of 7 precoding vectors/matrixes and herein, since the unitary matrix is used for an open-loop system, the total number of precoding vectors/matrixes for precoding of a close-loop system becomes 6. Further, the codebook for 4 transmission antennas shown in Table 7 given above has a total of 64 precoding vectors/matrixes.

The codebooks have common properties including a constant modulus (CM) property, a nested property, a constrained alphabet, and the like. In the case of the CM property, respective elements of all precoding matrixes in the codebook do not include '0' and are configured to have the same size.

The nested property means that the precoding matrix having a low rank is designed to be configured by subsets of a specific column of the precoding matrix having a high rank. The constrained alphabet property means a property in which alphabets of the respective elements of all precoding matrixes in the codebook are configured by $$\left\{ \pm 1, \pm j, \pm \frac{(1+j)}{\sqrt{2}}, \pm \frac{(-1+j)}{\sqrt{2}} \right\}.$$

Feedback Channel Structure

Basically, since the base station may not know information on a downlink channel in a frequency division duplex (FDD) system, the channel information which the UE feeds back is used for the downlink transmission. In the existing 3GPP LTE release-8/9 system, the UE may feed back the downlink channel information through the PUCCH or feed back the downlink channel information through the PUSCH. In the case of the PUCCH, the channel information is fed back periodically and in the case of the PUSCH, the channel information is fed back aperiodically according to a request of the base station. Further, in the case of the feedback of the channel information, the channel information for a whole frequency band (that is, wideband (WB)) may be fed back and the channel information may be fed back with respect to a specific number of RBs (that is, subband (SB)).

Codebook Structures

As described above, since the transmitting side and the receiving side share a pre-defined codebook to reduce overhead which occurs so as for the receiving side to feed back the precoding information to be used for MIMI transmission from the transmitting side, efficient precoding may be adopted.

As one example of configuring the pre-defined codebook, a precoder matrix may be configured by using a discrete Fourier transform (DFT) matrix or a Walsh matrix. Alternatively, the precoder matrix is combined with a phase shift matrix or a phase shift diversity matrix to configure various types of precoders.

In a co-polarization antenna series, DFT-series codebooks are excellent in performance and herein, in configuring the DFT matrix based codebook, an n x n DFT matrix may be defined as shown in Equation 18 given below.

$$DFTn: D_n(k, l) = \frac{1}{\sqrt{n}} \exp\left(-\frac{j2\pi kl}{n}\right),$$ [Equation 18]

$$k, l = 0, 1, \ldots, n-1$$

In the case of the DFT matrix of Equation 18 given above, only one matrix exists with respect to a specific size n. Therefore, in order to define various precoding matrixes and appropriately use the defined precoding matrixes according to a situation, it may be considered that a rotated version of a DFTn matrix is additionally configured and used. Equation 19 given below shows an exemplary rotated DFTn matrix.

$$\text{rotated } DFTn: D_n^{(Gg)}(k, l) = \frac{1}{\sqrt{n}} \exp\left(-\frac{j2\pi kl\left(1+\frac{g}{G}\right)}{n}\right),$$ [Equation 19]

$$k, l = 0, 1, \ldots, n-1, g = 0, 1, \ldots, G$$

When the DFT matrix is configured as shown in Equation 19 given above, G rotated DFTn matrixes may be generated and the generated matrixes satisfy the property of the DFT matrix.

Accordingly, hereinafter, the CSI measurement and reporting method for removing or significantly reducing the RRC-level latency will be described in detail.

That is, a method described below relates to a method that allocates only a single CSI process and a single uplink (UL) feedback resource to the UE and indicates what a CSI-RS index (and/or CSI-IM index) to be measured is at not the RRC level but the MAC level (alternatively, PHY level).

The MAC CE may be used for the MAC level indication and the DCI may be used for the PHY level indication.

That is, in the method described below, the base station (alternatively, network) configures the CSI-RS configurations for multiple candidate CSI-RSs by using the RRC signaling and explicitly or implicitly announces an 'activation' indication for at least one CSI-RS in which the CSI-RS measurement and reporting are performed among the multiple candidate CSI-RSs to the UE.

For example, when CSI-RS 1 is activated, in a situation in which it is considered whether CSI-RS 1 is transferred to CSI-RS 2, the base station may first indicate pre-activation to the UE so as to track CSI-RS 2 before actually indicating a reactivate command to transfer CSI-RS 1 to CSI-RS 2.

Herein, the tracking of the CSI-RS may mean an operation of time and/or frequency synchronization with respect to the CSI-RS so as for the UE to measure the CSI-RS.

That is, pre-activated CSI-RS X may be actually activated or not activated (within a specific timer time).

Herein, the UE may feed back intact CSI reporting to the base station within specific y ms after receiving an activation message indicating activation of the CSI-RS x from the base station.

Herein, feeding back the intact CSI reporting may be construed as a case where the UE performs meaningful CSI feedback to the base station.

It may be determined whether the CSI feedback is meaningful or meaningless according to the number of measured samples.

Transmission of Capability Information

In more detail, in the present specification, first, the UE transmits a specific capability signaling to the base station announces capability information related with the CSI operation thereof to the base station in advance (e.g., upon initial connection).

The capability information of the UE related with the CSI operation may include at least one of information given below.

Herein, the CSI related operation (alternatively, CSI operation related) may mean operations related with the CSI-RS, the CSI-IM, and/or the CSI process.

A disclosure of 'A and/or B' may be construed as 'at least one of A and B'.

1. Capability Information Regarding the Maximum Number of (Nc) CSI-RSs, (Ni) CSI-Interference Measurements (IMs), and/or (Np) CSI Processes which May be Simultaneously Fully Activated Herein, an expression of 'full activation (configuration)' means that the base station may actually simultaneously configure all of a total of NC(=3) CSI-RSs, Ni (=3) CSI-IMs, and Np (=4) processes in the case of the UE in which Nc=3, Ni=3, and Np=4 and in this case, all CoMP operations in the convention Rel-11 standard may be supported.

That is, the full activation means that the UE needs to perform channel measurement with respect to all of Nc=3 CSI-RSs, interference measurement (IM) with respect to all of Ni=3 CSI-IMs, and CSI feedback with respect to Np=4 CSI processes.

2. Capability Information Regarding the Maximum Number of (Nc') CSI-RSs, (Ni') CSI-Interference Measurements (IMs), and/or (Np') CSI Processes which May be Simultaneously Partially Activated Herein, an expression of 'partial activation' may be limited only to specific some operations (e.g., CSI-RS tracking) among the operations which may be performed by the UE upon the 'full activation' or include a separate additional operation.

For example, in the case of the specific UE, parameters in Term 1 given above may show Nc=1, Ni=1, and Np=1 and simultaneously, the parameters in Term 2 given above may show Nc'=3, Ni'=1, and Np'=1.

That is, there is only a difference in that Nc=1 and Nc'=3.

This meaning may be construed as a meaning that the specific UE may maintain time/frequency synchronization/tracking with respect to Nc' (=3) partially activated CSI-RSs and may be designated with Nc (=1) specific 'fully activated' CSI-RS among the three CSI-RSs.

A representative method which may be designated with Nc (=1) CSI-RS may include (1) a method that may receive an indication in the MAC layer through an MAC CE command, and the like, (2) a method that may receive a more dynamic indication in the PHY layer through the DCI signaling, and the like.

Since the UE may just perform only single CSI feedback (in a specific CC) for Np=Np' (=1) CSI process through such a method, complexity and overhead of the CSI feedback may be continuously similarly maintained.

In addition, there is an advantage that only the CSI-RS index which the UE needs to measure may be dynamically switched through the signaling of the MAC layer or PHY layer through the method proposed in the present specification.

That is, the present specification provides a method that switches only a resource to be measured by the RRC signaling, that is, through a signaling having latency smaller than the CSI-RS reconfiguration latency.

In the present specification, for easy description, the CSI-RS is primarily described, but it is apparent that the method proposed in the present specification may be similarly extended and applied even to dynamic switching of the CSI-IM index (alternatively, CSI process index).

Additionally, there may be an additional restriction in the form of Nc<=Nc', Ni<=Ni', and/or Np<=Np' among the parameters in Terms 1 and 2 given above.

In this case, the UE needs to transmit the capability signaling as long as such a condition is satisfied.

When the base station receives from the UE the capability signaling including the capability information of the UE related with the CSI operation, the base station needs to transmit the RRC signaling to the UE in such a manner not to violate the capability property combination at the time of configuring the corresponding UE later.

The UE does not expect a case in which the capability property is violated and may regard the case as an error case.

As described above, it is assumed that the UE may be configured with all of three CSI-RSs corresponding to Nc'=3 from the base station through the RRC signaling.

However, in this case, the UE may receive from the base station a signaling to recognize that the CSI-RS is configured to the 'partial activation' state for each CSI-RS index by a separate identifier or a specific implicit indication to identify that the CSI-RS is configured to the 'partial activation' state for each CSI-RS index.

In this case, the UE performs time/frequency synchronization/tracking for each of the three CSI-RSs from the time of receiving the RRC signaling.

In this case, the synchronization/tracking may be performed based on information such as a specific RS (e.g., CRS), or the like so as to apply a quasi co-location (QCL) assumption included in the each CSI-RS configuration.

In this case, it may be additionally (alternatively, simultaneously) configured or indicated that only Nc (=1) specific CSI-RS among Nc' (=3) CSI-RSs is 'fully activated' in the form of the separate identifier.

Alternatively, implicitly, Nc (=1) CSI-RS may be predefined as a specific index, such as continuously defining the CSI-RS as a lowest (highest) indexed CSI-RS.

Then, the UE may perform the channel measurement for the CSI feedback only with respect to Nc (=1) 'full activated' CSI-RS.

That is, the UE performs only the tracking without performing the channel measurement with respect to Nc'−Nc=2 remaining CSI-RSs.

As such, in a method that performs the channel measurement only with respect to Nc=1 specific CSI-RS and derives feedback contents (e.g., RI/PMI/CQI) through the measurement, an operation of calculating the feedback contents with respect to a specific CSI process configured together with the CSI-RS may be defined/configured.

For example, the UE receives even Np=1 specific CSI process from the base station through the RRC signaling and the CSI process is defined as a combination between a specific number of CSI-RSs and the CSI-IM index.

However, herein, in the case of the CSI-RS, an operation may be defined/configured, which automatically reflects the fully activated CSI-RS according to what Nc=1 fully activated CSI-RS is to recognize the corresponding CSI-RS as a CSI-RS which becomes a target of the channel measurement of the corresponding CSI process.

As another example, for example, Np'=3 CSI processes may be configured as the partial activation state and Nc'=3 CSI-RS indexes in the respective CSI processes may be configured.

Thereafter, the base station may dynamically indicate Np=1 specific fully activated CSI process to the UE through the MAC or PHY signaling.

Then, the UE may transmit the CSI feedback for the specific fully activated CSI process to the base station.

Consequently, a separate identifier or specific implicit signaling method may be defined, which may identify whether the specific CSI-RS and/or CSI-IM index indicated in link with the specific CSI process is a fixed index or an automatically variable index for each specific CSI process.

When the specific CSI-RS and/or CSI-IM index is fixed and indicated as the specific index, the UE performs measurement of resources corresponding to the fixed CSI-RS and/or CSI-IM index.

When the specific CSI-RS and/or CSI-IM index is configured as the variable index type, in the case where Nc=1 CSI-RS is 'fully activated' through the separate MAC or PHY signaling as described above, the corresponding index may be automatically applied.

Herein, the number of fully activated Ncs may be two or more.

For example, the number of fully activated Ncs may be two or more in a case such as a purpose of measuring multiple CSI-RS resources in the 2D-AAS structure through a Kronecker operation, and the like.

Even in this case, what fully activated Ncs are is separately dynamically indicated, the indexes may be automatically applied.

Consequently, in which candidate set the CSI-RS and/or CSI-IM index which may be indicated in the corresponding configuration may be configured may be preferably defined from the RRC configuration step in the CSI process configuration.

Similarly, it is apparent that the configuration or indication operation depending on the numbers of Ni's and Nis may be applied even to the CSI-IM.

FIG. 18 is a diagram illustrating one example of a method for measuring and reporting CSI.

Referring to FIG. 18, the UE transmits the capability signaling including the capability information of the UE related with the CSI operation to the base station (S1810).

The capability information of the UE includes first control information representing the maximum number of CSI related operations which may be simultaneously fully activated and second control information representing the maximum number of CSI related operations which may be simultaneously partially activated.

Thereafter, when the configuration related with the CSI operation is changed, the base station transmits CSI operation related configuration information (alternatively, CSI related operation configuration information) to the UE (S1820).

The CSI operation related configuration information includes at least one of partial activation CSI related operation index information representing a CSI related operation of performing the partial activation and full activation CSI related operation index information representing a CSI related operation of performing the full activation.

Thereafter, the UE measures the full activated CSI based on the CSI operation related configuration information (S1830).

Before step S1830, the UE performs the tracking with respect to the partially activated CSI-RS.

The CSI-RS tracking is described in detail with reference to the above contents.

Thereafter, the UE reports the measurement result to the base station (S1840).

FIG. 19 is a diagram illustrating another example of the method for measuring and reporting CSI.

Since S1910 and S1920 and S1940 and S1950 are the same as S1810 to S1840, a detailed description thereof will be omitted.

After step S1920 (after the base station transmits the CSI operation related configuration information to the UE), the base station transmits an indication message of indicating measurement for the fully activated CSI-RS to the UE (S1930).

The indication message may be MAC CE or DCI.

Further, the fully activated CSI-RS may be preferably selected from the partially activated CSI-RSs.

CSI Measurement Window Initialization/Update Time

When the UE receives the fully activated signaling of the specific CSI-RS, CSI-IM, and/or CSI process index(es) from the base station through the MAC signaling or PHY signaling at a subframe (SF) #n time, the UE may apply CSI measurement and reporting to be performed from specific y ms, that is, SF #(n+y) time from the corresponding time (subframe #n).

In the case of the periodic CSI reporting, CSI measurement and reporting for specific CSI-RS, CSI-IM, and/or CSI process index(es) which are newly fully activated starts from a specific reference resource time linked with an RI reporting instance which is output first after the SF SF #(n+y) time.

That is, with respect to valid reference resource times which exist after the SF #(n+y) time, the CSI (e.g., RI/PMI/

CQI) calculated at the reference resource time may be defined to report new CSI contents from the time when the RI is initially reported.

That is, before the initial RI reporting time, even though the PMI/CQI reporting instance exists, the CSI feedback contents based on not the newly full activated configuration but the configuration which is followed just before the first RI reporting time need to be continuously reported.

Consequently, the CSI reporting of the UE is performed based on the fully activated configuration from the new RI reporting instance time.

In the above operations, configuration information related with a window that averages the CSI measurement may be defined to be provided through the RRC signaling separately or together.

Further, such an operation may be defined only with respect to an enhanced UE that supports a configuration of a type such as the full/partial activation.

That is, conventional unrestricted observation is not permitted but the measurement is averaged only in a specific [d1, d2] ms time interval.

The reason is that since the resource configuration information of the CSI-RS and/or CSI-IM to be measured may be dynamically switched through the MAC or PHY signaling, the measurement averaging may be preferably defined to be performed only within a specific bounded interval.

As one example, when the UE receives a signaling in which the resource configuration information of the CSI-RS and/or CSI-IM to be measured is dynamically switched/indicated through the MAC or PHY signaling (e.g., by DCI), the UE may be defined/configured to initialize or update the measurement averaging window of the CSI-RS-based channel measurement in link with the signaling.

Further, the UE may initialize or update the measurement averaging window of the corresponding CSI-IM-based interference measurement in link with the (dynamically switched/indicated) signaling.

Herein, initializing or updating the measurement averaging window means initializing or updating a 'start point of the measurement window' called the 'from the predetermined time' again from #n (alternatively, after a specific configured/indicated time, e.g., #n+k), the time of receiving the (dynamically switched/indicated) signaling instead of, for example, a conventional operation of averaging channel measurement values from the corresponding CSI-RS ports, which are repeatedly measured up to now from a predetermined past time according to a UE implementation by 'unrestricted observation' for CSI measurement according to a current standard.

Alternatively, a scheme that explicitly signals time information (e.g., timestamp type) representing from which time the corresponding measurement window is initialized or updated together may also be applied.

For example, the scheme may include a time information indicating method for absolute time parameter values including SFN, slot number, and the like or a scheme that indicates the signaling in a specific +/−Delta value type from the time when the UE receives the signaling.

In other words, it may be limited that the signaling serves to update/reset only the start time of only the measurement averaging window.

Then, the UE may average the CSI measurement values (according to the UE implementation) until the additional signaling is received after the corresponding time.

The signaling may be separately (independently) signaled for each CSI process. Therefore, the measurement window reset may be independently applied for each process.

The signaling may be together applied even for a purpose of resetting the interference measurement averaging window for the specific CSI-IM resource.

In this case, the signaling serves to initialize the measurement averaging window for the CSI-RS and the CSI-IM which belong to the specific CSI process.

Alternatively, a scheme that signals a separate (independent) indicator for resetting the interference measurement averaging window for the CSI-IM resource may also be applied.

This announces the UE to initialize the measurement averaging window for the specific CSI process so as to separate a past interference environment not to be reflected to the interference measurement value from a current time any longer, for example, when an interference environment which may be predicted/sensed by the base station is changed in an environment (e.g., eICIC, eIMTA, LAA, and the like) in which the interference environment is changed.

FIG. 20 is a diagram illustrating yet another example of the method for measuring and reporting CSI.

Since S2010 to 2030, S2050, and S2060 are the same as S1910 to S1930, S1940, and S1950 of FIG. 19, the detailed description thereof will be omitted.

Referring to FIG. 20, after step S2030, the UE initializes or updates the CSI measurement window (S2040).

Thereafter, the UE repeatedly measures the fully activated CSI-RSs during the initialized or updated CSI measurement window interval, averages the measurement result, and reports the average value to the base station (S2050 and S2060).

Before step S2040, the base station may transmit CSI measurement window related configuration information to the UE.

As yet another embodiment of a similar type to the (dynamically switched/indicated) signaling, the aforementioned measurement window configuration related operation may be applied even to a beamformed CSI-RS based scheme as described below in the present specification.

PMI feedback scenarios given below may be considered for elevation beamforming and FD-MIMO operations.

1. Precoding Definition of EBF (Elevation Beamforming)/FD-MIMO (1) Precoding Matrix/Vector $P_1$: wideband; updated less frequently $P_2$: subband or wideband; updated more frequently P is a function of $P_1$ and $P_2$, applied to 1D or 2D antenna array (P represents functions of $P_1$ and $P_2$ applied to a 1D or 2D antenna.)

PMI(s) are to be specified w.r.t. the above definition (2) Scenarios for CSI Feedback Scenario 1

UE measures CSI-RS ports beamformed with $P_1$ ($P_1$ transparent to UE).

PMI report(s) for $P_2$

Scenario 2

UE measures non-precoded 1-D or 2-D CSI-RS ports

Note: $P_1$ not applied to CSI-RS at Enb

PMI report(s) for $P_1$ and $P_2$

Scenario 3

UE measures both non-precoded 1- or 2-D CSI-RS ports (lower duty cycle) and CSI-RS beamformed with $P_1$ PMI report(s) for $P_1$ and $P_2$ Scenario 4

UE measures non-precoded 1- or 2-D CSI-RS ports

Note: $P_1$ not applied to CSI-RS at eNB ($P_1$ indicated to UE).

PMI report(s) for $P_2$.

Among scenarios 1 to 4, for example, in the method using the beamformed CSI-RS like scenarios 1 and 3, even though the UE need not know matrix P1 itself, when P1 in which the base station applies beamforming to the corresponding CSI-RS ports is changed, the base station needs to announce change time related information of the P1 to the UE in advance.

Thus, the UE may configure/apply an appropriate measurement averaging window upon CSI measurement and calculation.

That is, according to the current standard, when the UE performs the channel measurement for the corresponding CSI-RS ports, reliability may be enhanced by averaging the channel measurement values from the corresponding CSI-RS ports, which are repeatedly measured up to now from the predetermined past time by the 'unrestricted observation' (e.g., noise suppression effect).

However, in scenarios 1 to 4, since the P1 itself uses the beamformed CSI-RS ports which are not known to the UE, the base station may change the P1 itself at a predetermined time and when the base station does not announce that the P1 is changed to the UE, the UE may average the channel measurement values for P1 before the change and P1' after the change together, and as a result, a problem may occur in accuracy of the corresponding CSI measurement and reporting.

Accordingly, the present specification provides a method in which the base station transmits a kind of 'beam-change notification' or 'beam-change indicator (BCI) signaling to the UE in order to solve the problem.

Hereinafter, 'beam-change indicator' will be simply referred to as 'BCI'.

A BCI signaling may be indicated as an RRC signaling type.

However, more preferably, the BCI signaling may be provided as the signaling through the MAC CE or the dynamic indication through the DCI, and the like.

That is, when the UE receives the BCI signaling, the start point of the measurement averaging window applied upon CSI derivation in the corresponding CSI process is updated to a reception time (alternatively, a specific time indicated from the corresponding BCI receiving time or a time of explicit indication by the separate timestamp, and the like) of the corresponding BCI signaling.

That is, a scheme that explicitly signals time information (e.g., timestamp type) representing from which time the corresponding measurement window is initialized or updated together with the BCI information (alternatively, as associated information) may also be applied.

For example, the scheme may include a time information indicating method for absolute time parameter values including SFN, slot number, and the like or a scheme that indicates the signaling in a specific +/−Delta value type from the time when the UE receives the signaling.

That is, it may be limited that the BCI signaling serves to update/reset only the start time of only the measurement averaging window.

Then, the UE may average the CSI measurement values (according to the UE implementation) until an additional BCI is received after the corresponding time (BCI signaling receiving time).

Consequently, since the UE does not know the updated matrix P1 itself, but receives that the P1 is updated through the BCI, the CSI measurement values are newly averaged from the indication time to perform CSI calculation and reporting (e.g., P1, P2, RI, CQI, and the like) for the corresponding CSI process with respect to only the CSI-RS ports to which the updated P1 is applied.

The BCI may be separately (independently) signaled for each CSI process.

Therefore, the measurement window reset may be independently applied for each process.

The BCI may be together applied even for a purpose of resetting the interference measurement averaging window for the specific CSI-IM resource.

In this case, the signaling serves to initialize the measurement averaging window for the CSI-RS and the CSI-IM which belong to the specific CSI process.

Alternatively, a scheme that signals a separate (independent) indicator for resetting the interference measurement averaging window for the CSI-IM resource may also be applied.

This announces the UE to initialize the measurement averaging window for the specific CSI process so as to separate a past interference environment not to be reflected to the interference measurement value from a current time any longer, for example, when an interference environment which may be predicted/sensed by the base station is changed in an environment (e.g., eICIC, eIMTA, LAA, and the like) in which the interference environment is changed.

<Proposal Content 1>

Proposal content 1 is contents related with the number of NZP CSI-RS ports which may be configured for each CSI process when the FD-MIMO operation is supported.

When a non-precoded CSI-RS based scheme is considered with respect to the FD-MIMO operation, the number of NZP CSI-RS ports which may be configured for each CSI process may need to increase.

However, in terms of the beamformed CSI-RS based scheme, the number of beamformed CSI-RS ports for each CSI-RS resource may be flexible.

The reason is that each NZP CSI-RS port configured for the UE in such a situation may be precoded with respect to multiple TXRUs so that the total number of NZP CSI-RS ports configured for the UE is much smaller than that of the non-precoded CSI-RS based scheme.

Hereinafter, the beamformed CSI-RS based scheme will be described in more detail by considering such an aspect.

Potential CSI-RS Enhancements

For easy description, RE(k,l,n) is notated and the corresponding notation represents a location of an RE used for transmitting a k-th subcarrier, an l-th OFDM symbol, and an n-th CSI-RS port.

When applicability of transmission power sharing for subcarriers in the same OFDM symbol is considered, it is possible to boot RS transmission power in RE(ki,l,ni) and RE(kj,l,nj).

In this case, an ni-th CSI-RS port is transmitted in RE(ki,l,ni) and an nj-th CSI-RS port is transmitted in RE(kj,l,nj), and frequency division multiplexing (FDM) is performed between the corresponding transmissions.

The RS power boosting may be additionally used with respect to RS transmission. The reason is that there is no transmission in RE(ki,l,nj) and RE(kj,l,ni).

FIG. 21 is a diagram illustrating one example of 6 DB RS power boosting for a frequency division multiplexed (FDM) RS.

That is, FIG. 21 illustrates one example of CSI-RS power allocation onto RE(2,l,15) with respect to the 8-port CSI-RS situation.

In FIG. 21, NZP CSI-RS port 15 is transmitted on RE(2,l,15), but three other RE(3,l,15), RE(8,l,15), and RE(9, 1,15) are muted so as to prevent interference in other NZP CSI-RS ports (ports 17 to 22).

Due to the power muting, remaining power may be additionally allocated to actual RS transmission in RE(2,1, 15) and a boosted power level may be disclosed as 4Ea and average energy per resource element (EPRE) is represented by Ea.

The maximum number of supported CSI-RS ports FDM in one PRB pair becomes 4.

(Proposal 1): When an RS power boosting influence is considered, the maximum number of supported CSI-RS ports frequency division multiplex(FDM)ed in one PRB pair needs to become 4.

When even the 16-port CSI-RS resource is considered, the non-precoded 16 CSI-RS ports for each CSI-RS resource may be designed while satisfying the RS power boosting condition.

Further, 4 FDMed CSI-RS ports and 4 code division multiplex(CDM)ed CSI-RS ports may be configured in the CSI-RS resource on the same subcarrier and are applied to the aforementioned 6 dB CSI-RS power boosting.

However, when the 32-port or 64-port CSI-RS resource is considered, it may not be appropriate to design the corresponding non-precoded CSI-RS ports while satisfying the RS power boosting restriction.

In this case, all non-precoded CSI-RS ports need to be transmitted substantially simultaneously (in one pair of OFDM symbols) so as to prevent important CSI aging.

In respect to the beamformed CSI-RS ports, it is continuously appropriate to design 32-port, 64-port, or more CSI-RS configuration.

When the entire CIS-RS port is divided into a pair of 'port-groups', each port group have different beamformed CSI-RS ports.

For example, when a total 32-port CSI-RS configuration is considered, the 32-port CSI-RS configuration may be divided into 4 port groups and each port group includes the 8-port CSI-RS resource (vertical beamformed having different target vertical beam weights).

That is, the UE measures a total of 32 CSI-RS ports.

However, the UE first selects the best port group, calculates a subsequent existing short-term CSI, and needs to recognize that there are 4 port groups in order to perform the feedback based on 8 CSI-RS ports in the selected port group.

In relation with the aforementioned type, when the UE is configured with a total of N (e.g., N=32) CSI-RS ports, the UE may be configured with a specific parameter (alternatively, an implicit signaling structure) to determine the aforementioned CSI-RS port group.

The UE may know how many port groups a total of N CSI-RS ports are divided into through the specific parameter.

Herein, a total of N CSI-RS ports may be defined and configured as one CSI-RS resource and a set of multiple CSI-RS resources may be defined in one CSI process.

Herein, up to a total of 4 CSI processes may be supported and each CSI process may be represented by the indexes.

That is, the respective CSI processes may be represented by indexes 0, 1, 2, and 3.

Further, a CSI related class type class A: non-precoded CSI-RS and class B: Beamformed CSI-RS) of the UE may be configured for each CSI process as described below.

For example, when a parameter, 'K' which is the number of port groups is additionally provided, a K value (K=4) may be signaled together with an N value (e.g., N=32) representing the total number of RS ports.

Then, 32 CSI-RS ports constitute 4 port groups and each port group includes 8 CSI-RS ports.

In more detail, as the above example, it is assumed that N(=32) CSI-RS ports are provided to the UE through the RRC signaling, and the like by the CSI-RS configuration.

In this case, when the parameter of K=4 (CSI-RS port group=4) is together provided, in the case where N=32 CSI-RS ports are enumerated in a port index order, the UE may implicitly recognize that the port group is formed by the unit of N/K(=32/4=8) ports from the beginning.

That is, when it is assumed that the CSI-RS port indexes are 1, 2, 3, . . . , 32, port-group #1 is from the CSI-RS port corresponding to index 1 up to the CSI-RS port corresponding to index 8, that is, index {1, 2, . . . , 8} ports and port-group #2 is up to index {9, 10, . . . , 16} ports.

In such a manner, the UE may automatically determine how CSI-RS port indexing is configured, which is included in each port group of port-group #1 to port-group #4.

Such a CSI-RS port indexing method is one example and modifications similar to the CSI-RS port indexing method are included in the spirit of the present invention, which allow the UE to automatically determine the CSI-RS port indexing in the port group through the modifications.

As described above, in the method in which a total of N CSI-RS ports are classified into K port groups and N/K CSI-RS ports are configured to exist in each port group, there may be various schemes for allowing the UE to perform the CSI measurement and reporting based on such a configuration.

As the first example, in the beamformed CSI-RS based scheme described in <Proposal content 1> given above, the same specific beamforming (e.g., vertical beamforming) may be applied in each port group.

Accordingly, the UE select the best port group and performs the CSI-RS feedback for the selected port group.

Herein, the UE may perform the CSI-RS feedback for the selected port group during a long term.

Further, the UE may perform short-term CSI-RS feedback for the CSI-RS ports in the selected port group.

The CSI-RS reporting method proposed in the present specification may be generally divided into (1) the non-precoded CSI-RS (reporting) method and (2) the beamformed CSI-RS (reporting) method.

The non-Precoded CSI-RS method may be performed in the class A type UE and the beamformed CSI-RS may be performed in the class B type UE.

That is, the present invention, it may be construed that the class A type UE performs a non-precoded CSI-RS related operation and the class B type UE performs a beamformed CSI-RS related operation.

As a second example, as described in <Proposal content 2> to be described below, even in the precoded CSI-RS based scheme, the UE operation under the aforementioned port group based signaling structure may be defined/configured.

For example, when the UE is allowed to perform the CSI derivation (alternatively, calculation) in a manner to apply Kronecker precoding, the UE may determine that a total of N CSI-RS ports are divided into K CSI-RS port groups.

Therefore, when the UE calculates, for example, a specific direction (e.g., horizontal direction) H-PMI while determining that a total of N CSI-RS ports are divided into K CSI-RS port groups, the UE may be defined/configured to calculate the H-PMI for N/K CSI-RS ports.

Herein, the specific port group may be fixedly defined as a 'lowest port group' or 'highest port group' in advance.

The specific port group may be referred as the index type.

Alternatively, the specific port group may be defined as a 'most centrally located port group index'.

For example, when the port group indexes are 1, 2, 3, and 4 (e.g., K=4), the 'most centrally located port group index' corresponds to index '2' or '3'.

As such, when the number of port group indexes is even, the 'most centrally located port group index' may be defined as a maximum integer index (=2) which is not more than an intermediate value (e.g., 2.5 in this case) or a minimum integer index (=3) which is more than the intermediate value.

As such, the reason for defining the specific port group as close to the intermediate value as possible is that defining the port group index which is most intermediate is more excellent in overall performance in interpolation by a Kronecker product between the H-PMI and the V-PMI than defining/configuring the lowest port group index (since a lowermost row is configured in an H-CSI-RS type in FIG. 27) for H-direction H-PMI calculation as described in FIG. 27 in <Proposal content 3> to be described below.

That is, the reason is that when the most intermediate port group is selected, regions to be interpolated with respect to the top and the bottom remain even to the maximum during the interpolation.

In other words, since as a distance from the corresponding port group location is close as possible, there is a property in which the interpolation is more excellently performed, a purpose is to select upper and lower interpolation distances to be as short as possible.

As another example, when another direction (e.g., vertical direction) V-PMI is calculated, a total of K CSI-RS ports are newly configured, which are generated by choosing only the lowest (alternatively, highest or most intermediate located (the same as the above description)) port index among N/K CSI-RS ports for each of all K port groups and a method for calculating the V-PMI with respect to such a configuration is also available.

Even in this case, in order to enhance the interpolation performance upon calculating the V-PMI, it may be preferable to constitute a new CSI RS port by collecting most centrally located RS ports similarly as described above.

As such, when the new CSI-RS port is constituted by collecting the most centrally located RS ports even in the V direction, the UE may automatically extract corresponding N/K H-CSI-RS ports by selecting a most centrally located row and K corresponding V-CSI-RS ports by selecting a most centrally located column at the time of being configured with N port CSI-RSs and the parameter K as a whole.

Therefore, the UE performs (FD-MIMO) related CSI feedback based on the method (e.g., Kronecker precoding) described in <Proposal content 2>, and the like.

In summary, a (unique) specific rule may be implicitly defined/configured, through which the UE may extract N/K H-CSI-RS ports and K V-CSI-RS ports when being configured with the N port CSI-RSs and the parameter K (K port groups).

Further, when the UE receives a new CSI-RS port configuration (e.g., CSI-RS resource) such as 12-port or 16-port in the form of multiple aggregated CSI-RS resources from the base station, a restriction that the corresponding aggregated CSI-RS resources are configured not to be spaced apart from each other by X (OFDM) symbols (e.g., X=2) may be defined/configured.

For example, when X=2, the multiple aggregated CSI-RS resources will be together configured through two adjacent OFDM symbols like the existing CSI-RS configuration.

Accordingly, the UE does not expect that CSI-RS resources which are spaced apart from each other during a longer interval than 2 OFDM symbols are together aggregated and not thus configured (in the specific CSI process) together.

Consequently, since the UE performs a normal operation only through such a configuration, it may be construed that the corresponding configuration grants a network restriction.

As described above, when the UE does not have the network restriction, the UE needs to perform the CSI measurement between the CSI-RSs which are spaced apart from each other by X symbols or more.

In this case, the UE may need to perform implementation such as predicting and compensating a channel phase drift phenomenon.

Accordingly, the UE may not apply complicated implementation for predicting and compensating the channel phase drift by granting the network restriction.

That is, the implementation of the UE is continuously guaranteed only with respect to the CSI-RS resource received throughout the adjacent X symbols.

Further, in the beamformed CSI-RS based operation, and the like, an operation that allows the UE to the best (alternatively, preferred) N (>=1) CSI-RS resource among multiple, that is, M CSI-RS resources may be considered.

In this case, when the CSI-RS periodicity and subframe offset among M CSI-RS resources are too largely spaced apart from each other, performance deterioration may be caused.

Accordingly, most preferably, the following restriction may be granted so that both the CSI-RS periodicity and the subframe offset among the M CSI-RS resources are the same as each other.

In a method for supporting the beamformed CSI-RS based operation, an Rel-13 CSI process configuration may include M (>1) legacy NZP (Non-Zero Power) CSI-RS resources and each CSI-RS resource have K CSI-RS ports.

A value of K may be one of 1, 2, 4, and 8 and the K value needs to be identical in all M NZP CSI-RS resources.

Further, all M NZP CSI-RS resources need to have the same periodicity and subframe offset.

Meanwhile, as described above, in a strict restriction that performs the CSI measurement with respect to the CSI-RS resource received throughout the adjacent X symbol, when resources for transmitting M CSI-RS resources in the same subframe are insufficient, some CSI-RS resources may not be allocated in the corresponding subframe.

In this case, an alleviated restriction may be granted, in a type to show transmission of all of M CSI-RSs in specific 1 subframes' by alleviating a restriction related with allocation of M CSI-RS resources in the same subframe.

That is, when L=5, all M CSI-RS resources need to be configured to be transmitted in all of 5 (L=5).

In more detail, when the same subframe configuration restriction is granted, information such as the CSI-RS periodicity and the subframe offset may be commonly signaled on the signaling of the corresponding configuration.

In addition, in the configuration for each of M CSI-RS resources, only 'CSI-RS configuration' information including information indicating to which RE locations in the PRB of the corresponding CSI-RS the CSI-RS is transmitted may just be downloaded with respect to M respective CSI-RS resources.

Further, a scrambling seed (alternatively, scrambling sequence) value applied in sequence generation of the corresponding CSI-RS may also be independently for each of M CSI-RS resources.

Therefore, CSI-RS resources transmitted while being overlapped with the same RE location may be multiplexed by a sequence generated by different scramblings.

In this case, a case where overlapped CSI-RS transmission beams are orthogonal to each other may be preferable.

Similarly, when the restriction of the type to show the transmission of all of M CSI-RSs in the specific 1 subframes' by alleviating the restriction for M CSI-RS resources in the same subframe, that is, an 'alleviated restriction' is granted, in the case of the information such as the CSI-RS periodicity and the subframe offset on the signaling of the corresponding configuration, the periodicity and offset information for one specific reference CSI-RS resource (among the M CSI-RS resources) is first provided.

In addition, the periodicity and/or subframe offset information for remaining (M−1) CSI-RS resources may be configured as a relative offset value compared with the transmission time of the reference CSI-RS resource.

For example, all CSI-RS periodicities may be similarly granted and in the case of the subframe offset information, for example, one of 0, 1, . . . , L−1 values is granted for each CSI-RS to announce that the transmission time of the corresponding CSI-RS is shown in subframe 0, 1, . . . , or L−1 after the transmission time of the corresponding reference CSI-RS resource.

In the case of the CSI-RS periodicity when a configuration periodicity of the reference CSI-RS resource is T (ms), there may be a constraint that the periodicity for each of remaining (M−1) CSI-RS resources may be shown only in multiples of T.

In this case, configuration information may be provided, which indicates that the CSI-RS resources are transmitted with a periodicity of one time, two times, . . . , or n times of the T value as the periodicity for each of the remaining (M−1) CSI-RS resources.

This is a type that further alleviates the restriction and an alleviated restriction of a type that 'allows the transmission of all of the M-CSI-RSs to be shown at least one time in the specific L subframes' may be granted.

Then, the UE may be defined/configured to perform selection among corresponding M CSI-RS resources during an interval in which the transmission of all M CSI-RSs is shown and report a specific (alternatively, selected) CSI-RS resource.

UE Capability (Information) Signaling

Hereinafter, a UE capability signaling method including the UE capability information proposed in the present specification will be described in detail through related embodiments.

First Embodiment

First, the first embodiment provides a method for transmitting/receiving a UE capability signaling including information on the number of all CSI-RS ports in a beamformed CSI-RS based CSI method (Class B type).

That is, the first embodiment is a method that provides the capability information of the UE regarding the number of all CSI-RS ports which exist in the CSI process to the network through the UE capability signaling.

For example, when M NZP CSI-RS resources (each CSI-RS resource includes K CSI-RS ports) are included in the CSI process, in the case where upperlimit values for M and K values are not determined, implementation complexity of the UE occurs as much when the M and/or K values are configured as large values.

In such a case, the UE may not implement all of the numbers of all cases due to the implementation complexity.

In the present specification, the number of NZP CSI-RS resources may be expressed as 'M or K' and the number of CSI-RS ports for each CSI-RS resource may be expressed as 'K or M'.

For example, when the number of NZP CSI-RS resources may be expressed as 'K' and the number of CSI-RS ports for one CSI-RS resource may be expressed as 'M'.

The UE may transmit the UE capability signaling for the M and/or K values to the base station upon initial connection with the network.

The UE capability signaling may be defined, configured, or expressed in various forms.

For example, the UE may be defined/configured to provide to the network a capability signaling including a condition that 'total number of ports (P=MK) in a CSI process' depending on the configured M and/or K value is not more than a specific P_max value.

IN this case, candidate P_max values may be pre-defined so that the UE signals an available P_max value among specific several values.

For example, the UE may select any one of available P_max values of 8, 12, 16, 24, 32, and 64 and capability-signal the selected P_max value to the network.

In addition, the specific values such as 8, 12, 16, 24, 32, and 64 may be predetermined.

The as 8, 12, 16, 24, 32, and 64 values are one example and another value may be defined or only some values of the corresponding values may be defined.

That is, for the UE, the total number of ports (P=MK) in one (alternatively, specific) CSI process, which is not more than the P_max value may be a value directly significant to the UE complexity.

Therefore, the UE may define the P_max value in a manner to capability-signal the P_max value.

FIG. 22 is a flowchart illustrating one example of a UE capability information signaling method proposed by the present specification.

First, the UE transmits UE capability information including first control information indicating the total number of CSI-RS ports maximally supported by the UE to the base station using a high layer signaling (S2210).

The first control information may be referred to or expressed as total CSI-RS port number information.

That is, the first control information is information indicating the total number of CSI-RS ports that the UE may support in one or a specific CSI process.

Hereinafter, the total number of CSI-RS ports that the UE may maximally support is expressed as 'P' and P is equal to the product of the M value and the K value (P=M*K).

Herein, the value of the first control information may be included in the UE capability information when the beamformed CSI-RS based CSI reporting method, that is, the CSI reporting type (or class type) of the UE is 'Class B'.

In this case, the value of the first control information may be, for example, 8, 12, 16, 24, 32, 64, etc.

Herein, the UE capability information (or UE capability signaling) may further include second control information in addition to the first control information.

The second control information is information indicating the total number (M) of CSI-RS resources maximally supported by the UE in one or a specific CSI process.

Herein, the value of the second control information may be included in the UE capability signaling when the beamformed CSI-RS based CSI reporting method, that is, the CSI reporting type (or class type) of the UE is 'Class B'.

Herein, the UE may transmit the first control information and the second control information together or may first transmit the first control information and then transmit the second control information.

A detailed method in which the UE first transmits the second control information will be described in a second embodiment to be described below.

Thereafter, the base station determines a CSI-RS configuration to be transmitted to the UE based on the received UE capability signaling (S2220).

Thereafter, the UE receives the (determined) CSI-RS configuration information from the base station (S2230).

Herein, the CSI-RS configuration information may be transmitted while being included in a CSI process related high layer signaling.

The high layer signaling may be expressed as a CSI process information element (IE).

The CSI process IE may further include a CSI process ID (or Index) indicating the CSI process and CSI reporting type information for each CSI process.

The CSI reporting type information may include at least one of the non-precoded CSI-RS based CSI reporting type or the beamformed CSI-RS based CSI reporting type.

The non-precoded CSI-RS-based CSI reporting type may be expressed as 'Class A' and the beamformed CSI-RS based CSI reporting type may be expressed as 'Class B'.

Then, the UE receives at least one CSI-RS from the base station based on the received CSI process related information (or CSI-RS configuration information) (S2240).

Herein, the at least one CSI-RS is transmitted through at least one CSI-RS port of the base station.

Then, the UE measures a channel for the at least one CSI-RS port based on the at least one received CSI-RS (S2250).

Thereafter, the UE reports or feeds back the channel measurement result to the base station (S2260).

Herein, the reporting or feedback is performed every CSI process.

Second Embodiment

Next, the second embodiment provides a method for transmitting/receiving UE capability information (alternatively, signaling) including information on the total number (M) of CSI-RS resources that may be maximally supported in the beamformed CSI-RS based CSI method (Class B type) and/or information on the total number (K) of CSI-RS ports maximally supported for each CSI-RS resource.

As described in the first embodiment, the information on the total number (M) of CSI-RS resources maximally supported by the UE is expressed as the second control information.

Hereinafter, the information indicating the total number of CSI-RS ports which are maximally supported in one CSI-RS resource or for each CSI-RS resource will be expressed as third control information.

That is, the second embodiment represents a method in which the UE individually signals the M value or K value through the UE capability.

That is, the second embodiment provides a method for individually UE capability-signaling to the base station how many NZP CSI-RS resources the UE may measure in one CSI process and in this case, only up to which value of the number (K) of CSI-RS ports in each NZP CSI-RS resource the UE supports or permits (in terms of implementation).

That is, the UE provides a method in which the UE individually transmits the M and/or K value to the base station.

Herein, the UE may transmit the capability signaling to the base station in a manner to have a specific condition between the M value and the K value.

For example, the UE may individually capability-signal the M and K values in a form of K_max1 when M_max is equal to or less than a specific value or another K_max2 when M_max is equal to or more than the specific value.

When the base station receives a capability signaling having a specific condition between the M and K values from the UE, the base station provides an associated CSI-RS configuration to the UE within a range to satisfy corresponding capability-signaled upperlimit values at the time of providing the CSI process and the NZP CSI-RS to the UE.

FIG. 23 is a flowchart illustrating another example of the UE capability information signaling method proposed by the present specification.

First, the UE transmits the UE capability signaling including the second control information to the base station (S2310).

The second control information is information indicating the total number of CSI-RS resources that the UE may maximally support in one or a specific CSI process.

The value of the second control information may be included in the UE capability signaling when the beamformed CSI-RS based CSI reporting method, that is, the class type is 'Class B'.

In addition, the UE capability signaling may further include the third control information.

That is, the third control information is information indicating the maximum number of supported CSI-RS ports for each CSI-RS resource in one or specific CSI process.

The maximum numbers of CSI-RS ports for the respective CSI-RS resources may be the same as each other or different from each other.

Thereafter, the base station determines a CSI-RS configuration to be transmitted to the UE based on the received UE capability signaling (S2320).

Thereafter, the UE receives the (determined) CSI-RS configuration information from the base station (S2330).

As described in the first embodiment, the CSI-RS configuration information may be included in the CSI process IE.

Then, the UE receives at least one CSI-RS from the base station based on the received CSI process related information (or CSI-RS configuration information) (S2340).

Herein, the at least one CSI-RS is transmitted through at least one CSI-RS port of the base station.

Then, the UE measures the channel for the at least one CSI-RS port based on the at least one received CSI-RS (S2350).

Thereafter, the UE reports or feeds back the channel measurement result to the base station (S2360).

Herein, the reporting or feedback is performed every CSI process.

Third Embodiment

Next, the third embodiment provides a method for transmitting/receiving the UE capability signaling including the class type information of the UE related to the CSI reporting operation.

Herein, the class type of the UE may be divided into Class A type and Class B type.

Class A type represents the UE that supports or implements the non-precoded type CSI-RS based CSI operation and Class B type represents the UE that supports or implements the beamformed type CSI-RS based CSI operation.

That is, the UE transmits to the base station a capability signaling including UE class type information regarding whether to support a non-precoded type CSI-RS related operations (including CSI reporting) and/or whether to support a beamformed type CSI-RS related operation (including CSI reporting).

The expression of 'A and/or B' used in the present specification may be construed as 'including at least one of A and B'.

The base station configures the CSI process and NZP CSI-RS resource (whether it is a non-precoded type or a beamformed type) and/or CSI reporting related configurations of the UE, which are associated with the configuration for the UE based on the capability signaling including the UE class type information and provides the configurations to the UE.

In addition, the UE may individually provide to the base station information indicating whether a hybrid scheme utilizing both the non-precoded CSI-RS based CSI method and the beamformed CSI-RS based CSI method is supported, through the capability signaling.

Fourth Embodiment

Next, the fourth embodiment provides a method in which the UE transmits to the base station a UE capability signaling indicating whether to support only specific some parameters (alternatively, schemes) among (non-precoded CSI-RS based or class A type) CSI reporting operation related parameters (alternatively, schemes).

For example, there may be a configurable codebook scheme shown in Table 10 below among non-precoded CSI-RS based CSI reporting related schemes.

In the fourth embodiment, a case of rank 1 will be described as one example.

TABLE 10

(When a KP structure is adopted, a rank-1 precoder $W_{m,n,p}$ has the following form in a master codebook.)

$$W_{m,n,p} = [w_0 \ w_1 \ \ldots \ w_{N_{CSRS}-1}] = \frac{1}{\sqrt{N_{CSIRS}}} \begin{bmatrix} v_m \otimes u_n \\ \varphi_p(v_m \otimes u_n) \end{bmatrix},$$

herein,
$N_{CSIRS}$ = number of configured CSI-RS ports in the CSI-RS resource (the number of CSI-RS ports configured in the CSI-RS resource), e.g., 12, 16, etc.
$u_n$ is a Nx1 oversampled DFT vector for a first dimension, whose oversampling factor is $o_1$.
$V_m$ is a Mx1 oversampled DFT vector for a second dimension, whose oversampling factor is $o_2$.

$\varphi_p$ is a co-phase, e.g., in a form of $e^{\frac{2\pi p}{4}}$, $p = 0, 1, 2, 3$.

When a dual codebook structure is also adopted as well as the KP structure, precoder indexes m, n, and p are indicated by PMIs of $i_{1,1}$, $i_{1,2}$, and $i_2$
and herein, $i_{1,1}$ and $i_{1,2}$ correspond to first PMI(W1) and, $i_2$ corresponds to second PMI(W2).
$i_{1,1}$ determines the beam group in the first dimension;
$i_{1,2}$ determines the beam group in the first dimension; and
$i_2$ selects one beam among the beams of the beam group constituted by $\{i_{1,1}, i_{1,2}\}$ and determines co-phase. Effectively, $i_2$ may be de-composed to $i_{2,1}$, $i_{2,2}$, p in order to indicate the beam selection and co-phase.
With respect to the master codebook structure depending on the structure TABLE 10-continued proposed in the present specification, the following parameter group needs to be embodied for each dimension d.
an oversampling factor $o_d$;
a beam skip number $s_d$ (for $W_{1,d}$; the first beam in adjacent beam group is $s_d$ beams away from that of the current beam($W_{1,d}$);
a beam spacing number $p_d$ (for $W_{2,d}$; the beam spacing within the beam group is $p_d$) and;
a number of beams $L_d$ (number of beams in a beam group in dimension d)
In order to support various antenna deployment scenarios and antenna configurations, some parameters among the above parameters need to be configured.

As an advantage of the configurable codebook structure shown in Table 10, various parameters in Table 10 are configured for and provided to the UE through higher layer signaling to perform the CSI reporting operation by applying a codebook generated with the corresponding parameters.

Accordingly, a codebook suitable for various deployment scenarios and antenna configurations are optimized even with respect to various deployment scenarios and antenna configurations through the corresponding configurable codebook structure to be applied to the UE.

Therefore, it is advantageous in that system performance may be optimized through the configurable codebook structure shown in Table 10.

However, in terms of the implementation of the UE, there may be a disadvantage in that the implementation complexity may increase because the UE needs to implement codebooks which may be generated with respect to all combinations of candidate values which the parameters may have as the parameters may be arbitrarily configured.

Accordingly, hereinafter, in order to reduce or solve the implementation complexity of the UE, there is provided a method in which the UE transmits the UE capability signaling including information indicating only which value(s) of the respective parameters may be applied to the UE to the base station.

For example, the UE may capability-signal a list of specific values which are implemented (alternatively, applicable) thereby to the base station with respect to at least one of parameters 1) to 4) given below.

Herein, the UE may capability-signal a separate value for each dimension with respect to at least one of parameters 1) to 4) given below.

1) an oversampling factor $o_d$
2) a beam skip number $s_d$: The first beam in adjacent beam group is $s_d$ beams away from that of the current beam with respect to $W_{1,d}$.
3) a beam spacing number $p_d$): For $W_{2,d}$; the beam spacing within the beam group is $p_d$.
4) a number of beams $L_d$: represents the number of beams in a beam group in dimension d.

With respect to the respective parameters 1) to 4), the UE may capability-signal some values among, for example, 1, 2, 4, 8, 16, . . . values to the base station.

Alternatively, the UE may capability-signal a maximum value and/or a minimum value among the values of 1, 2, 4, 8, 16, . . . to the base station.

As described above, the UE may transfer individual respective parameters to the base station through the capability signaling.

However, as another example, a parameter set shown by a specific combination of some parameters among the parameters 1) to 4) may be newly defined.

At least one of the newly defined parameter set (information) may be capability-signaled to the base station.

One example of the new parameter set defined by combining the parameters 1) to 4) may be given below.

(e.g.,) parameter set 1 may be constituted or defined like $\{o_{d=1}=8, o_{d=2}=16, s_{d=1}=2, s_{d=2}=2, p_{d=1}=1, p_{d=2}=1, L_{d=1}=4, L_{d=2}=4\}$.

Like the above example, another parameter sets 2, 3, . . . may be constituted by a combination of some of the parameters 1) to 4).

Accordingly, the UE may capability-signal at least one parameter set defined as above to the base station.

In this case, when the base station provides the configurable codebook type configuration information to the UE, the base station selects at least any one of the parameter sets included in the capability signaling transmitted by the UE and configures and provides the selected parameter set for and to the UE.

Additionally, in capability-signaling of the individual parameters or the parameter set form, the codebook parameters and the codebook parameter set may be configured, which vary depending on the number of CSI-RS ports of a specific NZP CSI-RS resource to which the corresponding codebook is to be applied.

Accordingly, the UE may be defined/configured to capability-signal the parameter set information configured as the parameters 1) to 4) or the combination of the parameters 1) to 4) for each (CSI-)RS port number considered in the capability signaling to the base station (that is, the number of CSI-RS ports in the corresponding resource per NZP CSI-RS resource, which is considered).

The number of cases of 'the number of (CSI-)RS ports' considered above may be defined by transmitting to the base station the parameter or the parameter set related capability information by the UE with respect to is the total number of CSI-RS ports per specific CSI process supported (in a specific TM) or the number of CSI-RS ports in a specific NZP CSI-RS resource.

Alternatively, the base station may announce whether the UE provides the parameter or parameter set-related capability signaling information with respect to a specific '(CSI-)RS port number' value as part of the system information at initial connection with the UE.

In more detail, a separate CSI reporting class identified as the type of CSI reporting Class A and Class B in the CSI process configuration may be configured/identified.

That is, the UE receives from the base station the CSI process configuration information of a type in which the CSI reporting type or the CSI reporting related class is configured from the base station.

Thereafter, the UE verifies whether Class A or Class B is configured in relation with the CSI reporting based on the received CSI process configuration information.

Thereafter, the UE performs the CSI reporting operation associated with the verified class based on the verification result.

Accordingly, in terms of the UE capability signaling, when the base station receives information related with Class (type) of the UE from the UE, the base station may know whether all association operations (e.g., CSI measurement, CSI reporting, and the like) depending on Class A type and/or Class B type may be performed (alternatively, implemented) or whether only an association operation (e.g., CSI measurement, CSI reporting, etc.) depending on one specific class type among two class types may be performed, or whether all of the operations of Class A and Class B are not supported, through the capability signaling of the UE.

In addition, the UE may individually independently capability-signal to the base station the associated parameters (e.g., the number of CSI-RS ports) that may be supported for Class A (type) and the associated parameters (e.g., the total number of CSI-RS ports, the number of CSI-RS resources, the maximum number (K) of supported CSI-RS resources, the number (N_k) of CSI-RS ports per CSI-RS resource, L value for L-port CSI reporting and associated parameters) which may be supported in Class B.

That is, the UE may independently capability-signal each of the associated parameters for supporting Class A and/or the associated parameters for supporting Class B to the base station.

Herein, the associated parameters for supporting Class A may be codebook parameters including information including N1 (the number of horizontal antenna ports), N2 (the number of vertical antenna ports), O1 (a horizontal oversampling value), O2 (a vertical oversampling value), codebook config., and information indicating whether CDM-4 is supported or a new parameter set configured by the combination of some parameters of the codebook parameters.

As one example, the associated parameters for supporting Class A may include codebook configuration information related with a 2D codebook.

The codebook configuration information may include codebook configuration information for selection of the beam group non-precoded CSI-RS (alternatively, Class A type), that is, codebook config. (index) 1, 2, 3, and 4.

The codebook configuration information may be configured differently according to the rank.

Accordingly, the base station provides to the UE the CSI configuration so as not to violate the capability signaling information of the UE, which is associated with the corresponding class type according to which class of Class A and Class B is configured.

Further, at least one of information included in the capability signaling proposed in the present specification may be signaled individually/independently 1) for each specific band (e.g., component carrier; CC), 2) for specific band combination (when the CA is considered, a carrier aggregation combination), or 3) for each band combination.

In the case of Term 1), there is an advantage in that even though the CA is considered, detailed capability information may be more flexibly transferred for each band (e.g., CC).

Tem 2) may be defined/configured when the capability signaling applicable for each specific considered band combination is transferred and a CA related configuration depending on the corresponding band combination (alternatively, CA) is thus provided (e.g., Pcell/Scell addition configuration, etc.), when the CSI process associated configuration is provided (through the CSI process IE) for each CC, when the capability signaling is transferred in a form in which the information included in the capability signaling is commonly applied to the corresponding band combination (alternatively, for each corresponding band combination when the capability signaling is transferred independently for each band combination).

FIG. 24 is a flowchart illustrating yet another example of the UE capability information signaling method proposed by the present specification.

First, the UE transmits the UE capability signaling including fourth control information to the base station (S2410).

The fourth control information may be simply expressed as control information.

The fourth control information is information indicating which codebook configuration a UE related to the 2D-AAS structure supports (or implements).

The fourth control information indicates a codebook configuration related with Class A, that is, the non-precoded CSI-RS operation.

Further, the fourth control information may indicate a codebook configuration related to beam group selection for long-term CSI feedback in the 2D-AAS structure.

The codebook configuration may include at least one of codebook configurations 1 to 4.

That is, the UE may announce which codebook configuration of codebook configurations 1 to 4 related with the 2D-AAS structure is supported or which codebook configuration is implemented to base station through the capability signaling.

The codebook configuration may vary depending on the rank number.

Thereafter, the base station determines a codebook configuration to be transmitted to the UE based on the received UE capability signaling (S2420).

Therefore, the UE receives the higher layer signaling including the (determined) codebook configuration from the base station (S2430).

Thereafter, the UE receives the CSI-RS or at least one CSI-RS port transmitted through at least one antenna port from the base station based on the received higher layer signaling (S2440).

In detail, the UE may select a beam (alternatively, antenna port) group for receiving at least one CSI-RS based on the determined codebook configuration.

In addition, the UE receives and measures the CSI-RS through at least one beam in the selected beam group.

Thereafter, the UE estimates the channel through the received CSI-RS (S2450).

Thereafter, the UE determines a precoding matrix related with the estimated channel in the codebook (S2460).

Therefore, the UE feeds back a precoding matrix index (PMI) corresponding to the determined precoding matrix to the base station (S2470).

Herein, the feedback for the selected beam group is performed during the longer term and the feedback for the beam in the selected beam group is performed during the short term.

That is, the feedback is divided into long-term feedback and short-term feedback.

Herein, the reporting or feedback is performed every CSI process.

<Proposal Content 1-1: New CSI-RS Resource Configuration>

Next, a method for configuring a new CSI-RS resource will be described.

In the above description, a focus is brought to specific cases of 12-port and 16-port CSI-RS patterns.

However, when it is considered that the port will be extended up to 32 ports or more in the future, it may be more advantageous to maintain slight flexibility in configuring M (>8)-port CSI-RS resource in a more normal form.

In such a viewpoint, <Proposal content 1-1> to be described below considers new CSI-RS resources that may be configured with multiple CSI-RS resources in legacy 2-port, 4-port, and/or 8-port.

According to <Proposal content 1-1>, a specific M-port CSI-RS may be supported, in which candidate M values may be restricted to a multiple 4, that is, M=4, 8, 12, 16, etc. for simplification.

<Proposal content 1-1> may be divided into two methods as below.

(Method 1): For the UE that supports EBF/FD-MIMO, the CSI process may be configured with multiple legacy (4-port) CSI-RS resources.

(Method 2): For the UE that supports EBF/FD-MIMO, a new type of CSI-RS resource may be configured to include multiple merged legacy (4-port) CSI-RS resources.

Further, for CSI-RS enhancements that support 8 CSI-RS ports or more (e.g., 16, 32, 64, etc.), multiple different beamformed CSI-RS port-groups may be configured per CSI-RS configuration In addition, different CSI-RS port-groups may be transmitted in different subframes.

Consequently, a considerable number of CSI-RS ports among all CSI-RS ports may be TDXed in a subframe level while satisfying the maximum 6 dB CSI-RS power boosting condition at present.

Potential Codebook and CSI Feedback Enhancements

Hereinafter, for easy description, it is assumed that the UE is configured with a total of 32 CSI-RS ports in order to support FD-MIMO CSI feedback.

For example, the UE may have four port-groups and recognize that each port group is associated with the existing 8-port CSI-RS pattern as illustrated in FIG. 25 below.

The network allows four different vertical beamformed CSI-RSs to be transmitted per cell.

In this case, the respective beamformed CSI-RSs correspond to different port groups.

Each UE connected to the corresponding cell may perform the FD-MIMO CSI feedback and include the following two parts for a CSI feedback chain.

Part 1: port-group feedback selected based on selection of the corresponding codebook Part 2: horizontal short-term CSI feedback based on existing constant-modulus The periodicity of the vertical beam selection feedback of Part 1 may be relatively longer than that of the existing horizontal feedback, that is, the feedback of Part 2.

In respect to RI and PMI feedback, whether the UE is permitted to select one or more port groups needs to be first examined.

When a situation for a normal structure is assumed, the UE calculates an FD-MIMO association precoder ($W_D$) by Equation 20 below and reports the calculated FD-MIMO association precoder to the base station.

$$W_D = \lfloor w_0^{(V)} \otimes W_0^{(H)} w_1^{(V)} \otimes W_1^{(H)} \Lambda w_{R_V-1}^{(V)} \otimes W_{R_V-1}^{(H)} \rfloor \quad \text{[Equation 20]}$$

Herein, $W_D^{(V)} = \lfloor w_0^{(V)} w_1^{(V)} \Lambda w_{R_V-1}^{(V)} \rfloor$.

Herein, $W_D^{(V)}$ is selected by codebook selection and $W_D^{(H)}$ is selected by the existing constant-modulus codebook.

$R_V$ represents the rank of $W_D^{(V)}$ and represents how many port groups are selected by the UE.

$w_r^{(V)}$ is a selection vector and represents a selected r-th port group.

$W_r^{(H)}$ corresponds to the existing horizontal precoding matrix only in the r-th selected port group.

When the rank of $W_r^{(H)}$ is expressed as $R_H(r)$, all ranks of the FD-MIMO association precoder $W_D$ are given by $$\sum_{r=0}^{R_V-1} R_H(r).$$

Therefore, all ranks are the sum of respective horizontal ranks $R_H(r)$ obtained every selected port group r.

FIG. 25 illustrates one example of an 8-port CSI-RS pattern in an existing PRB pair.

Hereinafter, an evaluation result for a comparison between the long term vertical feedback and the dynamic vertical feedback having the existing horizontal feedback may be verified.

A long-term vertical feedback case may be regarded as baseline category 2 having virtual sectorization.

In addition, a dynamic vertical feedback case as a special case is related with a proposed method having a restriction of vertical rank 1.

As illustrated in FIG. 26, when all 32 antenna elements for 2D-AAS are considered, mapping transceiving Units (TXRUs) and the antenna elements one to one is assumed.

FIG. 26 is a diagram illustrating one example of a 2D-AAS antenna configuration.

Table 11 given below is a table showing a simulation result of comparing longer-term and short-term based on the vertical feedback.

A vertical beam selection margin of 3 dB is applied to the long-term vertical feedback.

TABLE 11

|  | UE average Throughput (kbps) | 5% UE throughput (kbps) |
|---|---|---|
| Long-term vertical feedback | 2779(100%) | 509(100%) |
| Dynamic vertical feedback | 2927(111%) | 596(117%) |

As shown in Table 11, it can be seen that the performance of the dynamic vertical feedback case is a little better than the long-term vertical feedback case in 5% UE throughput.

It is anticipated that a vertical channel variance is small.

Accordingly, dynamic channel adaptation does not seem to be so effective in this case.

However, in an environment having a larger vertical channel variance, such as an HetNet environment, in a case where there is no vertical rank restriction in which $R_V$ may become 1 or more, or in an environment having 2 UE Rx antenna cases or more, the dynamic channel adaptation needs to be further researched.

Hereinafter, contents related with a CSI process definition to which the methods proposed in the present specification may be applied will be described.

(Concept 1)

Concept 1 is the CSI process for PMI based reporting and there are two class types (class A type and class B type) in the CSI reporting.

The CSI reporting CSI process having the PMI may be configured to have any one of two CSI reporting classes (class A and class B) or both two classes.

Class A: The UE reports the CSI to the base station according to W=W1*W2 codebook based on {[8], 12, 16} CSI-RS ports.

Class B: The UE reports an L port CSI to the base station by assuming any one of four methods given below.

Method 1) Beam selection indicator (BI) for selecting the beam and L-port CQI/PMI/RI for the selected beam In the CSI process, the total number of ports configured with respect to all CSI-RS resources is larger than L.

Method 2) L-port precoder from a codebook reflecting both co-phasing by associating the beam selection and two crossing polarizations The total number of ports configured in the CSI process is L.

Method 3) A codebook reflecting the beam selection and the L-port CSI for the selected beam In the CSI process, the total number of ports configured with respect to all CSI-RS resources is larger than L.

Method 4) L-port CQI/PMI/RI

The total number of ports configured in the CSI process is L.

When the CSI measurement restriction is supported, Method 4 is continuously configured.

(Concept 2)

CSI process (relationship with the CSI-RS resource) having CSI reporting Class A and Class B The CSI process is associated with K CSI-RS resources/configurations having $N_k$ ports for a k (k>=1)-th CSI-RS resource.

The maximum total number of CSI-RS ports in one CSI process

The maximum total number of CSI-RS ports is 16 with respect to CSI reporting class A.

12-port/16-ports CSI-RS is an aggregation of K (K>1) CSI-RS resources/configurations having 2/4/8 ports.

<Proposal Content 1-2>

A bitwidth of the beam selection indicator (BI) which the UE reports to the base station depends on a configured K value and has a maximum of 3 bits.

Value of $N_{total}$

The value of $N_{total}$ indicating the total number of CSI-RS ports configured in the Rel-13 CSI process varies depending on the UE capability.

For example, when it is considered that an integer multiple of the number of ports (1, 2, 4, or 8 ports) which EBF/FD-MIMO may legacy-configure with respect to class B and 12-port and 16-port CSI-RSs for class A are newly supported, an available $N_{total}$ value may become {12, 16, 24, 32, 48, 64}.

For example, the $N_{total}$ value may be fixed to one specific value such as 32 or 64, but one commonly permitted $N_{total}$ value may not be preferable. The reason is that when the $N_{total}$ value has one specific value, the UE implementation and complexity may be significantly influenced.

It is advantageous to have slight flexibility in term of the UE implementation for targeting a high-capability UE or low-capability UE.

In addition, defining candidate $N_{total}$ values may be preferred in terms of flexibility.

Accordingly, the $N_{total}$ value depends on the UE capability for permitting flexible UE implementation that targets different situations.

For example, as the $N_{total}$ value, the candidate values such as 12, 16, 24, 32, 48, and 64 may be preferably defined.

Hereinafter, CSI reporting features of Class A and/or Class B will be described in brief.

First, the UE may capability-signal UE capability information indicating whether to support Class A and/or Class B CSI reporting to the base station.

The reason is that Class A and Class B perform different CSI reporting related operations.

Accordingly, it is more advantageous to have the flexibility in terms of the implementation of the UE for selectively implementing any one class of Class A and Class B or both Class A and Class B.

Further, the UE may transmit the number of additional supported UpPTS symbols, the number of supported combs, and information indicating whether an Rel-13 DMRS table is supported to the base station through the capability signaling.

Further, the UE may transmit a capability signaling including information indicating whether to support (alternatively, implement) only enhanced periodic SRS transmission, or whether to support (alternatively, implement) only enhanced aperiodic SRS transmission, or whether to support both the enhanced periodic SRS transmission and the enhanced aperiodic SRS transmission in association with an RRC configuration message for enhanced periodic SRS/aperiodic SRS transmission to the base station as shown in Table 12 below.

Therefore, the base station may configure the UE to perform additional SRS transmission based on the capability signaling transmitted by the corresponding UE.

TABLE 12

| Sounding RS-UL-Config Dedicated-extended UpPTs | Sounding RS-UL-Config Dedicated-Aperiodic extended UpPTs |
|---|---|
| SRS configuration parameter for extended UpPTS for trigger type 0 | SRS configuration parameter for extended UpPTS for trigger type 1 |
| Same set of parameters and value ranges are used as in Sounding RS-UL-ConfigDedicated, with an exception of adding new parameter(number-of-combs) and revising value ranges of the parameters (transmissionComb, cyclicShift) | Same set of parameters and value ranges are used as in Sounding RS-UL-ConfigDedicatedAperiodic-r10, with an exception of adding new parameter(number-of-combs) and revising value ranges of the parameters (transmissionCombAp, cyclicShiftAp) |
| Independently configured per cell | Independently configured per cell |
| This parameter is configured only when Number-of-additional-Uppts is configured. | This parameter is configured only when Number-of-additional-Uppts is configured. |

Therefore, the base station configures only the class in the CSI process configuration which the UE capability-signals for the UE.

Further, the UE capability-signals to the base station N1, N2, O1, O2, Codebook Config. (e.g., codebook config., Indexes 1, 2, 3, and 4), and information indicating whether CDM-4 is supported, that is, the codebook parameters related with class A, or information obtained by associating some parameters among the codebook parameters to report more detailed parameters for each class to the base station.

Further, the UE may transmit a capability signaling including information indicating whether to support (alternatively, implement) only a channel MR operation, or whether to support (alternatively, implement) only an interference MR operation, or whether to support both the channel MR operation and the interference MR operation in association with an RRC configuration message for channel measurement restriction (MR) and/or interference MR to the base station as shown in Table 13 below.

Therefore, the base station configures the channel MR and/or interference MR for the UE based on the capability signaling transmitted by the corresponding UE.

TABLE 13

| Channel-Measurement-Restriction | Interference-Measurement-Restriction |
|---|---|
| Indicate whether measurement restriction is on or off for channel measurement | Indicate whether measurement restriction is on or off for interference measurement |
| 1 bit to indicate whether measurement restriction is on or off for channel measurement | 1 bit to indicate whether measurement restriction is on or off for interference measurement |
| Independently configured per CSI process per subframe subset per cell | Independently configured per CSI IM per CSI process per subframe subset per cell |
| Applies for class B | 1 = ON |
| 1 = ON | 0 = OFF |
| 0 = OFF | |

With respect to Class B, the UE may report whether to support only W2 feedback having PMI−config=1 to the base station and when K>1, the K value maximally supported by the UE may be announced to the base station.

Fifth Embodiment

A new CSI process supports only PUSCH based aperiodic CSI reporting (PUSCH based aperiodic CSI reporting).

In addition, in the case of PUCCH-based CSI reporting, one legacy CSI-RS resource corresponding thereto is added and inserted at all times, thereby performing only legacy PUCCH-based periodic CSI-RS reporting.

In this case, the new CSI process may configure pairing of one new (e.g., 12 or 16 port) CSI-RS resource and one legacy (e.g., 1, 2, 4, or 8 port) CSI-RS resource.

In addition, the new CSI process divides or separates a new CSI-RS resource to perform aperiodic CSI reporting and the legacy CSI-RS resource to perform legacy CSI-RS resource.

However, limiting the PUCCH-based periodic CSI reporting to only apply to legacy CSI-RS resources in the new CSI process may have a problem of impairing or limiting the efficiency and effectiveness of periodic CSI-RS feedback.

Accordingly, a fifth embodiment to be described below provides a method for performing PUCCH-based periodic CSI reporting on a new CSI-RS resource in a new CSI process.

When the PUCCH-based periodic CSI reporting is performed using the legacy CSI-RS resource, a legacy CSI process is used.

That is, there is provided a more effective method of operating CSI reporting that prevents UE capability from being not greater.

For example, from the viewpoint of capability signaling, the UE may transmit to the base station capability signaling related to legacy (P: number of supported CSI processes) P value (e.g., 1, 3, 4) for each band combination (for each CA).

Herein, as additional capability signaling of the UE, the UE may notify to base station information indicating how many CSI processes in which enhanced Class A such as 16-port or 12-port is supported may be further added.

For example, it is assumed that when the UE transmits to the base station capability signaling including the number of legacy Ps, a value of 'P=3', the UE transmits to the base station capability signaling including the number Q of additional CSI processes, a value of 'Q=2' (for example, in the case of 16-port).

In this case, the base station may recognize that the UE may configure or support a total of P+Q=5 CSI processes.

At this time, it is possible to restrict that only aperiodic (A)-CSI reporting may be configured for 'Q=2', that is, the added CSI process.

Further, for 'P=3', periodic (P)-CSI/aperiodic (A)-CSI are all possible, and as described above, for 'Q=2', only A-CSI reporting may be configured.

As a result, a restriction that a new CSI process should always include all two CSI-RS resources may be avoided.

In addition, the UE may transmit capability signaling to the base station, which includes an additional parameter N 'for each band combination per band' and/or 'for each band combination'.

In the content related with the calculation relaxation of the currently defined CSI calculation complexity, if the triggering is performed within X (e.g., X=4 ms) for P+Q unconditionally, an operation that all A-CSI reportings may be performed may be modified.

Accordingly, the UE may be defined to perform A-CSI reporting only up to N corresponding to the additional parameters.

For example, P+Q=5, but N=3.

Two legacy configurations of P=3 may be implicitly considered as a pair relationship only for PUCCH based reporting mode (which is a kind of Q=2 enhanced configuration).

In addition, there is an advantage that P+Q=5, but the number of simultaneous A-CSI reportings may be still maintained by P=N=3 to be the same as that of the legacy.

<Proposal Content 2>

When a non-precoded CSI-RS method is considered for supporting a FD-MIMO operation, the number of NZP CSI-RS ports settable per CSI process needs to be increased.

Potential Non-Precoded CSI-RS Enhancements

For a beamformed CSI-RS, a TDM type design for different CSI-RS port-groups needs to be considered.

Each CSI-RS port group includes different beamformed CSI-RS ports.

Herein, the scale of a TDM may be several subframes or more.

Due to the application of different vertical-beamformed ports for one port-group, different port-groups need not be transmitted at the same time (or almost simultaneously, for example, within a pair of OFDM symbols).

A CSI feedback of the UE may include a port-group selection feedback based on the codebook selection, like a vertical feedback, and include an existing short-term CSI feedback based on an existing constant-modulus (CM) codebook like a horizontal feedback.

In the case of considering a design for a non-precoded CSI-RS based method with 8 ports or more (e.g., 16, 32, or 64 ports), a subframe-level TDM between CSI-RS ports within the same CSI-RS resource needs to be measured at all non-precoded CSI-RS ports.

The non-precoded CSI-RS design method may be classified into the following two methods (a TDM-based non-precoded CSI-RS and an FDM-based non-precoded CSI-RS).

Scheme 1: Design of TDM-Based Non-Precoded CSI-RS

FIG. 25 shows the existing 8-port CSI-RS patterns, and it can be seen that a total of 40 ports per PRB pair for each subframe may be used.

According to the same design principle in terms of time spread, RS ports within one CSI-RS resource may be defined to support FD-MIMO of a maximum of 24 ports (all REs in the ninth and tenth OFDM symbols in FIG. 25) for each CSI-RS resource.

However, a direct extension for increasing the number of CSI-RS ports to 24 may still not cover a case for 32 ports and 64 ports.

Further, the 24-port CSI-RS may be used only once per subframe, and other 8-port CSI-RS pattern 0 (in the fifth and sixth symbols in FIG. 25) and 8-port CSI-RS pattern 4 (in the twelfth and thirteenth symbols in FIG. 25) may not be used to support the FD-MIMO.

The 8-port CSI-RS patterns present in the PRB pair will be described with reference to FIG. 25 above.

Particularly, in FIG. 25, accurate 32-port CSI-RS configuration including 8-port CSI-RS patterns 1, 2, 3, and 4 may be defined.

Herein, the time spread of the RS port is a length of 4 OFDM symbols.

In this case, the remaining 8-port CSI-RS pattern 0 may be used for legacy UE support.

Similarly, accurate 16-port CSI-RS configuration including 8-port CSI-RS patterns x and y may be defined.

Herein, (x,y) may be (1,2), (1,3), or (2,3).

In this case, the time spread of the RS port has the same OFDM symbol length as the legacy.

Alternatively, in order to design a 16-port CSI-RS configuration, it may also be considered that the 8-port CSI-RS pattern 4 is included.

(Proposal 1): A non-precoded CSI-RS configuration to 32 ports in one subframe may be considered by reusing legacy 8-port CSI-RS patterns.

To support a 64-port CSI-RS configuration for FD-MIMO, a non-precoded CSI-RS design for TDM may include two schemes as follows.

Each scheme has extension of multiple subframes and additional RE usage, as summarized below.

(Method 1-1): Additional extension in multiple subframes (Method 1-2): Use additional REs in addition to existing candidate CSI-RS REs First, scheme 1-1 allows the merging of multiple subframes for REs available for 64 or more CSI-RS ports.

However, in this case, a part for overcoming a channel phase offset between RS ports transmitted in subframes of different types of compensation methods is required.

For example, the UE may compensate for the channel phase offset evaluated by the CRS measured in different subframes.

Accordingly, the above contents are applied to measure the CSI-RS-based channel when acquiring the CSI for FD-MIMO.

Next, method 1-2 defines additional REs that may be used for CSI-RS ports for the FD-MIMO purpose.

For example, the same patterns of the existing 8-port CSI-RS patterns 1, 2, and 3, for example, new pattern indexes of patterns 1a, 2a and 3a may be repeated the second and third OFDM symbols.

Accordingly, for supporting the FD-MIMO, a total of 8 8-port CSI-RS patterns may be included in one subframe, resulting in 64 ports.

For such a configuration, the PDCCH length is limited to the first two OFDM symbols.

The occurrence of such a specific subframe may be preset to the UE or provided to the UE through (higher layer) signaling.

(Proposal 2): In addition to the existing candidate CSI-RS REs, additional REs may be considered to support the 64-port CSI-RS configuration in one subframe.

(Method 2): Design of FDM-based non-precoded CSI-RS

The approach of the FDM-based non-precoded CSI-RS design may first consider an RB level FDM CSI-RS port to increase the total number of CSI-RS ports configured to the UE for supporting FD-MIMO.

As shown in FIG. 25, in the currently available CSI-RS patterns, the same RS port is allocated to every 12 subcarriers, and the RS density for one CSI-RS port is '1' for each PRB pair.

In the case of defining a new CSI-RS pattern with RBs proposed in scheme 2, for example, assuming that the same RS port is allocated to every 24 subcarriers, only existing CSI-RS patterns are reused to support up to 64 port CSI-RS configuration in one subframe.

Potential Codebook and CSI Feedback Enhancements

The UE may be configured to have 8 non-precoded CSI-RS ports or more per CSI process to support FD-MIMO.

For example, the UE may acquire a CSI-RS by using a predefined codebook while measuring full CSI-RS ports such as 16, 32, and 64 ports.

Further, the codebook used in such a situation may be a full-sized codebook such as a 16-tx, 32-tx, or 64-tx codebook that needs to be newly defined.

However, designing such a new codebook generally requires much effort.

Accordingly, it is natural to have a systematic codebook structure based on a Kronecker product between existing or DFT-based constant modulus (CM) codebooks.

In the method of Kronecker precoding, a full channel precoding matrix P may be acquired by the following Equation 21 through V-precoding $P_V$ and H-precoding $P_H$ with Kronecker product operators.

$$P = P_V \otimes P_H \qquad \text{[Equation 21]}$$

Herein, a horizontal domain codebook for acquiring H-precoding $P_H$ may be an existing LTE codebook such as 2-tx, 4-tx, and 8-tx codebooks.

However, a type of codebook for a vertical domain codebook preferably uses the same LTE codebook, DFT codebook, or the like for FD-MIMO support.

In the case of using options to be listed below for each vertical codebook, a performance difference will be described.

Option 1: 2-bit DFT codebook
Option 2: 3-bit DFT codebook
Option 3: Rel-8 4-Tx codebook For evaluation for each option, it is assumed that non-co-channel HetNet scenarios for a macro cell (8, 4, 2, 8) and a small cell (4, 2, 2, 16) are considered.

For the macro cell, 1 TXR per polarization is assumed, and for the small cell, 4 TXR per polarization is assumed.

In addition, a bias value for cell association between the small cell and the macro cell is 1.8 dB.

With respect to Option 1, a {75.5, 90.0, 104.5, 120.0} etilt is used for the DFT codebook.

Further, with respect to Option 2, a {41.4, 60, 75.5, 90, 104.5, 120, 138.6, 180} etilt is used for the DFT codebook.

Further, with respect to Option 3, (Rel.8) 4-Tx codebook is used for simulation.

An evaluation result of a full buffer model for each option 1, 2, or 3 is illustrated in Table 14 below.

That is, Table 14 illustrates the results of a full buffer simulation for 5%, 50% UE and average sectors according to different vertical codebook options.

TABLE 14

|  | Average sector Throughput (bps/Hz) | 5% UE Throughput (bps/Hz) | 50% UE Throughput (bps/Hz) |
| --- | --- | --- | --- |
| Option 1 | 2.56 | 0.138 (99%) | 0.486 |
| Option 2 | 2.62 | 0.139 (100%) | 0.499 |
| Option 3 | 2.62 | 0.141 (101.1%) | 0.500 |

Referring to Table 14, performance of each of options 1, 2 and 3 may be almost the same as each other.

In terms of the performance, sufficient performance may be acquired only by using 4 vertical codewords such as Option 1.

That is, when considering the performance viewpoint for the vertical codebook, it can be seen that it is sufficient to use a 2-bit DFT codebook.

<Proposal Content 3>

Hereinafter, when a large number of transmission antennas are implemented in the base station for the FD-MIMO operation, whether the UE measures how many CSI-RS ports will be described.

When considering FD-MIMO in a 2D antenna array system with a large number of antennas, it is necessary to consider whether N-port (N>8) CSI-RS configuration is required.

In a massive MIMO system having a large number of antenna elements, the number of CSI-RS transmission ports may increases proportionally as the number of antenna elements increases.

Even though direct extension may be considered so that the number of CSI-RS ports can be set to 8 or more (for example, extending locations of candidate REs per PRB pair), this may have a significant effect on a current specification including modification of the CSI-RS configuration with N>8 ports and a location of the corresponding RE or subframe-level extension for covering a large number of N-port CSI-RS configurations.

In addition, as the number of Ns per CSI-RS configuration increases, the RS resource overhead also increases proportionally and as a result, throughput may be reduced.

(Proposal 1): Need to review whether N-port (N>8) CSI-RS configuration needs to be embodied It may be preferred to reuse existing CSI-RS configurations (up to 8 ports).

That is, an approaching method based on the existing CSI-RS configuration needs to be considered in order to support FD-MIMO.

A channel correlation matrix may approximate well a correlation of a Kronecker product in an azimuth and elevation dimension.

Therefore, a combination of two CSI-RSs may be considered in the azimuth and elevation dimensions for Kronecker precoding.

Each CSI-RS may have up to 8 ports like the current so that a total of 64 ports may be properly represented by the Kronecker product.

As described above, a large number of antennas may be represented by combinations smaller than the number of CSI-RS ports.

For convenience, an antenna configuration as an example below is considered.

As illustrated in FIG. 27, an antenna array configuration having (M, N, P, Q)=(8, 2, 2, 32) is considered.

In this case, it is assumed that each TXRU is mapped with an antenna element mapped to one CSI-RS port one to one as shown in FIG. 27.

It is assumed that two independent CSI processes are configured to the UE.

1) 4-port H-CSI process: One CSI-RS port per polarization 2) 8-port V-CSI process: One-to-one mapping having 8 TXRUs in one column having the same polarization With respect to CSI-RS port indexing, 1) Port 15-18; Port 15-16 and Port 17-18 are independently co-polarized, and 2) a simulation of port 15-22 is assumed.

FIG. 27 is a diagram illustrating an example of 2D-AAS antenna configuration for potential CSI-RS configuration.

In the method of Kronecker precoding, a full channel precoding matrix P may be obtained by Equation 21 based on V-precoding $P_H$ and H-precoding $P_V$ with Kronecker product operators.

In order to acquire precoding matrixes $P_V$ and $P_H$, the UE may perform CSI measurement in both a V-domain and a H-domain.

As illustrated in FIG. 27, each is based on, for example, an 8-port V-CSI-RS configuration and a 4-port H-CSI-RS configuration.

In addition to this method, the codebook design for many scale AASs may be divided into a vertical codebook and a horizontal codebook separately.

As a result, by simply reusing or extending the legacy codebook for the horizontal codebook, the design of the codebook may be simplified and a vertical codebook may be designed with a linear phase increment for a particular instance.

Second, this method may reduce RS overhead and CSI feedback overhead.

The reason is that a total of 12 antenna ports rather than a total of 32 antenna ports need to be measured in order to improve the channel measurement quality instead of increased overhead and hybridity.

Finally, this method may reduce the overhead of PMI feedback because it is necessary that two codebooks—each codebook have a size much smaller than one codebook representing the full channel at one time.

(Proposal 2): Kronecker precoding may be considered as a simple precoding mechanism to support a large number of 2D-AAS transmission antennas.

Table 15 illustrates the simulation results obtained by comparing the performance between baseline category 3 and enhanced scheme 1.

Herein, one combined CQI for enhanced scheme 1 is calculated on the UE side together with the full Kronecker precoding matrix P when considering the relationship between vertical and horizontal CSI-RSs.

TABLE 15

|  | Mean UE Throughput (bps/Hz) | 5% UE Throughput (bps/Hz) | 50% UE Throughput (bps/Hz) | Resource Utilization | FTP load, λ (UEs/s/sector) |
| --- | --- | --- | --- | --- | --- |
| Category 3 | 2.828 (100%) | 0.4429 (100%) | 2.531 (100%) | 0.28 | 1.5 |
| Enhanced scheme 1 | 3.407 (121%) | 0.7937 (179%) | 3.448 (136%) | 0.21 | |
| Category 3 | 2.194 (100%) | 0.1520 (100%) | 1.747 (100%) | 0.44 | 2.0 |
| Enhanced scheme 1 | 2.779 (127%) | 0.3717 (245%) | 2.516 (144%) | 0.34 | |
| Category 3 | 1.371 (100%) | 0.0155 (100%) | 0.844 (100%) | 0.74 | 3.0 |
| Enhanced scheme 1 | 1.858 (136%) | 0.0648 (418%) | 1.370 (162%) | 0.65 | |
| Category 3 | 0.2584 (100%) | 0.0031 (100%) | 0.1868 (100%) | Full buffer | |
| Enhanced scheme 1 | 0.2651 (103%) | 0.0114 (368%) | 0.1717 (92%) | | |

Referring to Table 15, it can be seen that the performance of the baseline category 3 is not better than that of the enhanced scheme 1.

When two CQIs reported by a base station are combined, a CQI mismatch mainly occurs.

The reason is that it is not accurate to obtain one CQI from the independently reported vertical and horizontal CQIs.

(Proposal 3): CQI enhancement considering the combined CQI at the UE side is required to support separate vertical and horizontal CSI-RS based methods.

Another approach to CSI measurement is to use a limited number of CSI-RS port Ns with TXRU-port mapping which is diversified by time in different subframes.

That is, N CSI-RS ports may be mapped to different TXRUs at every time when the CSI-RS is transmitted.

As a whole, the CSI for a large number of antenna ports may be obtained at the base station side with a much smaller number of N CSI-RS ports which are transmitted for each measurement time instance.

4 CSI-RS ports are configured in the UE, and in order for the UE to combine the partial channels, a 4-ports mapping pattern is notified to the UE, as illustrated in FIG. 28.

The UE follows any one of two CSI feedback types.

The first CSI feedback type is CSI reporting in the partial channels measured by the N CSI-RS ports in a specific subframe ti as illustrated in FIG. 28.

The second CSI feedback type is CSI reporting in the combined channel.

Herein, the combined channel refers to a full estimated channel that is redesigned, for example, by combining partial channels in multiple time instances.

As a result, the CSI for a large number of antenna ports (e.g., 16 in FIG. 28) may be obtained at the base station with a much smaller number of N CSI-RS ports (e.g., N=4) which are transmitted for each measurement time instance.

FIG. 28 illustrates an example of a partial CSI-RS pattern for 16 cross-pole antenna elements.

(Proposal 4): A method that depends on the limited number of CSI-RS ports with different port mappings for each measurement instance that may be used to obtain CSI for a large scale of 2D-AAS is considered.

<Proposal Content 4>

Hereinafter, a hybrid scheme of beamformed and non-precoded CSI-RS based schemes will be described.

RS transmission optimization is one of designs to effectively support FD-MIMO.

For example, in the case of considering a baseline category 2 scheme with virtual sectorization, a network may transmit multiple CSI-RSs to obtain a gain of developing a vertical channel domain.

Each CSI-RS is precoded with different vertical beam weights, which may be considered as the beamformed CSI-RS based scheme.

However, in such a baseline scheme, overhead of continuously transmitting multiple CSI-RSs on a cell side occurs.

When considering flexibility of the RS overhead and the network to effectively control the CSI-RS transmission for supporting the FD-MIMO with target UEs, an effective CSI-RS transmission method considers UE loading, distribution, and the like with respect to a system having a large number of RS ports.

One method is to transmit some of RS ports rather than transmission of the full RS port.

As another method, a hybrid beamformed CSI-RS based scheme may be utilized or used to provide reduced RS overhead and performance gain by resource reuse for data transmission.

For example, the UE may find a vertical beam direction by transmitting a CSI-RS with a long period and report the found vertical beam direction to the base station.

In addition, the UE may feedback short-term CSI information to the base station by CSI-RS transmission with a short period (long-term feedback of a beamformed-based UE).

As described above, the hybrid scheme has two main issues.

That is, the two main issues relate to 1) how to determine the vertical direction for the UE in advance, and 2) how to apply the determined vertical beam to the beamformed CSI-RS transmission and the corresponding UE operation.

CSI-RS Transmission to Determine Vertical Beam Direction

The network may establish CSI-RS transmission for the UE to find the vertical beam direction, as shown in FIG. 29.

The UE may find the best vertical direction and feedback the found vertical direction to the network.

The CSI-RS period is relatively long because the vertical channel is not often changed.

This CSI-RS may be transmitted by the following methods:

(Method 1): non precoded CSI-RS (Method 2): Beamformed CSI-RS

In Method 1, a non-precoded CSI-RS may be transmitted to find a vertical beam direction.

The UE may select a vertical beam (e.g., PMI) from a vertical codebook and feedback the selected vertical beam to the network.

Then, the network may provide the beamformed CSI-RS in the vertical direction in order for the UE to feedback the horizontal CSI information.

In Method 2, a beamformed CSI-RS may be transmitted to find a vertical beam direction.

A main difference between Method 2 and Method 1 may be a vertical codebook, for example, a codebook selection in this case.

Since the beamformed CSI-RS is mapped to the antenna port, the UE may select the best antenna port among the configured beamformed CSI-RS ports and feedback the selected antenna port to the network.

Then, the network may provide the beamformed CSI-RS in the vertical direction to the horizontal CSI feedback of the UE.

FIG. 29 is a diagram illustrating an example for finding a vertical direction in a cell.

(Proposal): With respect to mixed beamformed CSI-RS-based scheme enhancement, existing horizontal CSI feedback and vertical feedback combined thereto are supported.

CSI-RS Transmission to Acquire and Report Horizontal CSI Information

As described above, when the base station determines the vertical beam direction of the target UE based on the CSI feedback from the UE, the corresponding beamformed CSI-RS applied by the determined vertical beam is transmitted for horizontal CSI feedback of the UE.

When the applied vertical beam direction is changed, the following two methods may be used to apply vertical beamforming in the CSI-RS transmission.

(Method 1): The base station notifies to the UE a valid CSI-RS resource change.

In general, a cell may predetermine multiple (e.g., 2, 4, or 8) beamformed CSI-RS resource candidates.

The reason is that there are many UEs that prefer different vertical beams so that cell-specific CSI-RS resources predetermined within the cell coverage can be selected or employed.

In this case, the UE may measure one CSI-RS in all candidate beamformed CSI-RS resources.

When the UE reports different vertical beam directions from the predetermined CSI-RS resource to the base station, the UE needs to notify to the base station a valid CSI-RS resource change in order to measure different CSI-RSs associated with channel measurement.

When some of the candidate beamformed CSI-RSs do not need to be transmitted on the cell side (because no UEs prefer the corresponding vertical beam direction), the unused CSI-RS resources may be flexibly used by the dynamic ZP-CSI-RS indication for data transmission.

The above Method 1 may be preferred when the number of UEs moving in the cell is not very small.

(Method 2): The base station notifies to the UE the beam change applied in the same CSI-RS resource.

Method 2 may be beneficial when the number of UEs moving in the cell is very small or when the network is targeted to obtain gain from UE-centric operation.

Herein, the UE-centric operation indicates the operation of the UE associated with a UE-specific beamformed CSI-RS resource configured for each UE.

When depending on the CSI feedback of the UE in the vertical direction, the beamformed CSI-RS may preferably have different vertical directions.

Accordingly, the beamformed CSI-RS assumes different vertical precoding from the previous precoding.

The vertical (beam) change affects the horizontal CSI calculation depending on an embodiment-specific measurement window configured by the UE.

Therefore, the UE needs to know whether the beam direction applied to properly configure or reconfigure the CSI measurement window for CSI calculation is changed.

(Proposal 3): With respect to a hybrid beamformed CSI-RS based enhancement, a concrete method for applying vertical precoding to CSI-RS Another method for the hybrid beamformed CSI-RS based method enhancement is a method of supporting simultaneous CSI-RS transmission.

The network may trigger the UE to report the horizontal CSI information to the base station based on the vertical beamformed CSI-RS.

Accordingly, the network provides the transmission of the CSI-RS which occurs simultaneously in the vertical direction in the case of transmitting a specific CSI-RS.

A mechanism associated with (Proposal 3) is illustrated in FIG. 30.

Herein, the network may set a beamformed CSI-RS configuration (e.g., 5 ms periodicity) to multiple virtual matrices (e.g., Bi for i=1, 2, . . . , K).

In FIG. 30, in a subframe #4 of the second wireless frame, the network may trigger the UE to report horizontal CSI information based on different vertical directions (e.g., virtualization matrix B2) from the previous vertical direction (e.g., virtualization matrix B1) in another CSI-RS transmission subframe.

When the UE is triggered to report multiple aperiodic CSI feedbacks in multiple subframes, each aperiodic CSI-RS feedback is associated with a different virtual matrix Bi in the CSI-RS.

Further, the base station may also determine an appropriate beam direction for the UE based on the reported CSI feedback.

The simultaneous CSI-RS transmission with one CSI-RS configuration enables the network to properly handle the traffic load with dynamic changes of the virtual matrices.

FIG. 30 is a diagram illustrating an example of simultaneous CSI-RS transmission with multiple virtual matrices.

<Proposal Content 5>

Next, with respect to the non-precoded CSI-RS, a method for supporting 12- and 16-CSI-RS ports using full-port mapping for the number {1, 2, 4, 8} of existing CSI-RS antenna ports will be described.

CSI-RS Design and Configuration for 12 and 16 Ports (Approach 1): New CSI-RS patterns are fixed.

There are many CSI-RS patterns currently supported for 1, 2, 4 or 8 ports.

Herein, all CSI-RS patterns follow a tree structure in which specific 1, 2, or 4 port CSI-RS patterns may be partially overlapped with any one of 5 8-port CSI-RS patterns in one subframe.

Similarly, new 12- and 16-port CSI-RS patterns may be designed by expanding the tree structure.

Figure 31B:
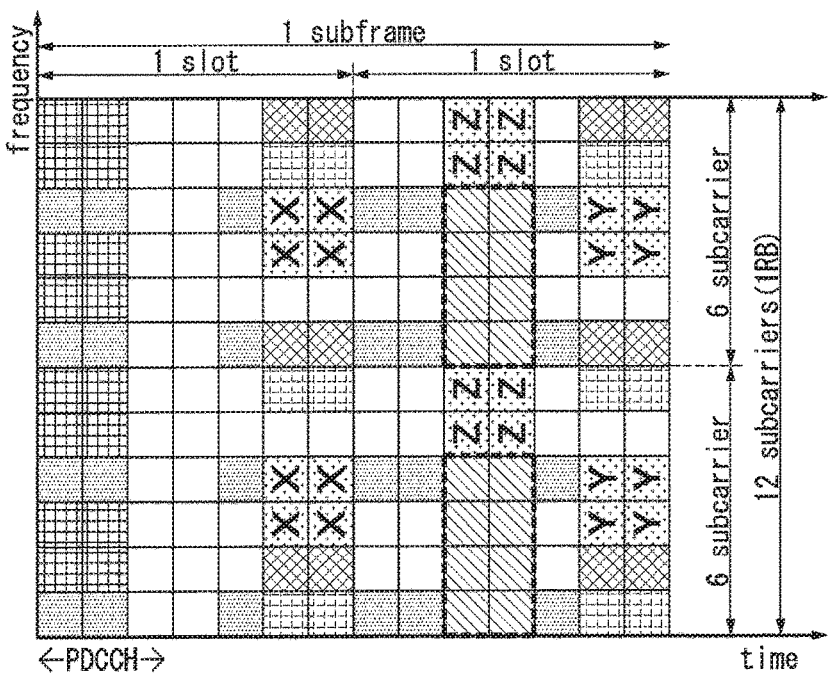
FIG. 31B illustrates one example of a method for designing 16 port non-precoded CSI-RS patterns.

The (Approach 1) follows such a design principle and may have simple design options for 12 ports and 16 ports, respectively, as illustrated in FIGS. 31A and 31B.

FIG. 31A illustrates an example of a design method for a 12-port non-precoded CSI-RS pattern.

As illustrated in FIG. 31A, it is simple to define two 12-port CSI-RS patterns 1 and 2 proposed in the present specification.

The reason is that when considering multiplexing with legacy CSI-RS patterns, two CSI-RS patterns defined below best match the current 1, 2, 4, 8-port CSI-RS patterns.

For example, when one cell in FIG. 31A configures only 12-port CSI-RS pattern #1 in FIG. 31A, different 12 REs may be reused for a pair of CSI-RS configuration options (see below) for adjacent cells in the same OFDM symbol per PRB pair.

One 12 port CSI-RS pattern #2 for different cells

One 8-port legacy CSI-RS and one 4-port legacy CSI-RS pattern for different cells Three 4-port legacy CSI-RS patterns for different cells In addition, in FIG. 31A, two 12-port CSI-RS patterns all exist in two adjacent OFDM symbols.

This follows the same design principle as the legacy CSI-RS pattern so that the TDMs of the REs in one CSI-RS resource are retained in at most 2 OFDM symbols.

Similarly, FIG. 31B illustrates an example of a design method, for example, Approach 1, for 16-port non-precoded CSI-RS patterns.

Two new 16-port CSI-RS patterns are all present within two adjacent OFDM symbols, and the respective patterns are partially overlapped with each other.

Then, any one pattern of the overlapped patterns may be selectively used while different REs marked by 'Z' are used in different cells.

(Approach 2): A new CSI-RS resource is configured with the existing CSI-RS resources.

The (Approach 1) described above focuses on optimizing only specific cases of the 12- and 16-port CSI-RS patterns.

However, when it is extended for more than 32 ports, it may be necessary to configure the M (>8)-port CSI-RS resource in a more general form.

In this regard, (Approach 2) considers new CSI-RS resources that may be configured with multiple legacy 2-, 4-, and/or 8-port CSI-RS resources.

The (Approach 2) may support a specific M-port CSI-RS resource for simplicity.

The specific M-port CSI-RS resource may be limited to a multiple of 4 as a candidate M value. Herein, the value of M may be 4, 8, 12, 16, and the like.

The (Approach 2) may be divided into two methods below.

(Method 1): In order for the UE to support EBF/FD-MIMO, a CSI process may be configured with multiple legacy (4-port) CSI-RS resources.

(Method 2): In order for the UE to support EBF/FD-MIMO, a new type of CSI-RS resource may be configured to include multiple merged legacy (4-port) CSI-RS resources.

Although (Method 1) may be simpler in configuration than (Method 2), Method 2 requires that multiple merged CSI-RS resources always need to be measured together and may be more preferable than Method 1 in that there is a need to be tracked by the UE in terms of QCL.

<Proposal Content 6>

Next, whether a new transmission mode (TM) is required to support enhanced Beamforming (EBF)/Full Dimension (FD)-MIMO will be described.

Each downlink transmission mode (TM) supports two DCI formats.

The two DCI formats include a DCI format 1A which is supported commonly by all TMs and a DCI format 2D which is dependent on TM (TM 10).

So far, the new TM has been introduced when the corresponding DCI format needs to be enhanced.

For example, TM 10 is newly defined with DCI format 2D having a new PQI field.

(Proposal 1): The new TM for EBF/FD-MIMO is only supported if there is a need for enhancements of existing DCI formats.

Four new indication messages that may be supported in the DCI format for supporting EBF/FD-MIMO may be defined as follows.

Beam change indicator: Ensure that the UE resets a start time of the CSI measurement window when a beamforming change occurs.

Beamformed CSI-RS resource change notification: To notify available N CSI-RS resources to allow the UE to measure the desired channel information from the full candidate M beamformed CSI-RS resources Dynamic ZP CSI-RS indications: To reuse unused CSI-RS REs (especially, PDSCH REs) when there is no indication of actual aperiodic CSI-RS transmission.

Aperiodic CSI-RS transmission indication: To explicitly indicate actual aperiodic beamformed CSI-RS transmission instance Additionally, when a new DCI indication needs to support adding a DMRS port configuration, another potential new field may be present in a DCI format associated with DMRS enhancement.

<Proposal Content 7>

Next, with respect to the beamformed CSI-RS enhancements, a method for allocating beamformed CSI-RS resource (s) will be described.

(Approach 1): UE-specific beamforming in configured CSI-RS resource: In case of Approach 1, a serving eNB may dynamically change a beamforming weight applied in a NZP CSI-RS resource configured to the UE.

When a beamforming change occurs, the UE may receive the indication explicitly or implicitly from the base station in order to ensure that the UE resets the start time of the CSI measurement window.

Alternatively, the UE may always be configured to limit its NZP CSI-RS measurement window (e.g., up to one subframe).

Further, an interference measurement window may also be used for CSI-IM measurements.

Any one or two of measurement resource limitations CSI-IM and CSI-RS may be applied in a frequency domain.

(Approach 2): CSI-RS resource change for channel measurement

In the case of Approach 2, the UE is configured with M (>1) NZP CSI-RS resources.

From M CSI-RS resources, the base station selects N (>=1) resource (s) for one CSI process and signals the selected resource to the UE.

Alternatively, the UE reports N CSI-RS resources selected from the M configured CSI-RS resources to the base station or the network.

(Approach 3): Aperiodic beamformed CSI-RS

In Approach 3, in the UE, the CSI process is set so that the actual NZP CSI-RS transmission and CSI-IM measurement instances are controlled by the base station and signaled to the UE.

Herein, the CSI measurement window may be configured by higher layer signaling.

Hereinafter, Approaches 1 to 3 will be described in more detail.

(Approach 1): UE-Dedicated CSI-RS Resource

Approach 1 considers UE-dedicated beamformed CSI-RS resource allocation for each UE in a specific cell.

In particular, whenever the UE moves from an RRC idle state to an RRC-connected state (alternatively, state transition), the UE configures a new dedicated CSI-RS resource that is measured by other UEs in the corresponding cell and is not currently configured.

Therefore, as a disadvantage of Approach 1, as the number of UEs operating in a specific cell increases, the overhead of the CSI-RS linearly increases.

On the other hand, as an advantage of Approach 1, the serving base station may dynamically change beamforming weights applied on the dedicated CSI-RS resources that are configured to the UE.

Accordingly, the beamforming weights may be determined by the base station in unlimited beamforming resolution and units, as long as the base station may appropriately obtain the corresponding channel information to be used to determine the corresponding weights.

In general, Approach 1 considers one dedicated CSI-RS resource configured for each UE.

The dedicated CSI-RS resources according to Approach 1 are applied as channel-adaptive beamforming coefficients targeting the UE by embodying the base station.

That is, the UE may perform only legacy CSI reporting based on one of the legacy CSI feedback modes together with the legacy reporting type by measuring the beamformed CSI-RS.

(Approach 2): Selection Between Multiple Configured CSI-RS Resources (Approach 2), the UE is configured to M (>1) NZP CSI-RS resources, and different beamforming weights are applied to the respective NZP CSI-RS resources.

(Approach 2-1): From M CSI-RS resources, the base station selects N (>=1) resource (s) for the CSI process and signals the selected resource to the UE.

As such, the indication of the base station may be signaled in a L1 or L2 form to avoid RRC reconfiguration for CSI-RS resources.

That is, the RRC reconfiguration may be defined to occur only when the candidate M resources need to be changed.

The indication of the base station occurs in a relatively long period.

The base station may perform down selection based on a hybrid scheme using CSI-RSRP reporting of the UE, channel reciprocity, or low-duty-cycle non-precoded CSI-RS among the N resources.

(Approach 2-2): From the M resources, the UE reports index (s) of the N selected CSI-RS resources.

For example, such an indication of the UE may be performed together in the corresponding CSI reporting by the resource index feedback or the selection codebook.

In the same manner, the RRC reconfiguration may occur only when the candidate M resources need to be changed.

With respect to (Approach 2-1), when the base station always intends to select a resource indication with N=1 from the candidate M CSI-RS resources, an appropriate CSI reporting mode and type is not required like the case of Approach 1.

The reason is that the UE follows the legacy CSI reporting procedure based on the indicated N=1 legacy NZP CSI-RS resources with 1, 2, 4, or 8 ports.

When the base station intends to indicate N>1 selected resources for (Approach 2-1), the UE reports N sets of {RI, PMI, CQI} to the base station, each set is obtained for each selected CSI-RS resource.

Therefore, this affects CSI reporting per CSI process, and the reporting payload size may vary according to the indicated N.

Alternatively, it is possible to operate as illustrate in Table 16 below:

With respect to Approach 2-2, the following CSI reporting enhancements are required and include a new reporting type of a beam selection indicator, or a new type of additional PMI based on the selected codebook.

The CSI feedback procedure of the UE below which may be considered as the partial KP or 'column-wise KP' will be described.

The proposed feedback procedure may be configured by the following two parts.

(Part 1): NZP CSI-RS resource selection feedback based on corresponding selection codebook (Part 2): Horizontal short-term CSI feedback based on existing constant-modulus codebook A period of the vertical beam selection feedback of (Part 1) may be relatively longer than the period of the existing horizontal feedback of (Part 2).

The CQI feedback is transmitted only by the existing feedback of (Part 2).

With respect to the RI and PMI feedback, the UE calculates and reports the FD-MIMO combined precoder by Equation 20 described above.

Further, a new feedback type for the beamformed CSI-RS resource selection report as well as the partial KP feedback component needs to be supported for Approach 2.

(Approach 3): Aperiodic Beamformed CSI-RS Transmission

Another approach to support channel measurement for FD-MIMO relates to aperiodic CSI-RS transmission.

Unlike the current periodic NZP CSI-RS transmission, (Approach 3) relates to the NZP CSI-RS transmission, not the periodic basis.

TABLE 16

For Approach 2-1, when the base station intends to always indicate N = 1 selected resources from the M candidate CSI-RS resources, like Approach 1, there is no need for special enhancements for the associated CSI reporting mode and type.
When the base station intends to indicate the N > 1 selected resources for Approach 2-1, there may be two available methods for CSI reporting enhancement at the indicated N > 1 resources.
(Method 1): The UE reports one set of {RI, PMI, CQI} which is the same as the legacy CSI reporting procedure.
Therefore, no new cSI report type needs to be defined.
However, the UE needs to calculate the CQI based on all N > 1 beamformed resources.
Each beamformed resource is applied to the selected PMI.
It may be interpreted as a full KP operation because the same horizontal PMI (selected short-term PMI) is commonly applied to all vertical PMIs (unique to the corresponding beamformed CSI-RS resource).
Accordingly, the reported RI corresponds to one of the N selected CSI-RSs, and the full RI is obtained by multiplying the reported RI by 4.
Therefore, the full RI is limited to not exceed the number of reception antennas of the UE.
(Method 2): The UE reports an N set of {RI, PMI} and the CQI result. Therefore, a new CSI report type among multiple reporting components of {RI, PMI} pairs needs to be defined.
The detailed CSI feedback procedure is described below, which may be represented by a partial KP or 'column-wise KP' procedure.
A portion of the NZP CSI-RS resource selection feedback is replaced together with the indication of the base station for the selected N CSI-RS resources.
With respect to (Approach 2-2) described above, the following CSI reporting enhancement is required and includes a new reporting type of a beam selection indicator, or a new type of additional PMI based on equally selected codebooks.
Like the method for (Approach 2-1), the full KP type of (Method 1) may also be applied to (Approach 2-2).
However, for improved performance, there is proposed a CSI feedback procedure of UE below that may be considered as the partial KP or 'column-wise KP'. The proposed feedback procedure may be configured by the following two parts.
(Part 1): NZP CSI-RS resource selection feedback based on corresponding selection codebook
(Part 2): Horizontal short-term CSI feedback based on existing constant-modulus (CM) codebook This aperiodic CSI-RS may be transmitted only when it is needed, resulting in a reduction in CSI-RS overhead.

When the aperiodic beamformed CSI-RS is transmitted only when it is needed, it is natural to report the corresponding CSI through aperiodic CSI reporting.

Thus, similarly to Approach 1, if the beamformed CSI-RS configuration is one of the legacy NZP CSI-RS resources with 1, 2, 4, or 8 ports, with respect to the appropriate aperiodic CSI reporting mode and type for Approach 3, there is no need for enhancements.

If an explicit indication in an aperiodic CSI-RS transmission instance is given separately (to provide additional flexibility to the aperiodic CSI-RS transmission), a reference resource for CSI estimation needs to be specified.

The reason is that a subframe in which the UE receives the aperiodic CSI request and a subframe indicated so that the UE measures the aperiodic CSI-RS may be different from each other.

In this case, when the UE is triggered to report the aperiodic CSI feedback, the reference resource is not the subframe in which the aperiodic CSI request is received, but the subframe indicated so that the UE measures the aperiodic CSI-RS.

General Apparatus to which Present Invention is Applicable

FIG. 32 illustrates a block diagram of a wireless communication apparatus according to an embodiment of the present invention.

Referring to FIG. 32, a wireless communication system includes a base station 3210 and multiple UEs 3220 positioned within an area of the base station 3210.

The base station 3210 includes a processor 3211, a memory 3212, and a radio frequency (RF) unit 3213. The processor 3211 implements a function, a process, and/or a method which are proposed in FIGS. 1 to 31 above. Layers of a radio interface protocol may be implemented by the processor 3211. The memory 3212 is connected with the processor 3211 to store various pieces of information for driving the processor 3211. The RF unit 3213 is connected with the processor 3211 to transmit and/or receive a radio signal.

The UE 3220 includes a processor 3221, a memory 3222, and an RF unit 3223. The processor 3221 implements a function, a process, and/or a method which are proposed in FIGS. 1 to 31 above. Layers of a radio interface protocol may be implemented by the processor 3221. The memory 3222 is connected with the processor 3221 to store various pieces of information for driving the processor 3221. The RF unit 3223 is connected with the processor 3221 to transmit and/or receive a radio signal.

The memories 3212 and 3222 may be positioned inside or outside the processors 3211 and 3221 and connected with the processors 3211 and 3221 by various well-known means. Further, the base station 3210 and/or the UE 3220 may have a single antenna or multiple antennas.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

In the wireless communication system of the present invention, the method for reporting the channel state information is described primarily with various wireless communication systems in addition to an example applied to a 3GPP LTE/LTE-A system.

The invention claimed is:

1. A method for reporting, by a user equipment (UE), channel state information (CSI) in a wireless communication system, the method comprising:
   transmitting UE capability information,
      wherein the UE capability information includes (i) information for whether the UE supports a non-precoded channel state information-reference signal (CSI-RS) based CSI reporting and (ii) one or more codebook configurations, supported by the UE,
      wherein the one or more codebook configurations are related to the non-precoded CSI-RS based CSI reporting,
      wherein each of the one or more codebook configurations is associated with information for subset of a codebook,
      wherein the information for subset of the codebook is configured differently based on an oversampling parameter and the number of antenna ports, for each of the one or more codebook configurations;
   receiving CSI-RS configuration information,
      wherein the non-precoded CSI-RS based CSI reporting is configured based on the CSI-RS configuration information,
      wherein a specific codebook configuration among the one or more codebook configurations is indicated based on the CSI-RS configuration information;
   receiving a CSI-RS based on the CSI-RS configuration information;
   measuring a CSI based on the CSI-RS and the specific codebook configuration; and
   reporting the CSI.

2. The method of claim 1, wherein the oversampling parameter comprises a horizontal oversampling value and a vertical oversampling value, and wherein the number of antenna ports comprises the number of horizontal antenna ports and the number of vertical antenna ports.

3. The method of claim 2, wherein each of the one or more codebook configurations further includes information for whether to support code division multiplexing (CDM)-4.

4. The method of claim 1, wherein each of the one or more codebook configurations is differently configured based on a rank.

5. The method of claim 1, wherein the measuring of the CSI further includes selecting one antenna port group based on the specific codebook configuration.

6. The method of claim 1, wherein the UE capability information is transmitted for each band or for each band combination.

7. The method of claim 1, wherein the UE capability information further includes measurement restriction (MR) related information.

8. A user equipment (UE) for reporting channel state information (CSI) in a wireless communication system, the UE comprising:

one and more transceivers;
one and more processors; and
one and more memories connecting with the one and more processors and storing instructions for operations performed by the one and more processors,
wherein the operations comprise:
transmitting UE capability information,
wherein the UE capability information includes (i) information for whether the UE supports a non-precoded channel state information-reference signal (CSI-RS) based CSI reporting and (ii) one or more codebook configurations, supported by the UE,
wherein the one or more codebook configurations are related to the non-precoded CSI-RS based CSI reporting,
wherein each of the one or more codebook configurations is associated with information for subset of a codebook,
wherein the information for subset of the codebook is configured differently based on an oversampling parameter and the number of antenna ports, for each of the one or more codebook configurations;
receiving CSI-RS configuration information,
wherein the non-precoded CSI-RS based CSI reporting is configured based on the CSI-RS configuration information,
wherein a specific codebook configuration among the one or more codebook configurations is indicated based on the CSI-RS configuration information;
receiving a CSI-RS based on the CSI-RS configuration information;
measuring a CSI based on the CSI-RS and the specific codebook configuration; and
reporting the CSI.

9. A method for receiving, by a base station (BS), channel state information (CSI) in a wireless communication system, the method comprising:

receiving, from a user equipment (UE), UE capability information,
wherein the UE capability information includes (i) information for whether the UE supports a non-precoded channel state information-reference signal (CSI-RS) based CSI reporting and (ii) one or more codebook configurations supported by the UE,
wherein the one or more codebook configurations are related to the non-precoded CSI-RS based CSI reporting,
wherein each of the one or more codebook configurations is associated with information for subset of a codebook,
wherein the information for subset of the codebook is configured differently based on an oversampling parameter and the number of antenna ports, for each of the one or more codebook configurations;
transmitting CSI-RS configuration information,
wherein the non-precoded CSI-RS based CSI reporting is configured based on the CSI-RS configuration information,
wherein a specific codebook configuration among the one or more codebook configurations is indicated based on the CSI-RS configuration information;
transmitting a CSI-RS; and
receiving the CSI measured based on the CSI-RS and the specific codebook configuration.

10. The method of claim 9, wherein the oversampling parameter comprises a horizontal oversampling value and a vertical oversampling value, and wherein the number of antenna ports comprises the number of horizontal antenna ports and the number of vertical antenna ports.

11. The method of claim 1, wherein each of the one or more codebook configurations is indexed by one of 1 to 4.

* * * * *